United States Patent
Serper et al.

(10) Patent No.: US 11,943,311 B2
(45) Date of Patent: Mar. 26, 2024

(54) SYSTEM AND METHOD ASSOCIATED WITH CALIBRATED INFORMATION SHARING USING WAVE DYNAMIC COMMUNICATION PROTOCOL IN AN EPHEMERAL CONTENT-BASED PLATFORM

(71) Applicant: Wayve LLC, Melville, NY (US)

(72) Inventors: Brett Harrison Serper, Melville, NY (US); Karan Verma, Melville, NY (US)

( * ) Notice: Subject to any disclaimer, the term of this patent is extended or adjusted under 35 U.S.C. 154(b) by 0 days.

(21) Appl. No.: 17/720,963

(22) Filed: Apr. 14, 2022

(65) Prior Publication Data
US 2022/0345533 A1    Oct. 27, 2022

Related U.S. Application Data

(60) Provisional application No. 63/179,733, filed on Apr. 26, 2021.

(51) Int. Cl.
*H04L 67/50* (2022.01)
*H04L 67/52* (2022.01)

(52) U.S. Cl.
CPC .......... *H04L 67/535* (2022.05); *H04L 67/52* (2022.05)

(58) Field of Classification Search
CPC ............................. H04L 67/535; H04L 67/52
See application file for complete search history.

(56) References Cited

U.S. PATENT DOCUMENTS 8,626,184 B2 *  1/2014  Dicke .................... H04W 4/20
                                                    455/456.2
8,849,314 B2 *  9/2014  Dicke .................. H04W 4/029
                                                    455/456.6
(Continued)

FOREIGN PATENT DOCUMENTS

KR          101164328 B1      7/2012

OTHER PUBLICATIONS

NA, Anomo—Anonymous social app where identities stay private., Dec. 8, 2021.
(Continued)

*Primary Examiner* — David P Zarka
*Assistant Examiner* — Wuji Chen
(74) *Attorney, Agent, or Firm* — Rivkin Radler LLP

(57) ABSTRACT

An ephemeral content distribution system associated with exchanging calibrated communications using a wave dynamic communication protocol based at least on a current wave-state of a user is disclosed. The system transmits a wave-based request for wave dynamic communications associated with a first user. The system processes wave-geographic information associated with a bounded geographical region based on a wave-state of a second user that received the wave-based request. The system processes wave-identity information associated with the wave-state of the second user. The system next receives a response of the second user to the wave-based request in accordance with the wave-state of the second user. The system further facilitates an exchange of the calibrated communications between the first and the second user based on the wave-identity of the second user using the wave dynamic communication protocol associated with discrete epochs of the calibrated communications in the ephemeral content distribution system.

(Continued)

Corresponding methods and a computer-readable device are also disclosed.

21 Claims, 37 Drawing Sheets
(22 of 37 Drawing Sheet(s) Filed in Color)

(56) References Cited

U.S. PATENT DOCUMENTS

| | | | |
|---|---|---|---|
| 9,049,543 B2* | 6/2015 | Dicke | H04W 4/02 |
| 9,445,347 B2* | 9/2016 | Sadeghi | H04L 61/5038 |
| 10,268,341 B2* | 4/2019 | Kocienda | G06T 11/001 |
| 10,771,575 B2 | 9/2020 | Naveh et al. | |
| 11,019,469 B2 | 5/2021 | Nguyen | |
| 11,128,715 B1* | 9/2021 | Al Majid | H04L 67/306 |
| 2006/0015263 A1* | 1/2006 | Stupp | G06F 17/18 |
| | | | 702/19 |
| 2012/0254774 A1 | 10/2012 | Patton | |
| 2012/0309417 A1* | 12/2012 | Blom | H04W 4/023 |
| | | | 455/456.1 |
| 2012/0317205 A1 | 12/2012 | Lahiani et al. | |
| 2012/0324018 A1 | 12/2012 | Metcalf et al. | |
| 2013/0185368 A1* | 7/2013 | Nordstrom | H04W 12/02 |
| | | | 709/206 |
| 2013/0336159 A1* | 12/2013 | Previdi | H04L 45/50 |
| | | | 370/254 |
| 2014/0199970 A1* | 7/2014 | Klotz | H04W 4/029 |
| | | | 455/411 |
| 2016/0142879 A1 | 5/2016 | Walden et al. | |
| 2016/0315884 A1* | 10/2016 | Clark | H04L 51/216 |
| 2017/0243403 A1* | 8/2017 | Daniels | G06T 19/20 |
| 2018/0198831 A1 | 7/2018 | Calcaterra et al. | |
| 2019/0178657 A1* | 6/2019 | Benbrahim | G01C 21/3682 |
| 2019/0253523 A1* | 8/2019 | Raduchel | H04L 63/062 |
| 2020/0137181 A1 | 4/2020 | Connelly et al. | |
| 2020/0175612 A1* | 6/2020 | Montoya | H04W 4/21 |
| 2021/0058738 A1 | 2/2021 | Holden et al. | |
| 2021/0207974 A1* | 7/2021 | Zhou | G01C 21/383 |
| 2021/0344731 A1* | 11/2021 | Parra | H04L 67/52 |
| 2021/0390118 A1* | 12/2021 | Gorkin | H04L 67/1097 |
| 2022/0179665 A1* | 6/2022 | Rathod | G06F 9/451 |
| 2022/0231872 A1* | 7/2022 | Lum | H04L 51/043 |

OTHER PUBLICATIONS

NA, HumBee: Fun & Safe way to meet new people near you, Dec. 8, 2021.
NA, WhosHere—Chat Privately and Nearby, Dec. 8, 2021.
NA, Moments by TuOrbit, Dec. 31, 2021.

* cited by examiner

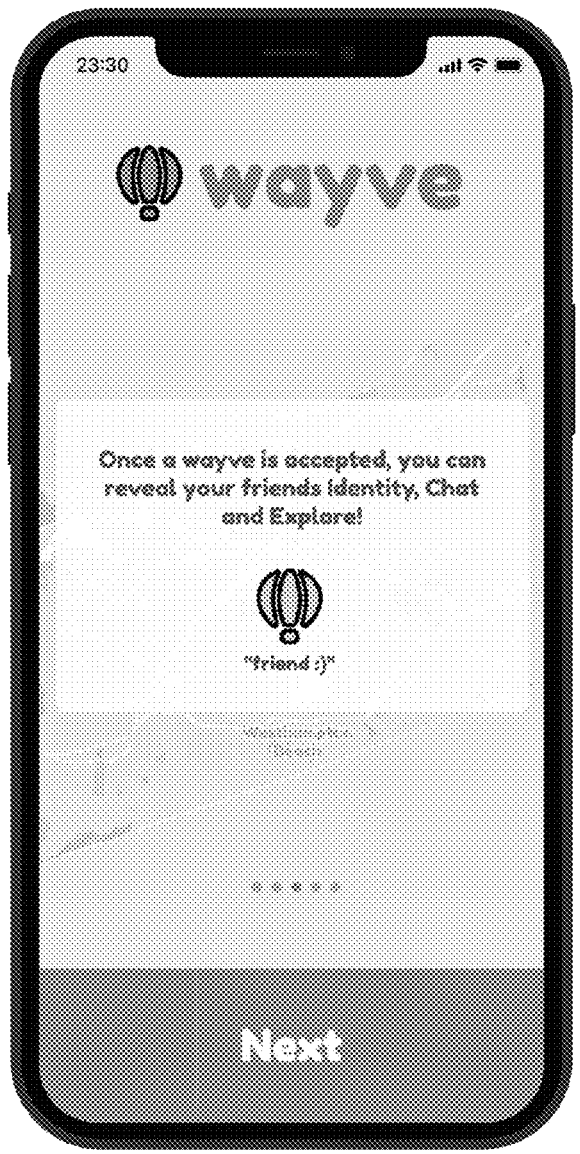
FIG. 1C  FIG. 1D

FIG. 1J  FIG. 1K

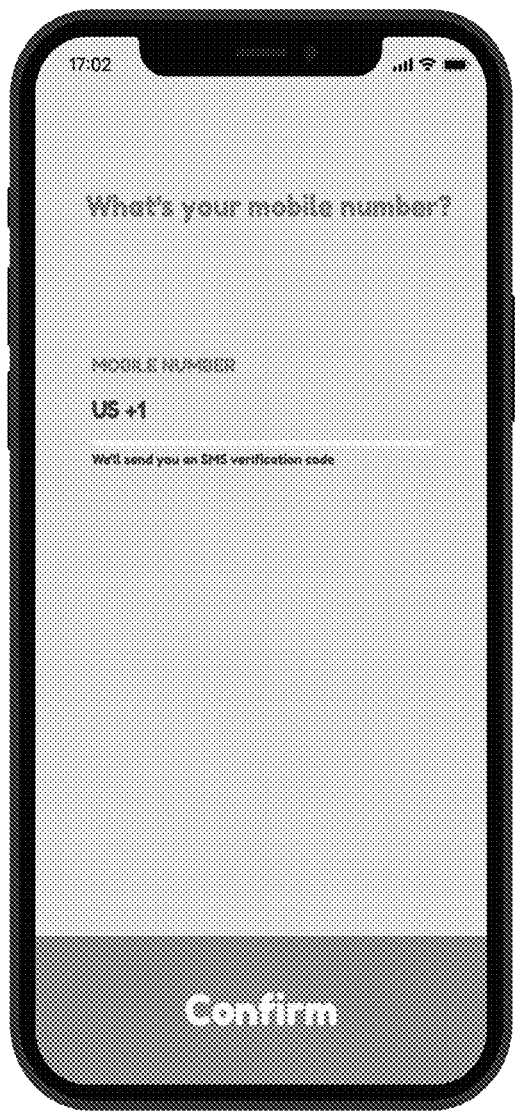
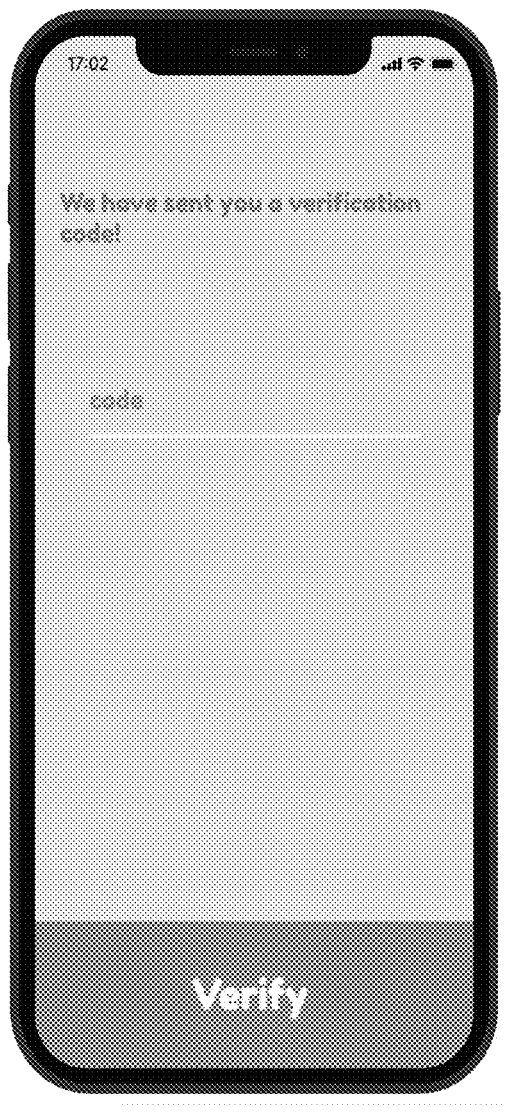
FIG. 1L  FIG. 1M

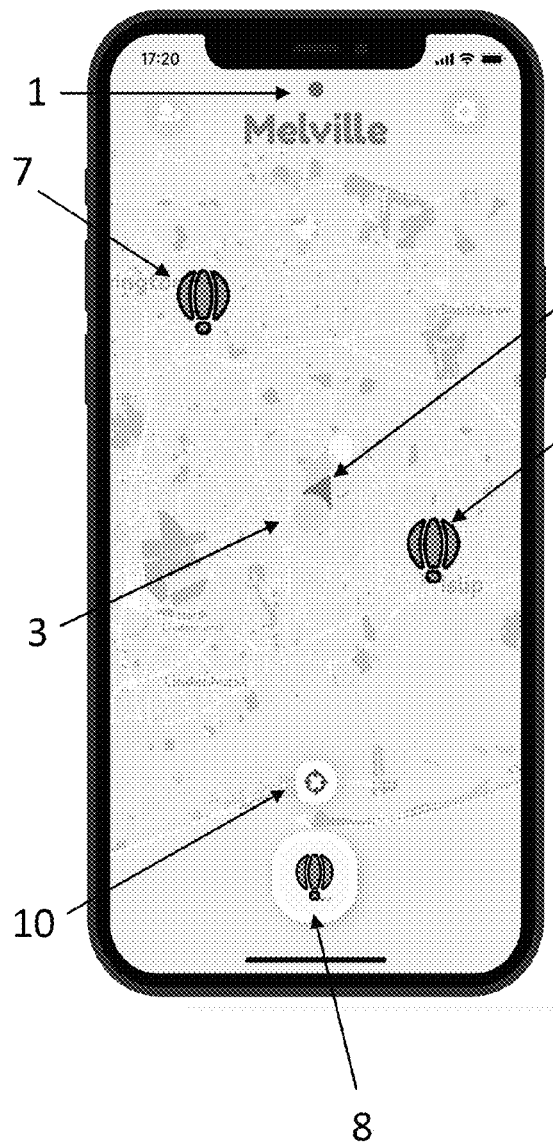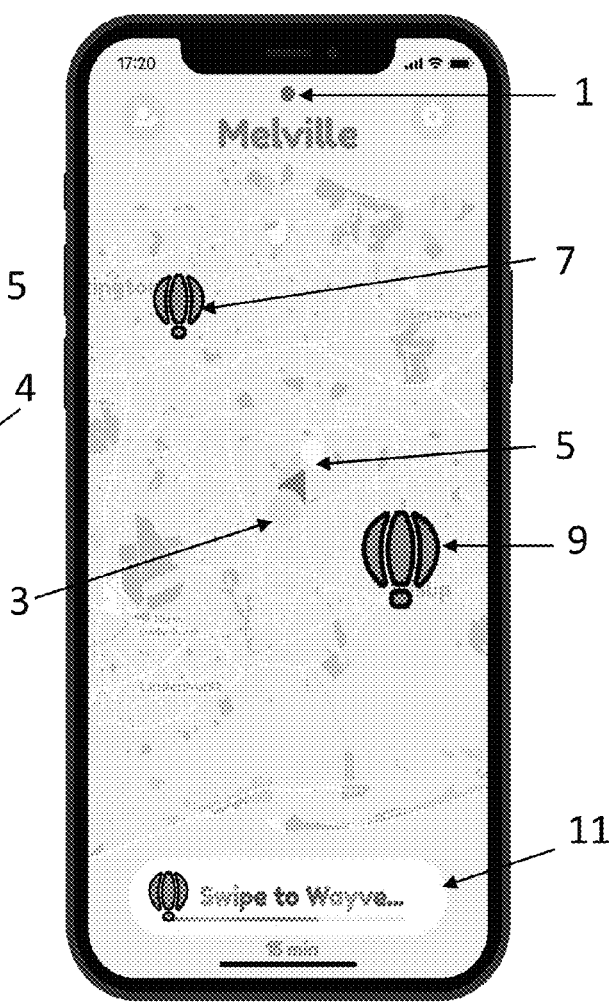
FIG. 2A  FIG. 2B

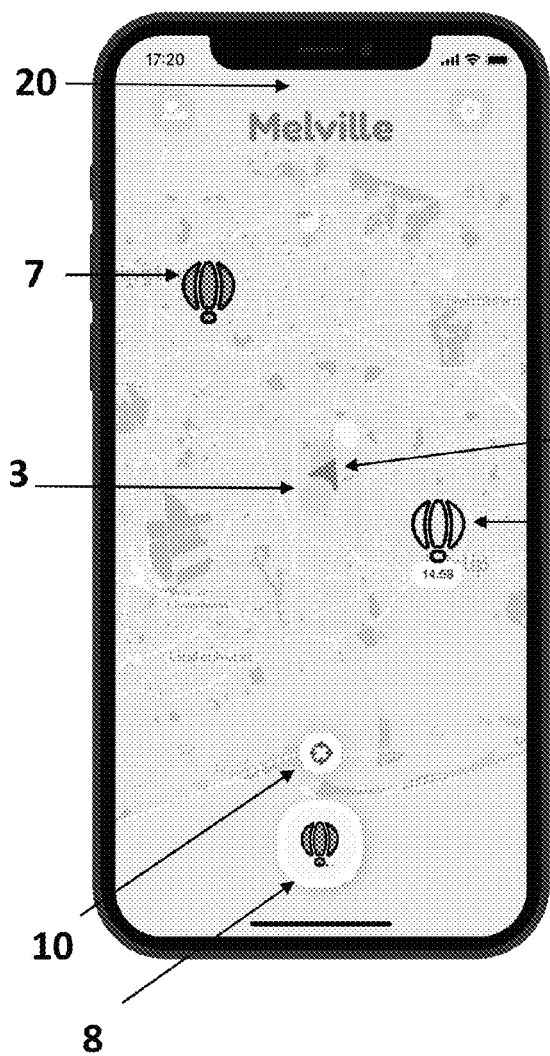
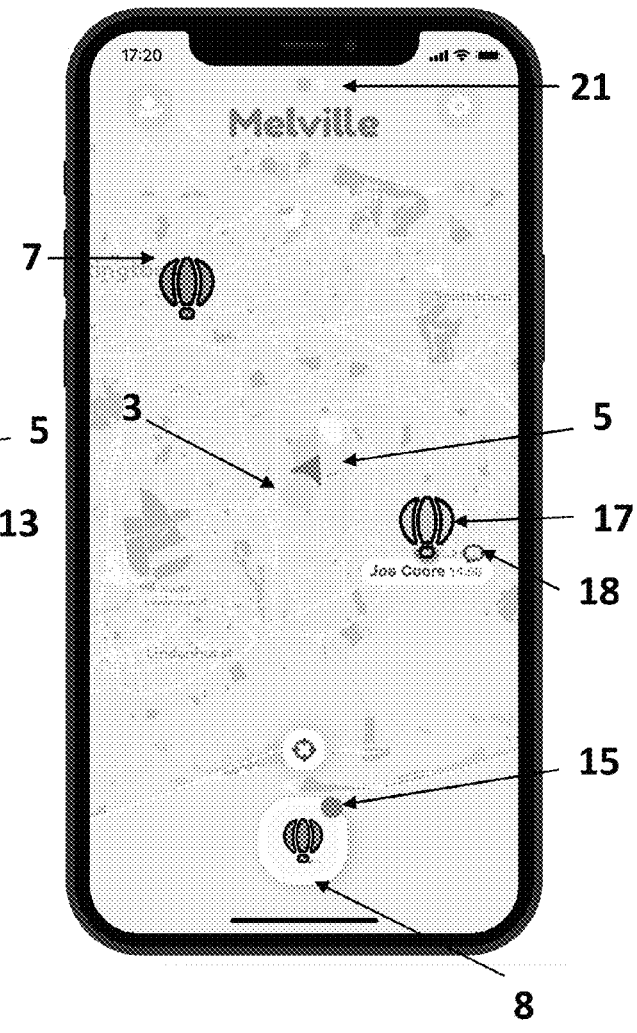
FIG. 3A　　　　FIG. 3B

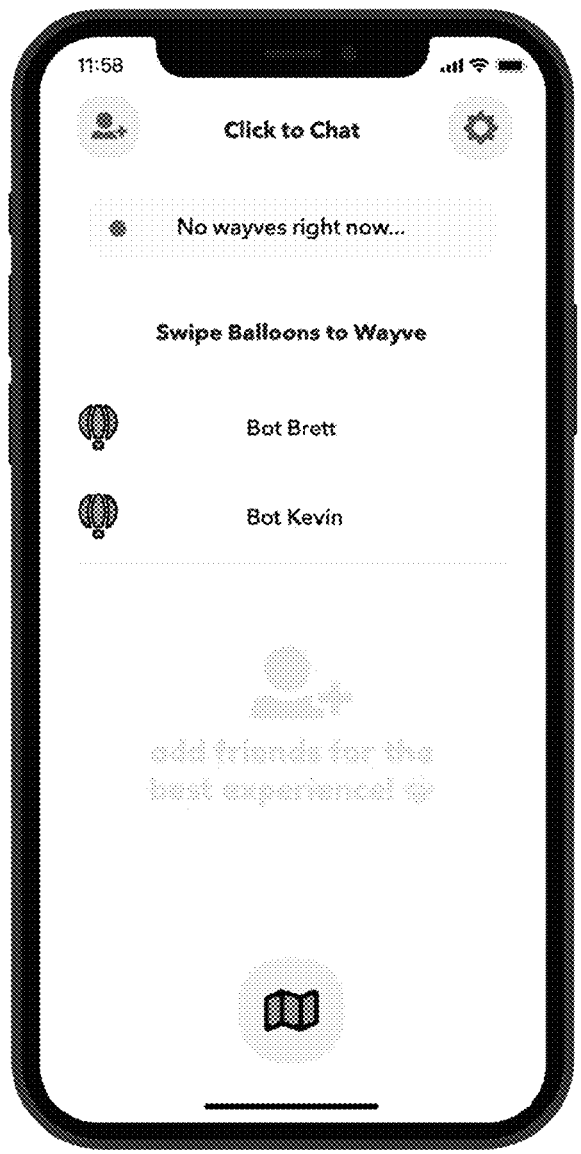
FIG. 4A  FIG. 4B

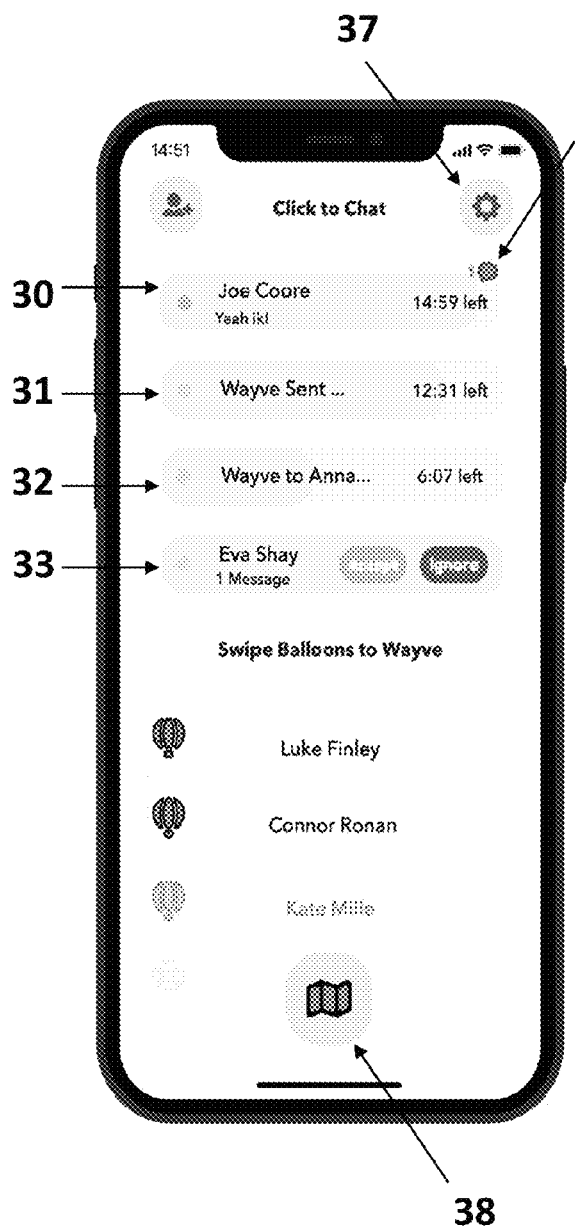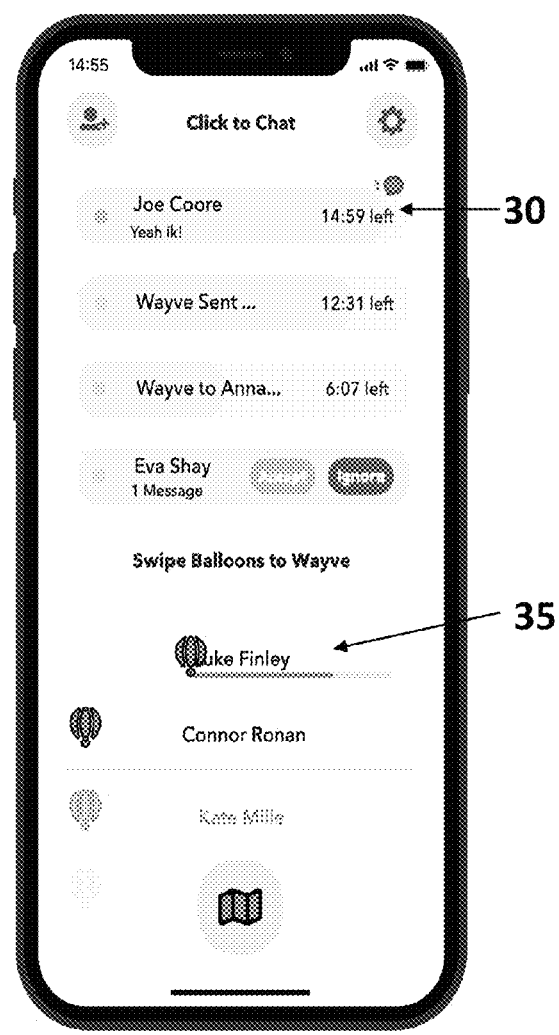
FIG. 5A  FIG. 5B

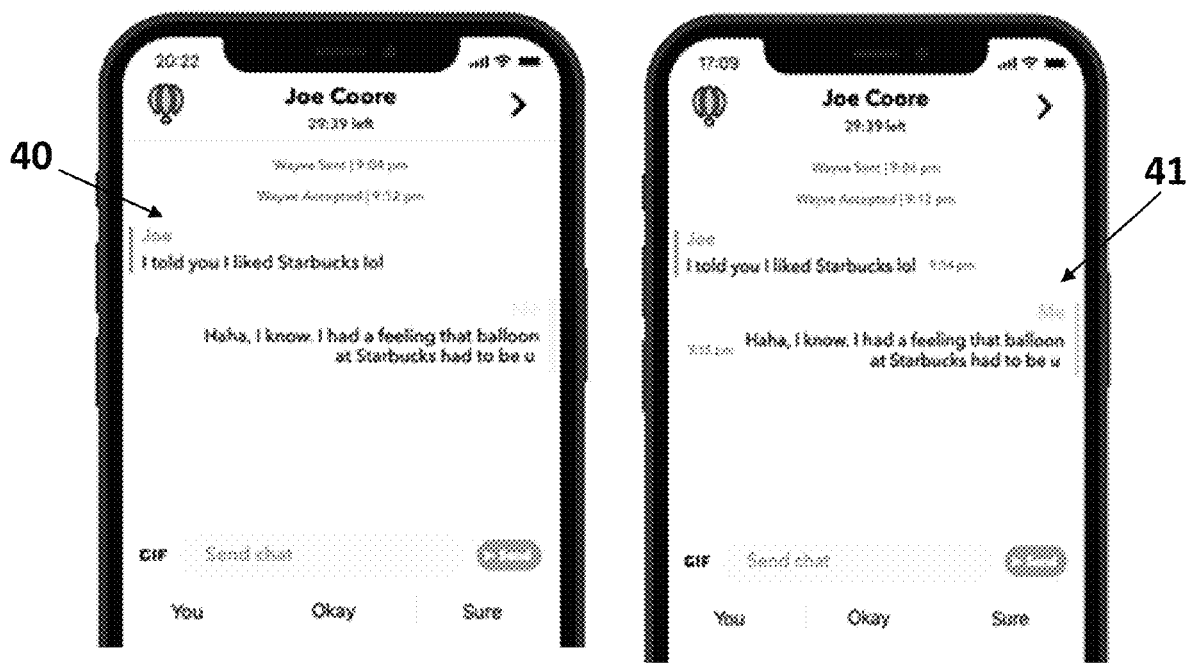
FIG. 6A  FIG. 6B
FIG. 6C

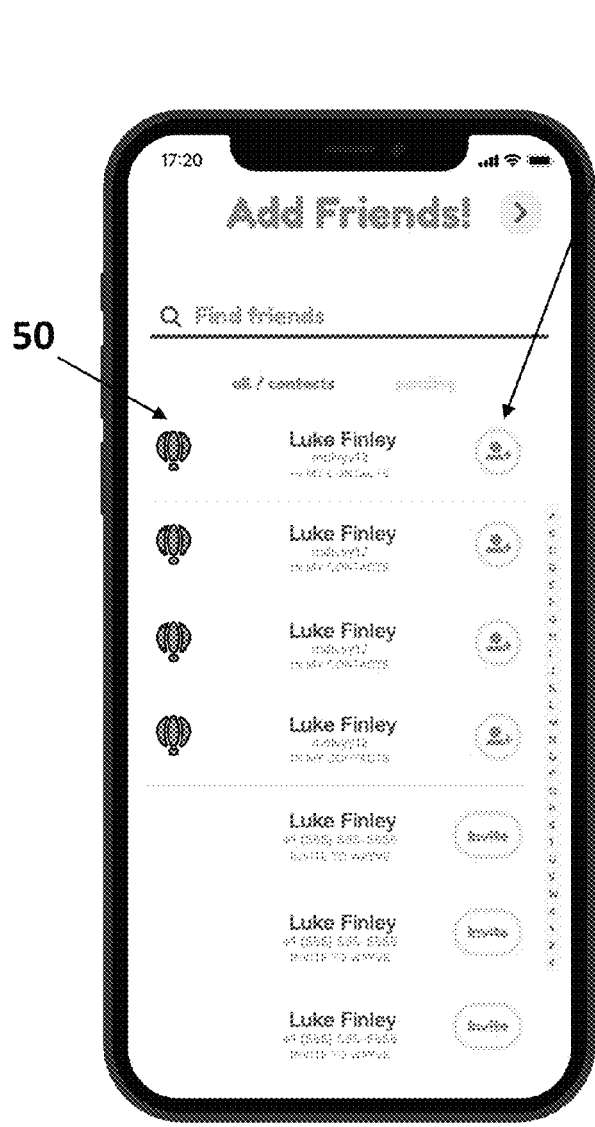
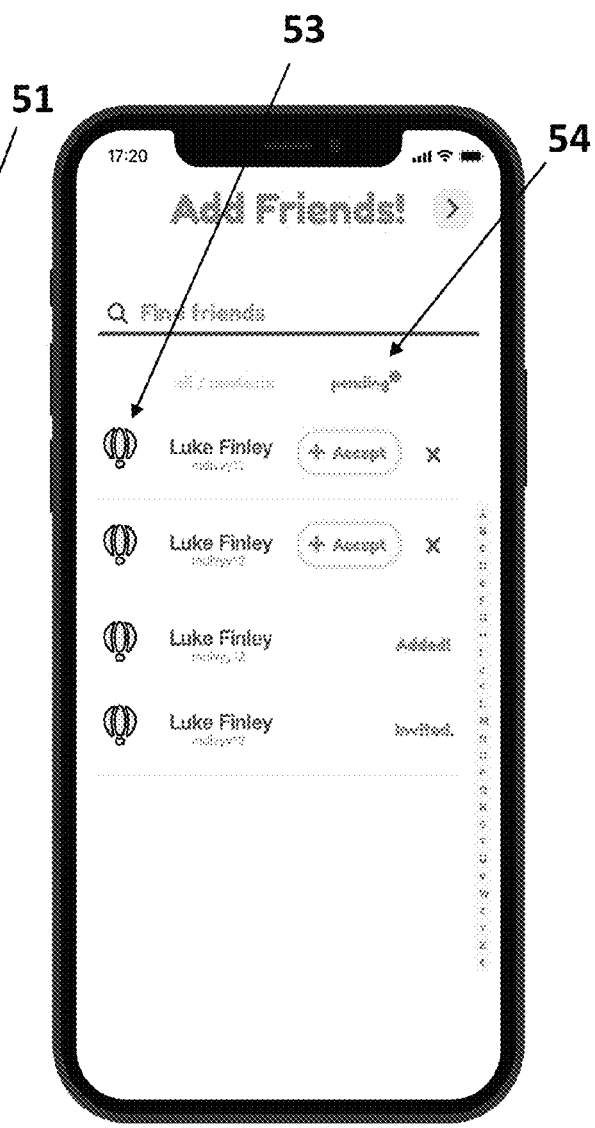
FIG. 7A          FIG. 7B

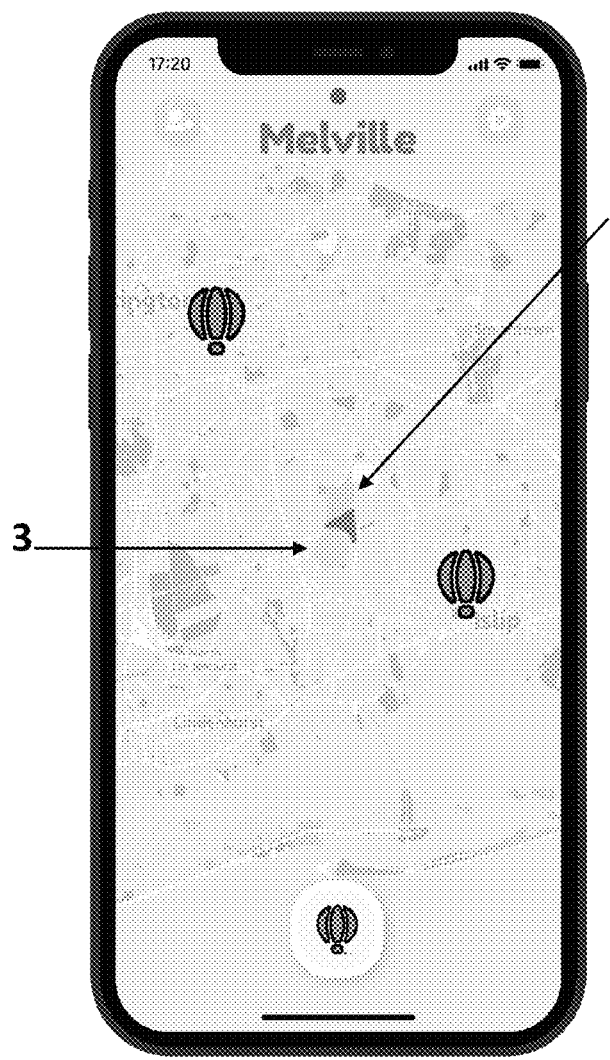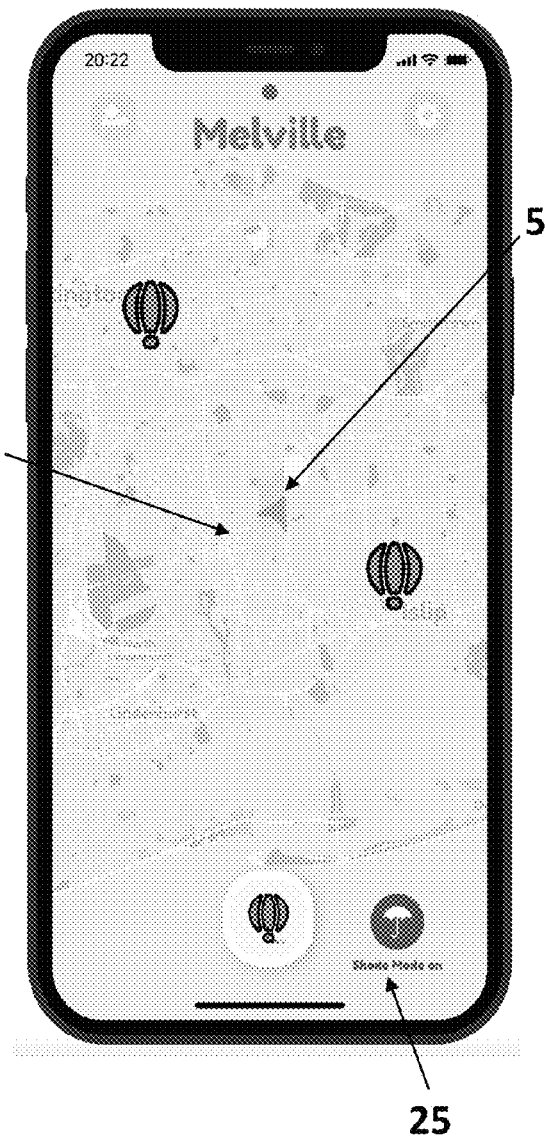
FIG. 10A  FIG. 10B

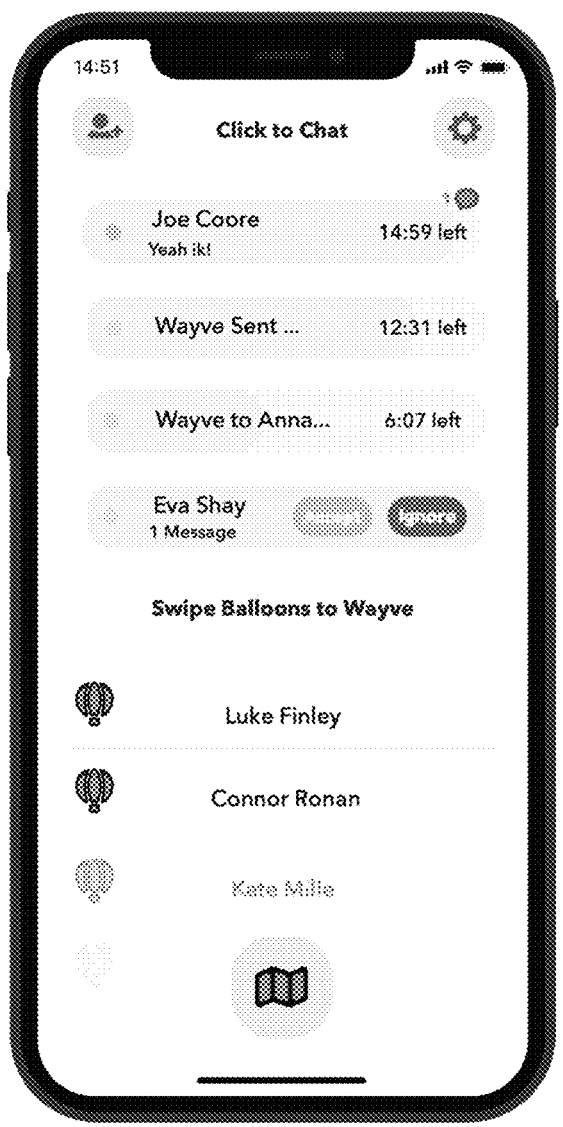
FIG. 11A    FIG. 11B

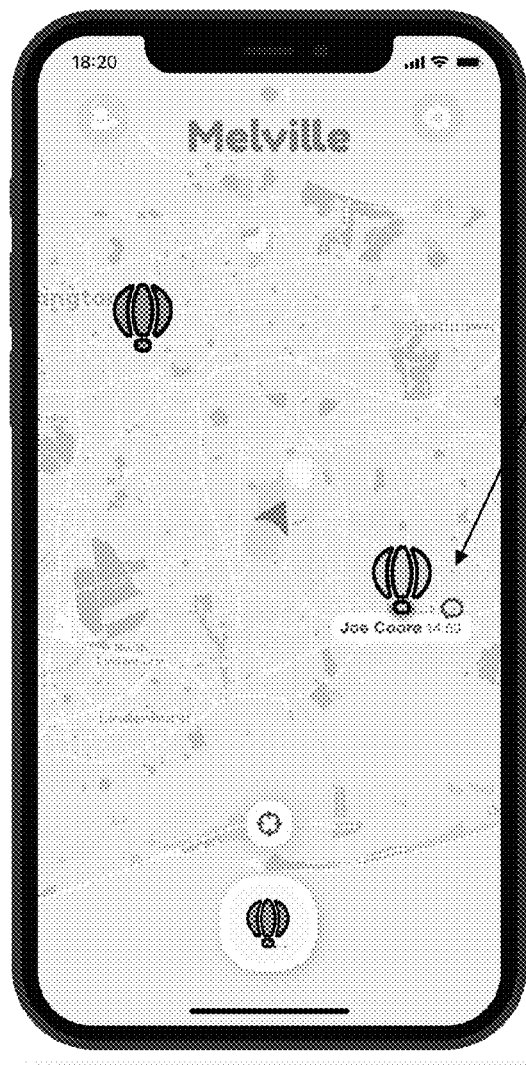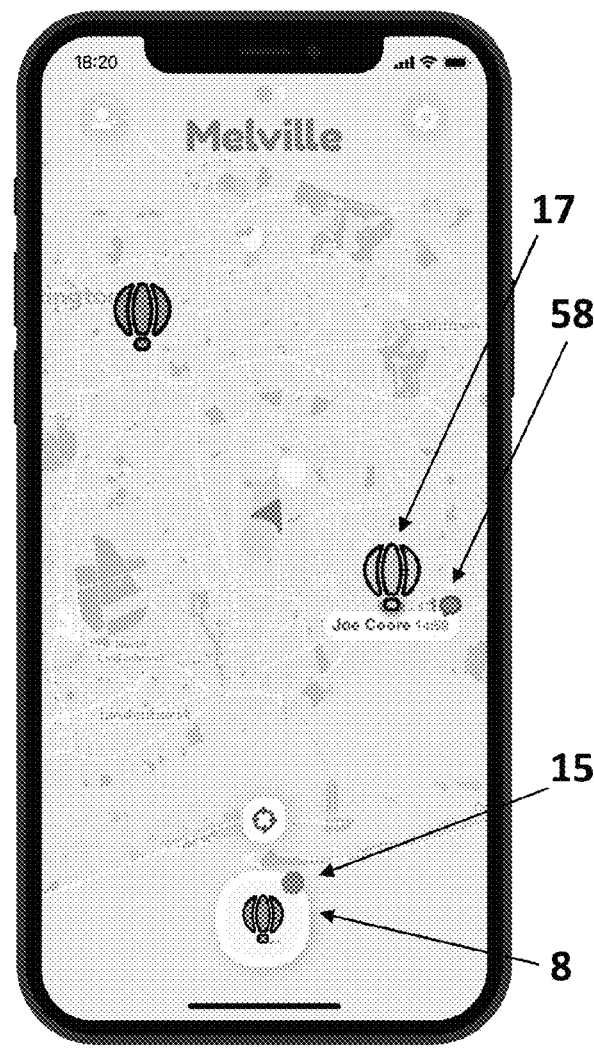
FIG. 13A  FIG. 13B

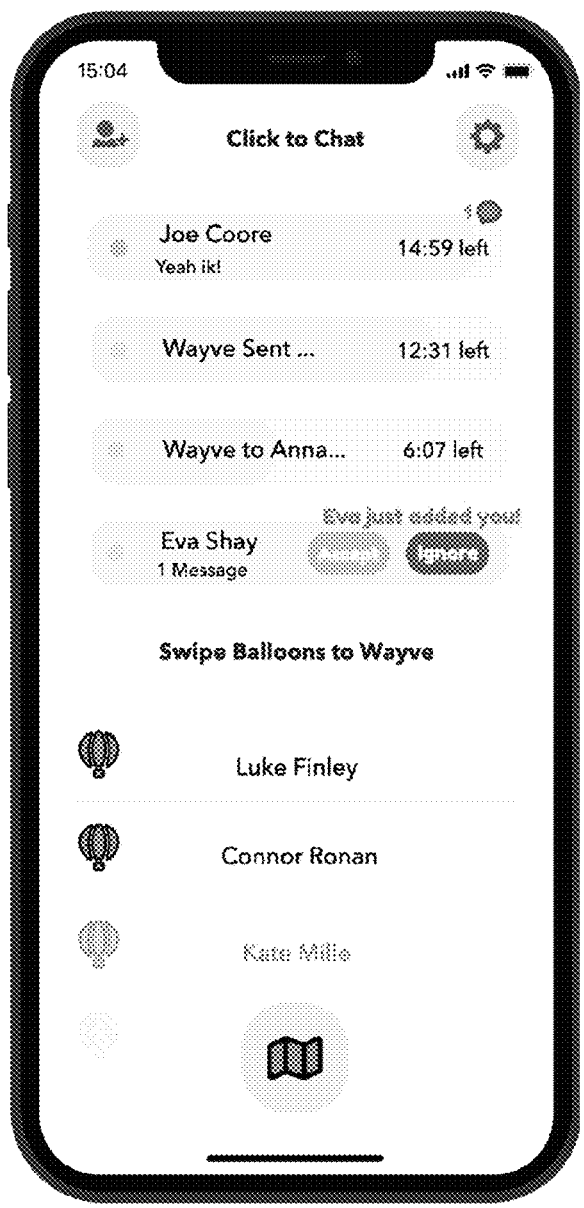
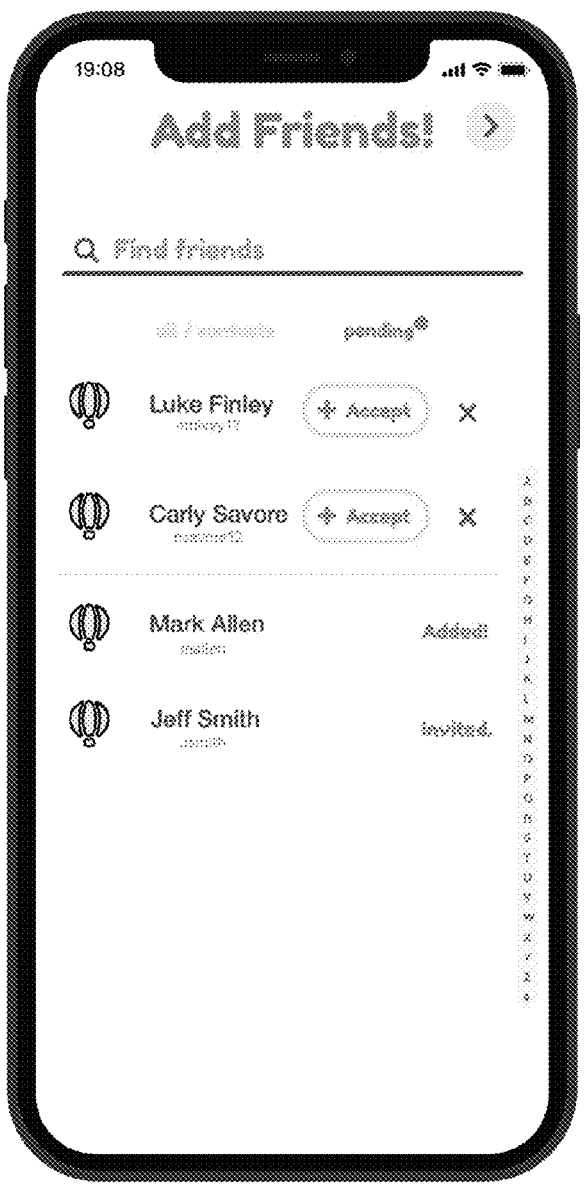
FIG. 15A  FIG. 15B

Step 2: Communicate within the "Flow"
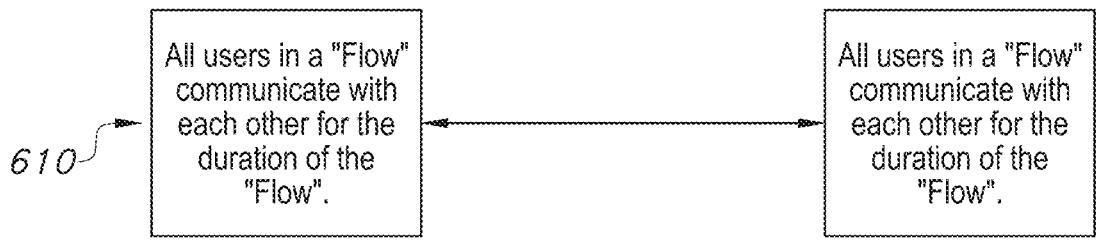
Step 3: User termination of the "Wayve"
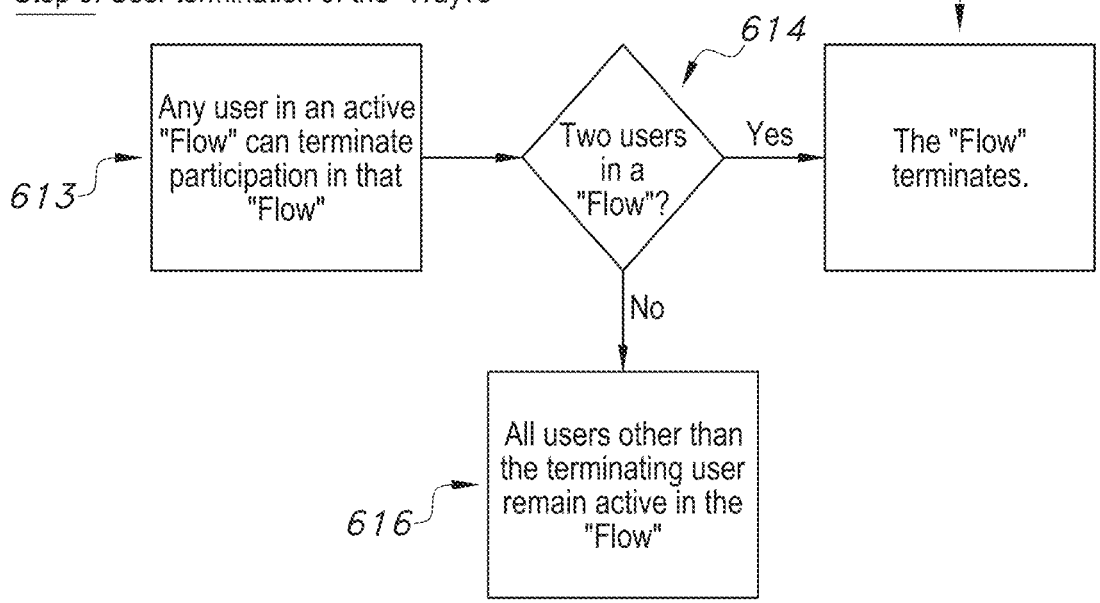
FIG. 21B

SYSTEM AND METHOD ASSOCIATED WITH CALIBRATED INFORMATION SHARING USING WAVE DYNAMIC COMMUNICATION PROTOCOL IN AN EPHEMERAL CONTENT-BASED PLATFORM

CROSS-REFERENCE TO RELATED APPLICATION(S)

The present U.S. non-provisional application claims the benefit of U.S. Provisional Application No. 63/179,733, filed on Apr. 26, 2021, the specification of which is incorporated by reference herein, in its entirety for all purposes.

FIELD OF THE APPLICATION

The disclosed subject matter relates to a novel system and method for conditionally-based veiled and/or calibrated information sharing at various refined levels in social networking, direct messaging, and/or other computing environments that implement wave dynamic communication protocol (WDCP) and/or an ephemeral content based platform.

BACKGROUND

Location sharing apps for mobile devices are a popular way to locate friends and family and interact with other people. There are standalone location sharing apps such as Find My Friends and GeoZilla, as well as location sharing features within other applications such as Google and Apple Maps.

Existing systems for location sharing generally allow users to connect to one another, typically via request and accept methods, and subsequently "track" each other's locations and identities simultaneously, such as with a user-identifying map marker. In such open-identity location systems, when users deactivate their tracking features, the systems stop sharing both location and identity.

Moreover, social media applications (apps) such as Facebook®, and LinkedIn®, allow users to post information and share with selected other users. Users may 'check-in' at locations, and seek to determine who is located near them based on the other user(s)' post(s). However, such user(s) have no means to see where the other users are relative to them on a map. Some social media connection apps allow users to communicate with people who are near them, but can only surmise that the person is near because the app connects only users who are within a predetermined range. For users who are trying to connect with other users, and to see what other users are around them, the ability to use a map that shows that information is likely invaluable. Similarly, it would be convenient for users to selectively remove themselves from other users' views, by blocking them, or becoming anonymous or invisible. Current applications that address these kinds of communications are limited in scope in that they are proximity-based systems, geographically limited in scope of usage and have limitations in the kinds of social wave interactions including levels of privacy that one can agree to prior to engaging with another user or set of users. It is desirable to refine social users comfort levels in engaging with and/or expanding the social boundary of communications as and/or when they deem fit. It is further desirable to agree to various levels of social interaction and agree to more refined levels of social interactions using for example, novel "wayve" or "wave" type communications that may be ephemeral-based and/or in certain embodiments, conditionally-based. The ability to expand one's wave of social interactions and scope of coverage is further desirable and lacking in present applications.

Existing apparatuses and standard forms of location sharing between friends proves itself to be an intrusive, and uncomfortable form of communication. A user's location is either "On" or "off", there is no in-between. This leaves the question, "How do we create a location sharing based software when most people are uncomfortable with sharing their location?". For example, existing Snapmap is usable, but it is either "on or off". When it's off, it renders itself a non-useful and intrusive product, and when it's on, provides or divulges your/a user's location to everyone, sparking the feeling, sense or perception of intrusion. Therefore, it is desirable to implement a system and method where users can comfortably share their location and communicate. It is further desirable to implement a Wave Dynamic Communication Protocol (WDCP), in which users may establish dynamic flows of communication over a mapped layout, with each user beginning as an anonymous "marker" on the map. It is further desirable to implement such a WDCP in which in embodiments, the user's location is still being shared however the identity of the user is not (yet) displayed. It is further desirable to implement a system and method in which another friend would have to send a protocol request to the user, in order to reveal the identity of the anonymous user and to enter the flow/protocol. Once the user accepts, they are both entered into a flow of communication that lasts for a dynamic period of time. Once the timer expires the flow terminates along with all of its contents.

It is further desirable to implement the novel WDCP system and method such that users can easily & comfortably gain access to their friend(s)' locations and communicate without having to worry about the possibility of being intrusively, unknowingly or otherwise "tracked". Since the current systems and methods of location sharing and communication over a mapped layout is so standard/basic in their functionality, it leaves no room for users to explore the novel creative world of WDCP. Using the novel WDC protocol, friends can communicate in the way that they desired but were not permitted to do with existing social media applications.

It is further desirable to implement a system and method that facilitates the ability of a user to meet up and/or communicate with someone using the application, but the user may not (in some cases) want to communicate via texting or SMS. It is further desirable to implement a system and method in which the user can send protocol requests to the anonymous friends on the user's map, with the expectation that one of these anonymous (mystery) map markers is the user that the user wishes to communicate with. The user may also send you/a user a protocol request when the user is just trying to determine what friends are around them or even in a different geographic region, not necessarily limited to proximity and without the hindered perception of actually being tracked.

It is further desirable to implement a system and method in which all of your friends' identities are not revealed on the map. In such system and method, there are one or more identical looking map markers as anonymous user. Therefore, sending out protocol requests is almost impersonal and hence, each request received creates and fosters a social media atmosphere with more positive vibes, and users can engage in positive communication(s) without wondering why a user sent a request to them, and using the WDCP platform.

Hence, it is further desirable to implement a system and method that provides new methods via a novel social media platform, for users to send anonymous requests, locate, identify, and/or communicate and virtually socialize with one another for example, by sending anonymous "identity requests." It is further desirable to implement a system and method in which users can securely share their location with their friends (e.g., via a mapped layout) without revealing their identity at least initially, unless they choose to do so or when they otherwise so decide. It is yet further desirable to implement a system and method in which any user's friends/connections can first request anonymous map markers (i.e., their friends) and to which the friend receiving the identity request, can then accept if or when they so decide. At times, a revelation of identity takes some time for a user to accept and for whatever personal reason to which such desired system and method, is adapted to handle that particularized timing of such communications based on the personal reason or selection of a user, and provides the user with such option(s). Once accepted, such a system and method permits the users to reveal and hence, see the identity/(ies) of the other user(s) and wave-chat. Hence, it is desired to implement such a system and method that provides users with the ability to securely share their location without automatically sharing their identity thereby providing privacy, security, and comfort to the users of such wave-based platform.

Yet, it is further desirable to implement a system and method that includes a hidden-identity location sharing system that allows users to share their location without automatically sharing their identity, and likewise to stop sharing their identity while not automatically stopping or ending their location sharing, and further communicate on an ephemeral based content platform that support novel social "wave(s)", "wavye(s)", wave-like, wave signals, wave-chat(s) balloon-wave, and/or wave-greeting(s) type requests and/or other more engaged wave-based communications using a dynamic wave communication protocol-based platform that supports tailored wave-like ephemeral communications.

SUMMARY

The purpose and advantages of the disclosed subject matter are set forth in the following description and appended drawings.

In accordance with an embodiment or aspect, the present technology is directed to an ephemeral content distribution system associated with exchanging calibrated communications using a wave dynamic communication protocol based at least on a current wave-state of a user. The present technology is also directed to a method of exchanging calibrated communications using a wave dynamic communication protocol based at least on a current wave-state of a user. The system and method comprises a wave dynamic communication engine or device including a processing device.

In accordance with an embodiment or aspect, disclosed is the system and method that comprises the processing device perform operations that include transmitting a wave-based request for wave dynamic communications associated with a first user. The system and method further comprises processing wave-geographic information associated with a bounded geographical region based on a wave-state of a second user that received the wave-based request. The system and method further comprises processing wave-identity information associated with the wave-state of the second user. The system and method yet further comprises receiving a response of the second user to the wave-based request in accordance with the wave-state of the second user.

The system and method yet further comprises facilitating an exchange of the calibrated communications between the first and the second user based on the wave-identity of the second user using the wave dynamic communication protocol associated with discrete epochs of the calibrated communications in the ephemeral content distribution platform or system.

In yet a further disclosed embodiment, the system and method further comprises exchanging calibrated communications associated with a modified wave-identity of the second user. The system and method includes additional embodiments, which are provided herein below respectively. The system and method further comprises exchanging calibrated communications associated with modified wave-geographic information of the second user. The system and method yet further comprises exchanging calibrated communications among a plurality of users associated with a plurality of wave-states in the ephemeral content distribution system. The system and method yet further comprises exchanging calibrated communications among a plurality of users associated with a modified wave-identity state for one or more of the plurality of users in the ephemeral content distribution system.

The system and method yet further comprises exchanging calibrated communications among a plurality of users associated with a plurality of wave-geographic information for each of the plurality of users in the ephemeral content distribution system. The system and method yet further exchanging calibrated communications including actual geographic location information associated with the second user based on the wave-state of the second user in the ephemeral content distribution system. The system and method yet further comprises exchanging calibrated communications including actual identity information associated with the second user based on the wave-state of the second user in the ephemeral content distribution system. The system and method yet further comprises exchanging calibrated communications between the first and second user based on discrete epochs of content in the ephemeral content distribution system.

In accordance with yet another disclosed embodiment, a computer readable device is disclosed storing instructions that, when executed by a processing device, performs various operations. The operations include transmitting a wave-based request for wave dynamic communications associated with a first user. The operations yet further include processing wave-geographic information associated with a bounded geographical region based on a wave-state of a second user that received the wave-based request. The operations yet further include processing wave-identity information associated with the wave-state of the second user. The operations yet further include receiving a response of the second user to the wave-based request in accordance with the wave-state of the second user. Finally, the operations include facilitating an exchange of the calibrated communications between the first and the second user based on the wave-identity of the second user using a wave dynamic communication protocol associated with discrete epochs of the calibrated communications in an ephemeral content distribution platform.

These and other purposes, goals and advantages of the present application will become apparent from the following detailed description read in connection with the accompanying drawings.

BRIEF DESCRIPTION OF THE DRAWINGS

The patent or patent application file contains at least one drawing executed in color. Copies of this patent application or patent application publication with color drawing(s) will be provided by the U.S. Patent and Trademark Office upon request and payment of the necessary fee. Some embodiments or aspects are illustrated by way of example and not limitation in the figures of the accompanying drawings in which:

FIG. 1A-1E show exemplary onboarding screenshots in accordance with an embodiment of the disclosed system and method.

FIGS. 1F-1M show exemplary screenshots of account setup and login features in accordance with an embodiment of the disclosed system and method.

FIGS. 2A-2B show an exemplary screenshots of an identity request feature in a mapped layout in accordance with an embodiment of the disclosed system and method.

FIGS. 3A-B show exemplary screenshots of a location sharing feature in a mapped layout in accordance with an embodiment of the disclosed system and method.

FIGS. 4A-4B show exemplary screenshots of a friends page feature as implemented via a wayves page as shown in FIGS. 5A-5B, in accordance with an embodiment of the disclosed system and method.

FIGS. 5A-5B show exemplary screenshots of a wayves page feature implemented in accordance with an embodiment of the disclosed system and method.

FIGS. 6A-6E show exemplary screenshots of a direct messaging feature implemented in accordance with an embodiment of the disclosed system and method.

FIGS. 7A-7B show exemplary screenshots of an add friends feature, including distinguishing features of "added" and "invited", in accordance with an embodiment of the disclosed system and method.

FIGS. 10A-10B show exemplary screenshots of a shade mode map feature, in accordance with an embodiment of the disclosed system and method.

FIGS. 11A-11B show an exemplary embodiment of an alternative mapped layout, in accordance with an embodiment of the disclosed system and method.

FIGS. 13A-13B, show exemplary screenshots of indicators of incoming message(s) received by a second user, when sent from a first user, Joe, in accordance with an embodiment of the disclosed system and method.

FIGS. 15A-15B, show exemplary screenshots of various message thread indicators during an active, anonymous, and/or pending wave dynamic protocol communication state, and examples showing options to accept, ignore. "idle state to add friends" and/or "remove friend", in accordance with an embodiment of the disclosed system and method.

FIGS. 21A-C is a flowchart illustration providing an overview of the wave dynamic communication protocol with related processes and/or wayve states, including associated access to ephemeral content subject to discrete epochs of time, in accordance with an embodiment of the disclosed system and method.

Figure 1A:
Figure 1B:
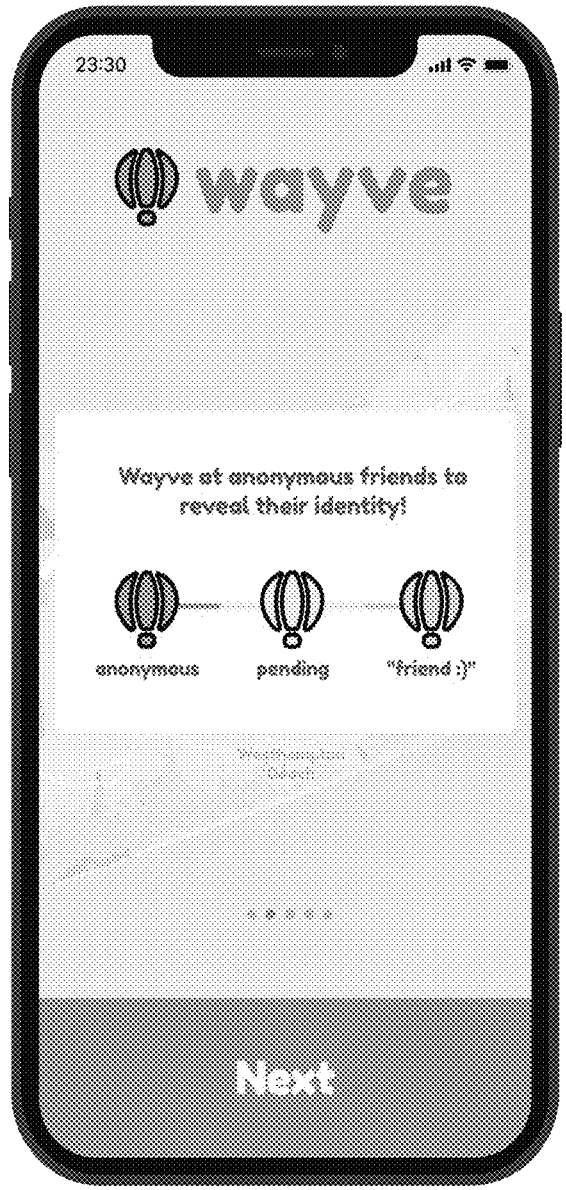
Figure 1E:
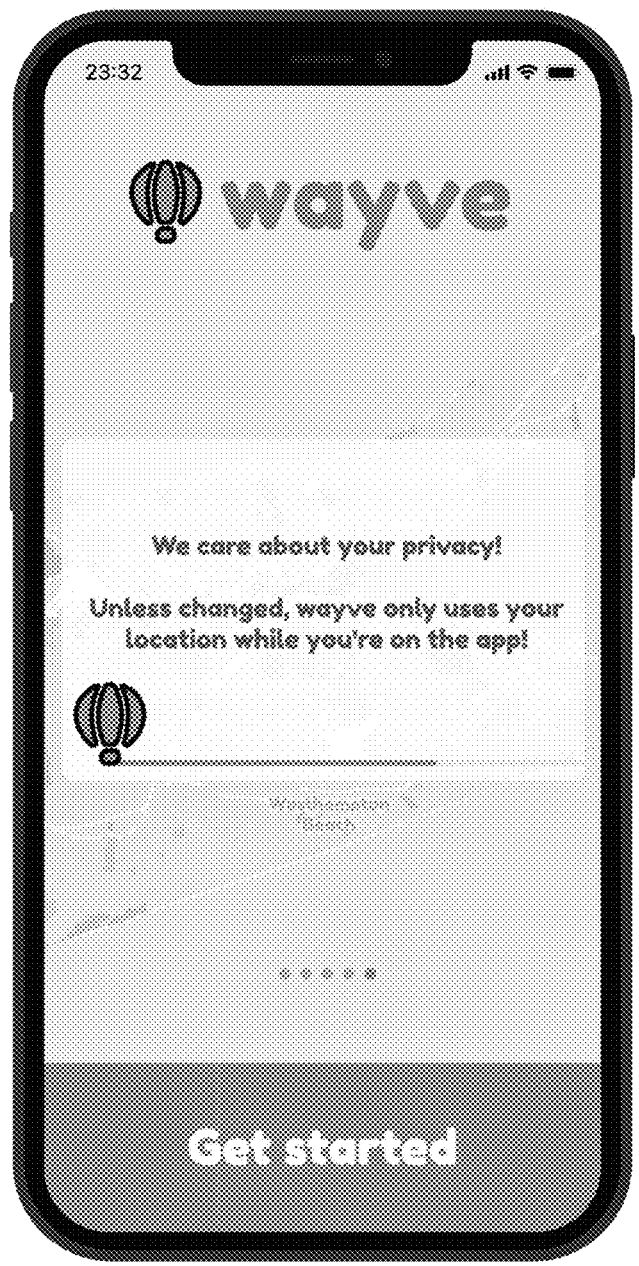
Figure 1F:
Figure 1G:
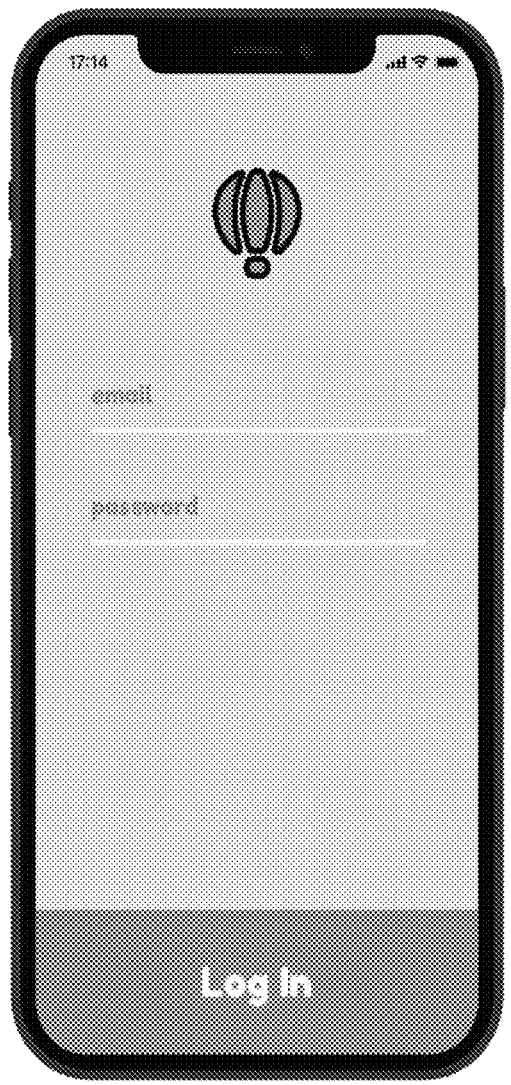
Figure 1H:
Figure 1I:

It is to be appreciated that elements in the figures are illustrated for simplicity and clarity. Common but well-understood elements, which may be useful or necessary in a commercially feasible embodiment, are not necessarily shown in order to facilitate a less hindered view of the illustrated embodiments.

DETAILED DESCRIPTION

In the following description, for the purposes of explanation, numerous specific details are set forth in order to provide a thorough understanding of example embodiments or aspects. It will be evident, however, to one skilled in the art, that an example embodiment may be practiced without all of the disclosed specific details.

The system and methods disclosed herein may be used for hidden-identity location sharing, including in social networking and instant messaging environments, on a mobile communication device, other computing device, engine or processor-based system or device.

In accordance with the above-described desired system and method, the disclosed system and method addresses issues that social media face with existing applications. Many users at times may want to know who may be close by or perhaps, is in a certain location (eg. mall, restaurant, store, etc.) or geographical area (i.e. outside of the country) while maintaining one's identity private and/or forego location sharing, at least temporarily.

Existing systems and methods, known or standard forms of location sharing between friends can be or has proven to be in certain circumstances an intrusive and/or uncomfortable form of communication. A user's location may be set to either "on" or "off", and there is generally no grey or hybrid form of communication with respect to guarding one's privacy of information. The disclosed system and method are directed to a novel location sharing based software especially in circumstances when generally, a majority of users would be or are uncomfortable with sharing their location. For example, Snapmap is usable, but it is set either "on or off". When it's set to off, it renders itself a non-useful and at time, even intrusive service, and when it's set to "on", it divulges your location to everyone, sparking the feeling, sense or at least the perception to users, of intrusion.

Hence, there is a desire for a novel system and method in which users can comfortably share their location and communicate. In accordance with an embodiment of the disclosed system and method, using the Wave Dynamic Communication Protocol (WDCP), users may establish dynamic flows of communication over a mapped or other regional/locale based layout. In certain aspects or embodiments, each user begins as an anonymous "marker" on the map. It is noted that the user's location may still being shared, however the identity of the user is not (at least yet or at the outset) displayed or known to other user(s). In an embodiment, one or more other friends would send a protocol request to the user in order to reveal the identity of the anonymous user and to enter the flow/protocol using the WDCP. If the user accepts, they are both entered into a flow of communication that lasts for a dynamic period of time. Once the timer expires for the ephemeral-based communication, the flow terminates along with all of its contents.

In certain embodiments, users may wish to find and chat with a specific friend. Using WDCP users may also send protocol requests in which they can specifically select individual friends via for example, a friends list. In certain embodiments, the WDCP is not limited to anonymity and users can also send protocol requests to specific friends. One method implements for example BAPR (Being Anonymous Protocol Requests) for fun and comfort, and the other mode is BSPR (Being Specified Protocol Requests) used for fun, comfort, and any specific interest in talking with a specific friend.

In accordance with the WDCP system and method, users can easily & comfortably gain access to their friends' locations and communicate without having to worry about the possibility of being intrusively, unknowingly, or unwillingly "Tracked" by others, using known social media platforms. Since the known systems and method associated with location sharing and communication over a mapped layout is generally considered standard/basic in such social media platforms, there generally is left no room for users to explore a more refined and creative world of social media interactions. The disclosed system and method associated with WDCP communications is directed to refined, creative and hybrid form of social media interactions that are not conventional to such known social media platforms. In certain aspects or embodiments, friends or users can communicate in the way that they always wanted but never were able to depending upon their desired level of communications and privacy at a certain moment in time.

For example, many possible "Meetup" situations are passed up on simply because users implementing known systems and methods decide to keep their location "off" and further, they are depending on others to keep their locations "on". Often when this is the case, it creates and snowballs into a situation where everyone turns their location "off" hoping that the next person will have their location "on". This produces a potential "stalker-like" mentality or perception between and among users, which may to lead to the downside of social media communications, i.e. potentially toxic and undesired behavior and/or communications, which are often not intended as such. Therefore, in accordance with an embodiment of the disclosed system and method, users are able to communicate dynamically, on a more refined level or caliber of wave dynamic communication protocol social media communications. In certain aspects or embodiments this includes sending conditionally-based communications, and/or a graduated or calibrated revelation of one's identity and/or other calibrated information sharing. Since a user generally can begin as an anonymous user on the map, users will be inclined to keep their location on, when they otherwise would be inclined to not keep location sharing feature in "on" mode. Hence, this creates and facilitates a positive environment in which users will be able to send out protocol requests in accordance with their comfort level, and in order to start a dynamically timed location sharing session. In addition, the users can progress in accordance with the social calibration states, and eventually reveal the user's identity while sending calibrated information communications for the duration of the flow/protocol. As mentioned above, when the flow terminates, all of the associated content in such WDCP protocol will also terminate with it. This is designed to enable and facilitate a user's comfort level while location or other information sharing in a calibrated "social media state" in accordance with an embodiment of the disclosed system and method.

It is noted that users are generally and naturally more comfortable when such communications are not permanent, hence users will be more inclined to communicate on such social media platform with greater integrity of social communications and in accordance with their desired comfort level. Essentially, the calibrated social states of the disclosed system and method mimics a natural human to human interaction which usually includes a mystery factor when not initially knowing a person very well. Mystery/curiosity has been a driver for the human brain since the beginning of time. Because of this, the user will naturally want to know which friend might be nearby (or perhaps in another geographical region or locality) when the user finds the anonymous map marker. In accordance with an embodiment of the disclosed system and method, the user can simply send a protocol request and easily get in-touch/communicate with your "friend" more comfortably or when one is ready to reveal their social state and hence, calibrated level of identity. The disclosed system and method are directed to facilitating both a fun and mysterious form of social media communication that provides greater confidence and overall positivity to users thereof while avoiding general social media pitfalls.

As an example, if there is a person that you/a user wants to meet up and/or communicate with, you/a user may not (in some cases) want to text them directly. However, with the WDCP platform, a user can send protocol requests to the anonymous friends on the map, anticipating or hoping that one of these anonymous (i.e., mystery) map markers is the person they wish to communicate with. It also works in reverse as well. The requesting user can also send you (i.e., the requested user) a protocol request when that requesting user is just trying to determine which friends are around them. In such case, you (i.e., the requested user) can then accept the request, commence a conversation, and see where it goes from there!)

Even though studies show that users are generally not fond of snapmap, users still implement such feature every day and commonly. While users enjoy the concept of connecting with their friends via a map so much to the point where they're willing to sacrifice their comfort level to use the software and communicate, the disclosed system and method addresses any such issues in a novel platform. Users generally have no other options since it's the only basic social media platform with tracking software included but, limited to stringent "On" & "Off" modes with respect to location tracking. However, an avid user of such social media platforms understand that tracking is one common variable of these known social media platforms, that are preventing them from growing and reaping the reward and benefits of engaging in social media communications via such known platforms. Essentially many potential users will not location share since they do not want to be tracked.

Hence, in accordance with the WDCP platform, the human mystery factor as specified previously is present, and your friends' identities are not revealed on the map at least not at the outset of such calibrated social media communications. The user begins with one or even many identical looking map markers. Such map markers for example, can be in the form of an icon, such as a balloon or other contemplated symbolic icon. This WDCP platform permits transmitting of a requesting user protocol requests with an almost impersonal perception. There is no room for any user to second guess and permit negativity such as "Why did that person call me?". If the premise is based on no particular reason besides pure fun and possible coincidence, as such a request is only based on that premise since anonymous from the outset. With WDCP, each request received seems "lighter" and more "innocent" creating a positive atmosphere where users can engage in positive communication. Hence, the WDCP fosters a fun and effective social media platform with calibrated and veiled identity which is only revealed and to the degree a user desires to the requesting user. In certain aspects and embodiments, the first user/you may send WDCP Protocol Requests to other users visible on the first user's/your map, locality (or other desired region), can determine who has accepted such request, and then can implement the WDCP system and method to communicate with that second user for a dynamic period of time as such communications are ephemeral based.

FIGS. 1A-1E show an exemplary embodiment of on-boarding features, including screenshots of the disclosed system. A user will upon download of the application to his computing device (or mobile computing device), be presented with the on-boarding screens as shown in FIGS. 1A-1E. The user commences the session, using the dynamic wave communication protocol (DWCP) session, as anonymous. Once the user beings, it is noted in FIG. 1B, that the user can send a dynamic "wave" or "wayve" signal request to one or more "anonymous friends" in order to seek reveal their veiled identity. Once a friend accepts the wave request as shown in FIG. 1C, the user can then reveal their friend's identity, chat, and explore, in one or more active wave states as described in connections with FIGS. 21A-D. In FIG. 1D, an example onboarding screen indicates that the user does not or may not want to be shown on the map at all, and can choose to enter or has entered shade mode by selecting and enabling of the "Shade Mode" button feature shown. In an exemplary embodiment shown in FIG. 1E, the system indicates that the system will only use the user's location while using the application, in accordance with an embodiment of the disclosed dynamic wave communication protocol (DWCP) system and method.

FIGS. 1F-1M show an exemplary embodiment of account setup and login features of the disclosed subject matter including various screenshots advancing to various features of the application. A user may skip the phone number process, in which case the user will be directly in the mapped layout.

FIGS. 2A-2B show an exemplary identity request feature in a mapped layout shown in example screenshots. FIGS. 2A-B shows how the initial screen appears for all new users including user location on the map. The user icon is a small colored circle 3 (for example, light blue circle) with a colored pointer 5 (for example, an orange pointer) that swivels around depending on which specific direction the user is in. In this regard, the map marker associated with the user, is used to represent the user's current location and/or whereabouts. The map maker will be faded or dimmed when the user enters shade mode. This map marker 3 displays to the user that their location shown by direction arrow 5 is not being shown in their friend(s)' Maps along with the shade mode icon 25 as shown in FIG. 10B, which map marker 3 with directional arrow 5, will be faded or dimmed further than as shown in FIG. 10A, during such shade mode. (However, in accordance with an embodiment, only the user can see this specific icon, in the shown example). In certain embodiments, there may be one or alternatively, two anonymous balloons 4, 7 shown in FIG. 2A, on the map when a user begins or commences the wave session. The user must send identity requests to these one or more balloon(s) 4, 7 in order to find out who they are (for example, uncover their veiled identity). There is shown also a colored dot 1 (for example, a red dot) at the top of the screen in FIG. 2A, which indicates that the user is not involved in any wayves (and/or wave/dynamic protocol communications) and no one can actually see the user's location on their device or computing device as further described hereinbelow in FIGS. 21A-D.

For the purposes of the present disclosure, the term "wayve" or "wave" refers to an identity request (or alternatively, request to engage in wave communications with an anonymous friend or friend set in another wave state) in accordance with the wave dynamic protocol communication (WDCP) as described further hereinbelow. The home button (for example, balloon (8)) is shown in FIG. 2A, on the bottom of the screen as well as a re-center button 10. The re-center button 10, operates such that when the user scrolls away off the map or anywhere on their map, the user can quickly press this button to re-center the map back to their current location map marker shown as directional arrow 5.

As shown in FIG. 2B, in certain embodiments, a user clicks on or selects any colored (for example, orange) anonymous friend(s) balloon(s) 7, 4 on the map. The user is represented, for example, by a circular map marker icon 3 on FIGS. 2A-3B that includes a directional arrow 5. The selected balloon 9 enlarges to signify that the user has selected it. Next, the user swipes the small balloon located in the "swipe bar" 11 from left to right (for example, towards the lighter (for example, yellow) rightmost line portion) in order to send out to the selected balloon 9, a request (for example, a wayve, wave, wave-shake, wave-chat, wave-request, and/or identity request). When the user wayves to the friend, the friend is generally still anonymous at such point until they choose to accept the received wayve or wave request. The friend that received the wave will be able to see the name only of the person who waved at them in certain embodiments. Once the friend accepts the wave, they are then engaged in a wave or wayve request or exchange in accordance with the WDCP protocol. In certain embodiments, the user will not see strangers that the user does not know and are friends in the map. In certain aspects or embodiments, the user/you will see strangers you do not know and/or are not friends or otherwise, familiar with in the application.

In the shown example, the request has a duration of 15 minutes, which time is indicated on the map, below the swipe bar 11. When the user 3 wayves to a friend, that friend cannot yet identify the user's location (perhaps, just the user's identity/name), in an example embodiment. The "wayved at" user-friend 9 would first accept the user's wayve in order to determine or identify the user's location. The wayved at user-friend (eg. balloon 9) remains anonymous until that user so chooses to accept the received wave and even so, there are available options in certain embodiments, for calibrated user-states and hence, revelation of that user-friend's (balloon 9) full identity and/or other private information based on the user's comfort level associated with a privacy-level state (as described further in connection with FIGS. 21A-D).

The user-friend (balloon 9) that received the wave, will be able to see the name only of the user 3 who actually waved to them via the WDCP platform in example embodiments. Once the waved-at user 9 accepts, both user 3 and user balloon 9 can then engage in a wave communication associated with the WDCP based platform. Accordingly, in the WDCP system and method, if the user 3 sees, for example an "orange balloon" 4, 7 appear on the map display, this would indicate that the user 3 and the orange balloon(s) 4, 7 have been through the exchange of the friending process at some earlier point in time, in accordance with an embodiment. In certain embodiments, all balloons that are visible on the map are confirmed friends who's identities were not yet revealed until a wave request was sent, accepted, and the waved-at user-friend (i.e. balloon 9) accepted the request which would reveal their identity to user 3, placing both users into an active wave state as further shown and described in connection with FIGS. 21A-D hereinbelow. In other contemplated embodiments, the system can be configured so that a user may also see users who may not yet be confirmed friends. Also, the user's wavyes page button 8, shown in FIGS. 2A-3B, provides a means for the user 3 to navigate to the wayves page as shown and described in connection with FIG. 5A.

As shown in FIG. 3A, once the wayve (example, identity request) is sent by user 3 located at directional arrow 5, the orange balloon 9 in FIG. 2B, representing the waved friend (i.e., waved at previously in FIG. 2B), represented as the orange balloon 9, will change to a different color, for example, a yellow balloon 13, to indicate that it is pending/waiting for an acceptance of the wave request. The user is represented in FIG. 3A as user 3, in a direction (shown as directional arrow 5). Another anonymous "friend" is represented in FIG. 3A, as orange balloon 7. The dot 20 at the top of the screen in FIG. 3A, will change color for example, from red dot 1 in FIGS. 2A-2B, to yellow dot 20, corresponding with the status of presently pending wayve. A separate countdown timer begins once the wave request becomes pending and enters status of presently pending wayve (or wave) state. In the shown embodiment, the countdown timer is set at 15 minutes and begins to countdown to zero ("0") accordingly. However, other timers can be used and is shown below the user represented by yellow balloon 13. This shown time represents the "Pending Timer". This timer represents the duration that the request will stay valid (in the friend's inbox/wayves page). Once the timer expires, the request also expires/disappears. The waved user represented by yellow balloon 13, generally will choose to accept or ignore before the timer expires, as shown in example FIG. 3B.

Once the friend the user wayved at accepts the request, his or her balloon changes from yellow to green, as shown in example FIG. 3B, indicating that the wayve is accepted. The user 3 and the wavye friend, now represented by green balloon 17, can now see each other's locations and identities, if divulging such information is agreed to by user shown as Green balloon 17. More particularly, the user represented as green balloon 17 can also decide to divulge a calibrated set of information, dependent upon what level of privacy the user so chooses. Once the yellow balloon 13 turns to green, the dot 21 located at the top of the screen will also turn from a yellow dot 20 to green dot 21. Both the yellow 13 and green 17 balloons include respective time limits indicated thereunder, which symbolize how much time there exists before the wayve expires. The time limit in the shown example, is set at 15 minutes. It is noted that in certain embodiments, the countdown timer may be replaced or otherwise, replenished with the new desired time of the active wayve. In the shown embodiment, such time limit is 15 minutes. The pending timer will generally differ from the active timer.

Next, either user involved in the active wayve request, may now select (eg. click) the green balloon 17 to proceed to the direct messaging page to message each other (also referred to as the message thread), as further described below in FIGS. 6A-6C. The chat bubble 18 shown in FIG. 3B, appears next to the waved at friend's name (under the friend's active balloon shown as green balloon 17). When the user's friend sends the user a message that chat bubble 18 will light up and appear as another color, for example orange with the number of new unread messages appearing next to it. This is further described in connection with FIGS. 13A-B. When the user enters a message thread via the possible ways or methods, and reads the messages, the bubble 18 will no longer have the number affixed next to it or may be filled in solid color, for example, orange. This is essentially because the user has now read the messages. The orange dot 15 in FIG. 3B represents that a pending message is awaiting the user.

Turning next to FIGS. 4A-B, shown is embodiments of an exemplary friends section feature of wayves page as it may appear when the application (i.e. app) is first downloaded or otherwise initiated. The scenario here is a wayve has been sent to one of the "bots" as described below. The user 3 has not added any friends yet, so there are only two bots shown in the example, as placeholders. When there are no wayves, a wayve bubble, as shown for example, in FIG. 4A, will appear at the top to tell the user that with a red dot to symbolize that nothing is happening at that moment. In this example shown in FIG. 4A, when the wayve is sent to bot kevin, there is a wayve bubble that next appears (thereby replacing previous "no wayves now" wayve bubble) with a time limit and yellow dot, as shown in FIG. 4B. The bots are represented in example embodiments as a colored balloon (for eg. orange "anonymous" balloons) shown as bot Kevin and Bot Brett in FIGS. 4A-B. Such bots are anonymous, similar to the user's friends that also appear as anonymous balloons at the outset, at least.

In order to further protect users' privacy, the system may include smart bots that appear around any stray friends' balloons, and this is in accordance with the WDCP's system and method of using calibrated privacy states (i.e., wavestates as further described in example FIGS. 21A-D) in accordance with a user's comfort level when implementing the system. The smart bots are designed to keep anonymity between all wayve users. Examples of such smart bots are shown in FIGS. 4A-4B. The user may wayve to these bots when the app is first downloaded to test and learn the app's functionality. Under normal use (when the user has added their user's friends while using the application) the two bots may just surround any stray, singled-out balloons in order to keep that person's identity private. Bots blend in with the real friends. For example, the user may have a friend named, Mike who the user knows always goes to Starbucks every afternoon. If the user checks the user's map and notices a singled-out balloon at a Starbucks, the user will deduce that it probably has to be Mike. Although Mike's name/identity is not shown because Mike and the user are not in a wayve, the user can easily surmise that it is Mike because the user does know that Mike frequents a certain location. In order to prevent Mike from being so easily identified, two bot balloons will surround or be proximate to Mike's balloon, which will actually camouflage Mike's representative balloon.

FIGS. 5A-5B show an exemplary wayves page feature in accordance with certain aspects or embodiments of the present system and method. In the shown example of the wayves page in FIG. 5A, the user has friends and the app is in normal use. Joe Coore and the user are in an active wayve in bubble 30 and can see each other's location and/or chat with each other, which is also symbolized by the colored dot (eg. green dot) located next to and left side of his name. Underneath the Joe Coore wayve bubble 30, there is another bubble 31 that shows a wayve has been sent out to an anonymous person on the map and is marked with a pending color dot (for example, yellow dot). Underneath that "wavye sent" bubble 31, there is shown another third bubble 32 that shows a wayve has been sent to Anna and states "Wavye to Anna . . . ". Her name, Anna, appears then, because the user directly wayved at her from the friends section (located on the wayves page, for example in FIGS. 5A-5B). In the shown embodiment, the friends section is located at the lower half of the screen and below and indicates to the user, that the user can swipe the balloons to wayve to one or more of the friends listed below or the user can select or click on the directory icon, which is the shown home button in order to find other friends in the user's/your directory. In certain embodiments, such pending wave state is also marked with a color dot (for example, yellow or other color) to represent a pending dot. Below that third bubble, is shown a fourth bubble 33 that indicates the user's friend, Eva Shay is wayving at the user. The user can choose to accept or ignore this wayve. Each shown bubble includes a timer and once in action, the bubble will move up in rank, when in action or active status state rather than pending.

Figure 9A:
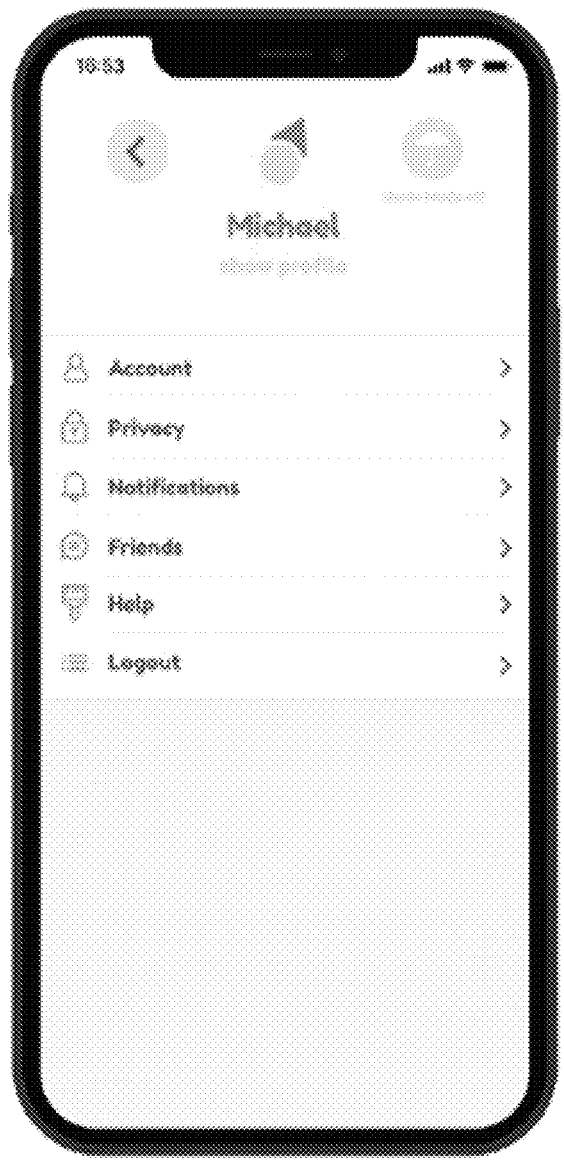
FIGS. 9A-9B show exemplary screenshots of a settings page including the shade mode setting feature, in accordance with an embodiment of the disclosed system and method.
Figure 9B:
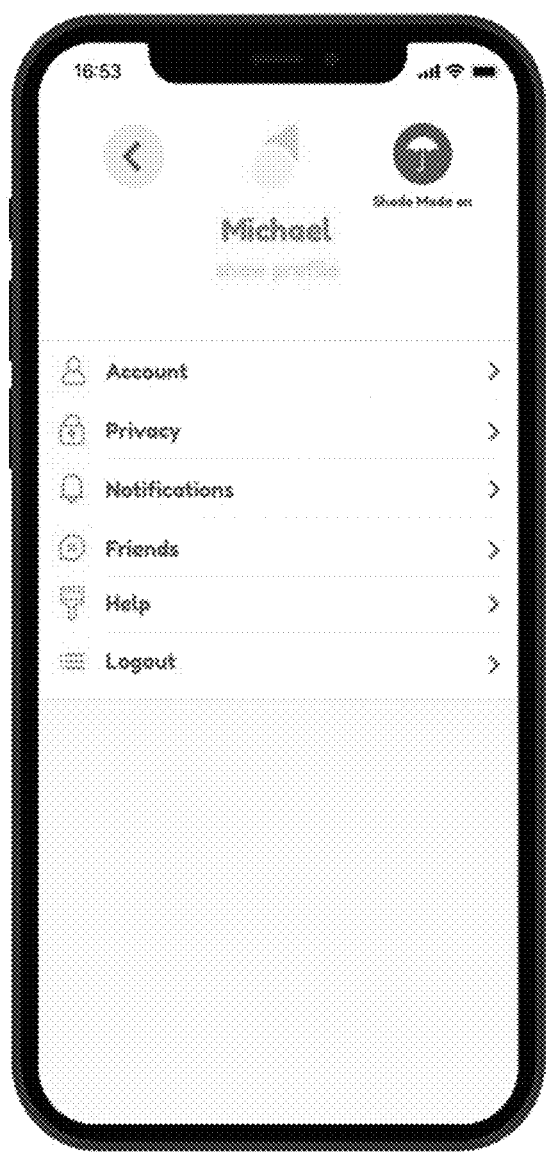
Figure 12A:
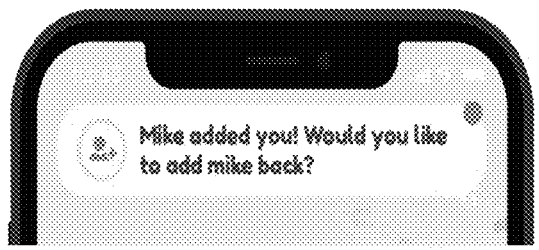
FIGS. 12A-12F show exemplary screenshots of in-app drop-down notifications to inform the user when "someone", another user, has sent a wave request or "waved" to a first user, in accordance with an embodiment of the disclosed system and method.
Figure 12B:
Figure 12C:
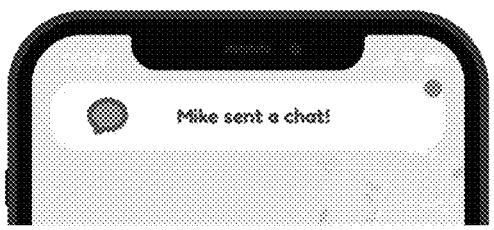
Figure 12D:
Figure 12E:
Figure 12F:

Further, in the shown example of FIG. 5A, there is no time limit shown to accept a wayve request (although one could be implemented and shown in the user's screen, in accordance with other embodiments). However, the bubble has a faint progress bar built into it. This progress bar represents the timer. There is shown in the example, a yellow pending dot next to the name 31 because the "waved at" user has not accepted the wave request as of yet. On the top right of Joe Coore's bubble 30, there is an empty message bubble 35 (shown in orange color) which signifies that the user can message him (and vice versa, in certain embodiments). The message bubble 34 (in the shown embodiment, the message bubble is the small bubble 34 located on the top-right of the wayve bubble 30 in orange color 34) can also be empty, which also symbolizes that there are no new messages from user, Joe. User Joe's last message will still appear in the "wayve" bubble 30. In the shown embodiment, the wayve bubble includes the name, progress bar, the timer and the last message sent/received. However, when user Joe sends a new message, that new message will be shown and the message bubble on the top right of the wayve bubble 34 will be filled in with a 1 next to it as shown next to bubble 34 in FIG. 5A. The user has to select or click on this message either on the wayve bubble 34 or message bubble 30 to go into the direct message thread, for example shown in FIGS. 6A-6C. Selecting or clicking the settings cog wheel 37 icon/button (for example, the icon may be an arrow, settings cog wheel 37 or other wheel) located in the top right of FIGS. 5A-5B, the system will transition the user directly back to the settings page(s), for example, as shown in FIGS. 9A-9B, in which wave privacy states and/or other privacy settings can be configured by the user depending on the calibrated wavestate the user prefers.

In other embodiments, clicking or selection of the map icon 38 will return the user to the map, for example FIGS. 2A-3B, depending on which wave-state the users are engaged in with other user(s). For example, if a user selects an active (for eg. green) balloon 17 on the map, the user will proceed into the message thread page shown for example in FIGS. 6A-6C. Then if the user selects/clicks the map button 38 located on the bottom center of the screen, the system will transition the user back to the map for example, as shown in FIGS. 2A-3B. However, in certain embodiments, if a user enters the message thread through the wayves page—for example, by selection/clicking a wayve bubble, the system will proceed back to the wayves page.

In FIG. 5B, the message bubble at the top right of Joe Coore's wayve bubble 30 is filled in and has a "1" next to it, which signifies that there is one new message from Joe. If user, Joe Coore had sent five (5) messages, then the number "5" will be indicated next to the message bubble. Furthermore, it is shown on the friends section (in the lower half of FIG. 5B) that the user can directly wayve to Luke Finley by swiping the balloon next to his name all the way into the yellow area of the line as shown in screen. When the user selects (or clicks) and starts to slide Luke's balloon, the wayve line appears as a red to yellow drag line 35.

FIGS. 6A-6C show an exemplary embodiment of a direct messaging feature of the disclosed subject matter. FIG. 6A shows a direct message thread between the user and Joe Coore. In the shown example, the name and timer still appears at the top of the screen, so the user is aware of how much time is left to actually see Joe's location and perhaps, message him. As shown in FIG. 6A, Joe has messaged the user and his message is indicated/noted with a colored line 40 (for eg., orange line) besides it or alternatively, beneath it. The user's message is transmitted as a certain color (for example, yellow) to symbolize that it is pending/sent and has not been read yet. If the signal is low and the message is having difficulty transmitting during a send request, the line of certain color (for example, yellow line) and text indicated for the sent message will appear dull/faded, until it is sent. In an embodiment, these lines which may appear in different colors, for example, both orange and yellow, only appear beside (or alternatively beneath) the most recent messages. Selection of the arrow in the top right will navigate the user back to the wayves page in certain embodiments.

As shown in FIG. 6B, continuing from FIG. 6A, the user's message now includes a line in color 41 (for example, green) besides it or alternatively, beneath it, which means that in the shown example, Joe has seen/read the user's message. Timestamps are also included with each message, when messages are sent or transmitted as shown in FIG. 6B.

Turning to FIG. 6C, when Joe is typing a message, his last message 43 (that would normally have a full colored (eg. orange) line will change and appear as a for example, three animated dots to the right of Joe's name 44 (or other suitable animation(s) or symbol(s) representing when the friend/user (i.e. Joe Coore in this embodiment) is typing a/an additional message. In certain embodiments, once the new message that Joe Coore has newly typed is sent, there will be a solid-colored line (for example, orange line 43) beside it or alternatively, beneath it. In certain embodiments, no line beneath (or besides) appears near the last sent last message, since it is no longer the most recent one.

In some embodiments, the user's friend's messages appear in a certain color, for example, orange from the user's point of view. From Joe's point of view, his messages are also for example, yellow and green and the user's messages are all orange for him. With the user's message, the user's last read message has a green line beneath it or besides it. The user's first message will have a green line besides it. Once the time limit/wayve duration expires, the wayve chat (direct messages and all messages sent within the timed session) will automatically be deleted. In some embodiments, the user is notified if any screenshots of the message chat have been taken by the other participant(s). Additionally, the system is configured to optionally prevent users from taking screenshots of the chat to ensure greater privacy in use thereof.

Figure 6D:
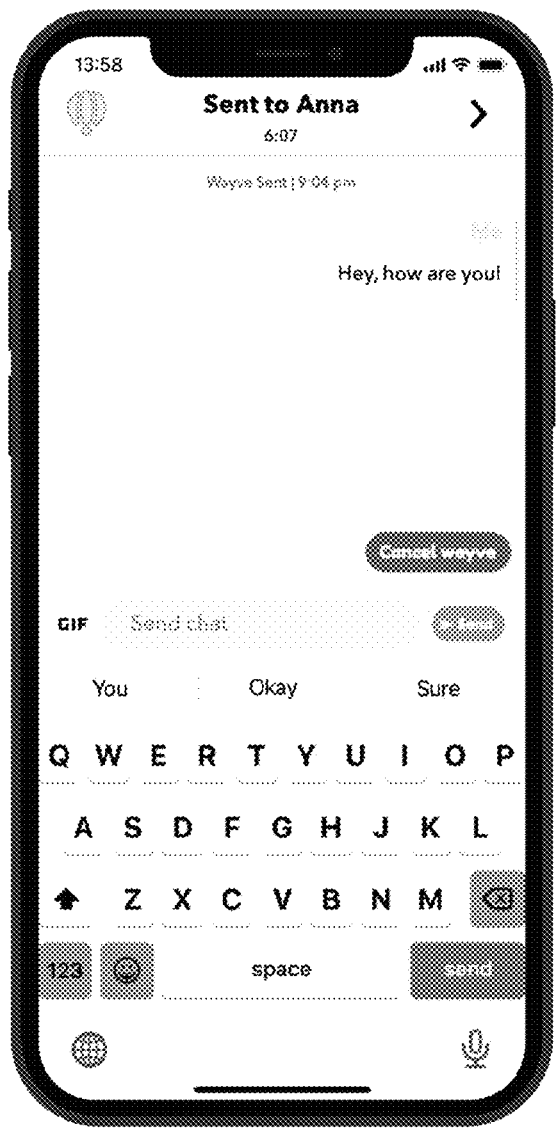
Figure 6E:
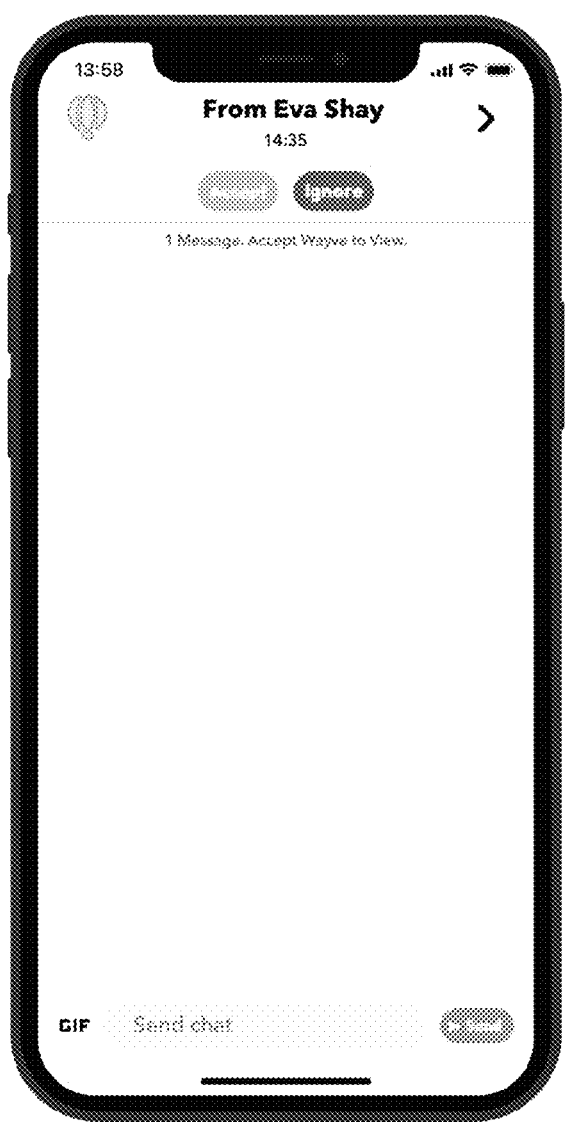

FIG. 6D shows how a user can enter a pending wayves message thread for the pending duration and preemptively send messages to the friend. This way the friend will see new messages coming in from a pending thread and may be inclined to accept the incoming wayve as seen for example, in FIG. 5B with "Eva Shay" (With "1 message" 33). Also note, in the pending wayve message thread of FIG. 6D, (in which the user sent the shown wayve out) the user can cancel the outgoing wayve as well as indicated by selection of "cancel wayve" button in FIG. 6D. Should the user enter a pending chat for the incoming wayve (prior to accepting it), such as the scenario shown in FIG. 5A, with the incoming wayve from Eva Shay with "1 message" 33, the user will then navigate to the screen shown in FIG. 6E. The user cannot see the specific contents of the message, however can see that they have "1 message" waiting for the user upon their acceptance of the wayve from Eva Shay. Once the user chooses to accept the wayve (either from the message thread screen shown in FIG. 6E or from the wayves page shown in FIG. 5A), the user can then view the message from Eva and can also send a message to Eva. In other embodiments, the pending message thread may be completely open for users to chat similar to the behavior of an active wayve. In addition, there would not be any location sharing. In this fashion, the users can carry out a full conversation before deciding if they want to engage in an active wayve and share their identities and/or location.

FIGS. 7A-7B show an exemplary embodiment of an add friends feature of the disclosed subject matter. In the example, "Luke Finley" and the username "mdivyy12" is used multiple times for illustration purposes. Embodiment of the system may have different friends' names and usernames.

As shown in FIG. 7A, there is a list or even a long list of friends that are in the user's contacts. Once a user base is built up there will be mutual friends to add. The app will have access to the user's contacts after the user enters the user's phone number in the sign-up process. If the user skipped that, a "please enter phone number to sync contacts" message may appear on this screen or in certain embodiments, appears on the settings page as shown for example, in FIG. 9A. In some embodiments, there is no need to enter phone number in order to sync contacts. Instead, there is a "would you like to sync contacts" permissions message that pops up when the user enters the add friends page for the first time. The people in the user's contact list that have accounts will appear first in alphabetical order as shown with the names with the balloons 50 (for example, orange balloons 50 appearing to the left of their names) and the add friend icon 51 to the right. The names are kept the same for this example but would be random names in normal app use. The username of the friend will also appear under their name. The people that do not have an account will have "invite" messages beneath their names as well as an invite button to the right of their name. If the user presses this, a text message will be sent out to that person in their contacts for them to get started with wayve. The user is also able to use a search bar to find specific usernames and more friends. It is noted that "added friends" feature refers to when a user "adds" a friend that already may have a wayve account in certain embodiments. The "invite" feature refers to when a user enters or navigates to the "add friends page" and selects a friend from their contacts list to invite to exchange communications using wayve, for example via a text message invite.

FIG. 7B shows an exemplary pending friend 54 requests section of the "add friends" page. This "add friends" feature will display the other users that have sent the user incoming friend requests, as well as other users that the user may have outgoing friend requests with. The balloons 53 to the left of the names are indicated in a color, yellow, for example, to signify that they are pending because the user has not yet accepted the incoming requests and the user's one outgoing request has not been accepted either in the shown FIG. 7B. Once the user accepts the two incoming requests, the balloons may switch to a different color, for example, green.

Once the user's outgoing request is accepted, the originally colored balloon 53, (for example, yellow balloon) will change and appear as a different color, (for example, green color as well). A small circle in another color (for example, an orange circle) will appear near the top right of the word "pending" 54, in order to signify that there are incoming friend requests. Once the request is accepted, it may disappear in certain embodiments, from the pending section since no longer in pending state.

Figure 8:
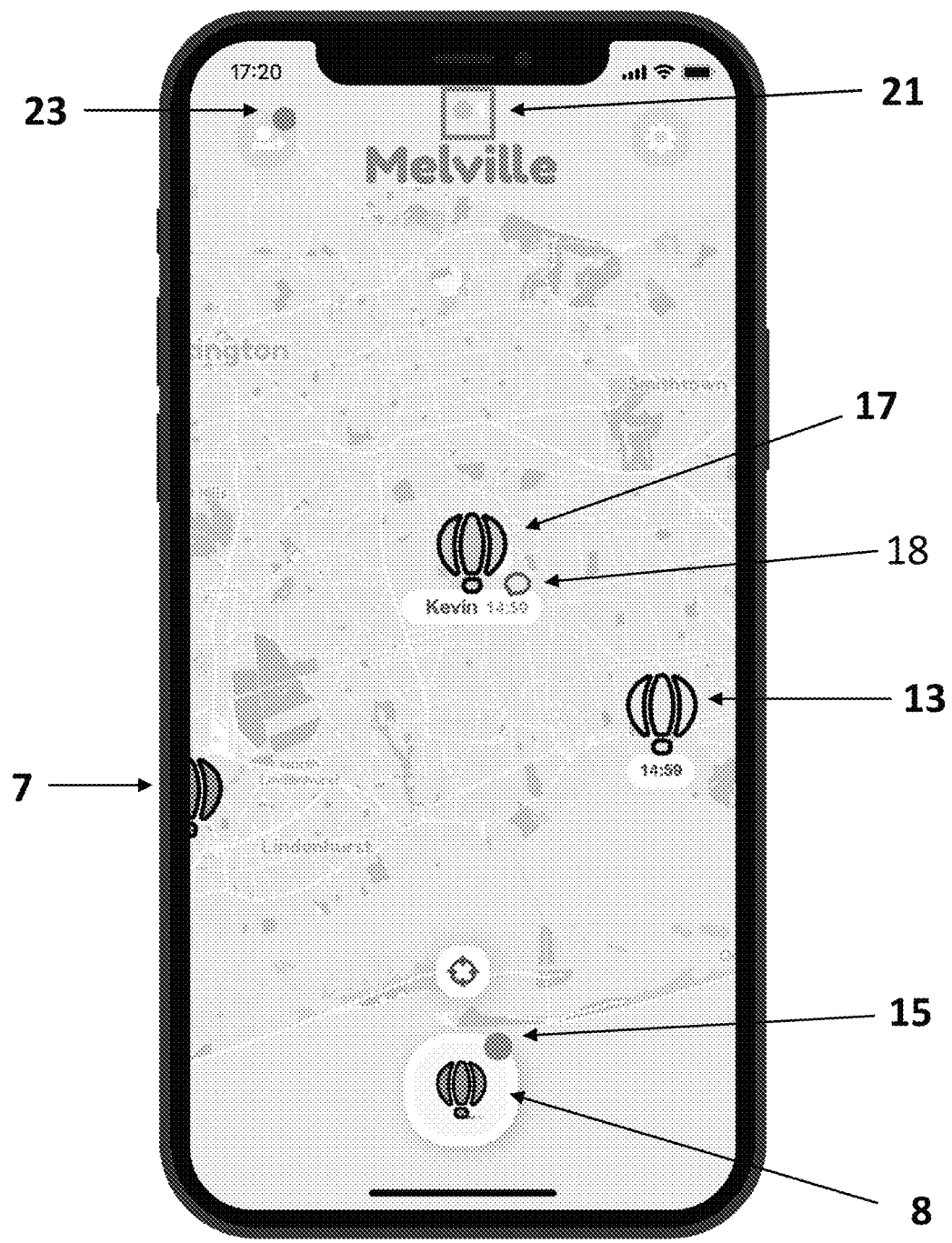
FIG. 8 shows an exemplary screenshot of dot system feature, in accordance with an embodiment of the disclosed system and method.

FIG. 8 shows an exemplary embodiment of the dot system feature of the disclosed system. As shown in this example, a single dot 21 appears on the 'Map' module in the top center above the title of the town. The user may navigate into settings and remove or toggle colored dots. The color of this dot will signify the user's engagement with other identity requests/balloons/friends.

In some embodiments, the following color dot scheme is used:

Red: Symbolizes that user is not engaged in any identity requests (pending or active);

Yellow: Symbolizes that there is one or more pending identity request(s); and

Green: Symbolizes that the user is engaged in at least one active request (wayve) and the user's marked location and/or identity is viewable (among other potential scenarios in accordance with the wave states as described in example FIG. 21D). There will be a number next to the green dot to signify how many active requests (wayves) the user is currently engaged in (i.e. how many people the user is exchanging location information with). For example, if there is a number one "1" next to the green dot, then this means that the user is currently engaged in one (1) active request (wayve).

In the example shown in FIG. 8, the user is sharing location with and can see the location and identity of one user/friend. In some embodiments, if someone has an active wayve and a pending wayve, the dot on the map would be green as the active wayve is dominant. Users may select or click the yellow and green dots and it will act as another button to navigate to and view the wayves page. The various waves states of the user are shown as orange balloon 7, green balloon 17, bubble 18, and yellow balloon 13 as previously described below in connection with FIGS. 2A-3B. In addition, the home button 8 with pending dot 15 is also shown in FIG. 8. This indicates that there is an incoming notification. Similarly, there is an orange dot 23 shown next to add friend icon in FIG. 8, also indicating an incoming notification.

FIGS. 9A-B show an exemplary embodiment of a settings page including the shade mode setting feature in accordance with the disclosed subject matter. In certain embodiments, if users do not want their anonymous balloons displayed on the map for friends to see and wayve at, they can simply activate the "shade mode" in the settings page as shown in FIGS. 9A and 9B. FIG. 9A shows the settings page with the shade mode deactivated ("Shade Mode off") with the shade mode umbrella icon dimmed or somewhat appearing opaque. FIG. 9B shows the settings page with the shade mode activated ("Shade Mode on") with the shade mode umbrella icon more visibly apparent.

In certain aspects or embodiments, Shade Mode allows the user to remove their balloon from the map so their friends cannot see their balloon on the map screen. In Shade Mode, friends cannot wayve at the user. However, if the user is in "the shade" the user can still use the map and view other anonymous balloons/friends. In some embodiments, if a shaded user decides to wayve at one of those balloons (or directly wayve at a friend from the friends/wayves page) while in shade mode ("the shade"), shade mode will automatically be deselected or deactivated for the user once the wayve is transmitted. In other embodiments, shade mode will remain activated until the friend accepts, or deactivated only for that friend. Other suitable arrangements or embodiments will be apparent. It is noted that in the settings page as shown in FIGS. 9A-9B, the user may configure the system to operate in accordance with calibrated privacy wave-states (or wave states), for example, as shown and described in connection with FIGS. 21C-D embodiments, in which the user may set which "wave state" that user prefers to operate, communicate and interact in, while exchanging information over the WDCP platform with certain one or more other user "friends". The user's wave of communications in the WDCP platform will be set in accordance with such setting, in accordance with certain aspects or embodiments of the disclosed system FIGS. 10A-B show an exemplary embodiment of a shade mode map feature in accordance with the disclosed subject matter. In embodiments, when a user 3 has activated shade mode, the map location marker 5 (for the user) will become shaded as shown. Specifically, FIG. 10A shows the normal map (with Shade Mode disabled) for user 3 at map marker location 5. FIG. 10B shows the map with Shade Mode enabled 25. It is noted that the map marker for user 3 in location shown by directional arrow 5 (i.e. user's map marker 3 location 5), will become dimmed when shade mode is activated in FIG. 10B.

Once a user has activated shade mode, the shade mode icon 25 will appear on the map page. If the user selects (or clicks) this shade mode icon 25 (or button) (represented by an umbrella) it will deactivate shade mode and the button will disappear from the map page. In some embodiments, the shade mode button appears on the map page when shade mode is enabled, so when shade mode is disabled (for example, set by default) there is no shade mode button on the map (only in the settings page in its defaulted "off" state, for example).

FIGS. 11A-B show an exemplary embodiment of an alternative mapped layout in accordance with the disclosed subject matter. As shown in FIG. 11A, in this embodiment, the bottom-center home balloon button is the home button 8 as shown in FIG. 2A. In this embodiment, when selecting a balloon, the swipe to wayve will be an alternate to the wayves page button, until the wayve is either sent or the user otherwise licks/selects away another portion of the screen, for example, that is not the swipe to wayve slider. Further, as shown in FIG. 11B, in this embodiment, similar to FIGS. 4A-5B, there is a map button at the bottom-center that returns the user to the map layout. Other suitable arrangements and layouts will be apparent to those of skill in the art.

FIGS. 12A-12F show exemplary screenshots of in-app drop-down notifications to inform the user when "someone", another user, has sent a wave request or "waved" to a first user, in accordance with an embodiment of the disclosed system and method. In-app drop down Notifications, when a user is receiving a wayve, the user may not know the name or identity of the person who wayved at you/"a user" until the user navigates to the wayves page, and in certain embodiments, only if the "waved at user" actually set his wave state to divulge their own identity. Hence "Someone" when wayves at you/a user, certain privacy settings may be set via the user's wave state privacy settings, as described for example in FIG. 21D. As shown in FIGS. 12A-F, the window may drop down from the ceiling similar to other apps. Such windows will appear there for a few seconds.

When selecting (or clicking) the notification pop-up it will navigate the user the correct or desired destination. The user can also swipe it up to remove the pop-up.

FIGS. 13A-13B, show exemplary screenshots of indicators of incoming message(s) received by a second user, when sent from a first user, Joe, in accordance with an embodiment of the disclosed system and method.

When a user is in an active wayve the message bubble from the wayes page appears also in the active balloons on the map page. Both of these message bubbles correlate with one another when in an active wayve with a friend. The User has no incoming messages from Joe as shown in bubble in FIG. 13A. On the right in FIG. 13B, the user can see that Joe has sent the user, one new message shown in message bubble 58 with the number "1" indicated next to the bubble 58. The user may either select or click the green balloon 17 to view the message in the message thread or he may select or click the wayves page button 8 located at the bottom center of the map page and select the active wayve/friend (in order to view the message thread) from that page. The orange dot 15 in FIG. 13B indicates a pending message awaits the user, in an embodiment.

Figure 14A:
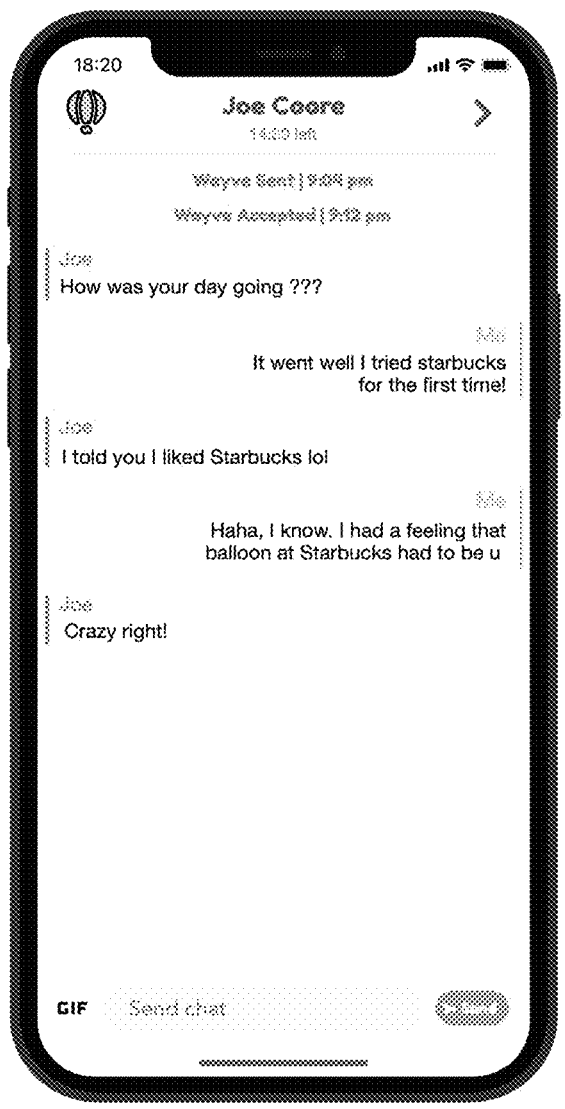
FIG. 14A shows an exemplary screenshot of message thread indicators with a balloon icon functionality during an active, anonymous, and/or pending wave dynamic protocol communication state, in accordance with an embodiment of the disclosed system and method.

FIG. 14A shows an exemplary screenshot of message thread indicators with a balloon icon functionality during an active, anonymous, and/or pending wave dynamic protocol communication state, in accordance with an embodiment of the disclosed system and method.

In the top left of the message thread there is shown a green balloon in FIG. 14A. This balloon can be clicked/selected when the wayve is active. When the user selects/clicks this balloon, the user navigates to the map and centers the map on their friends location. The user can press and hold a balloon on the map in any wave state (for example, anonymous, pending, active, etc.) to generate a pop up "notification" indicating whether the user would like directions to this location? If a user selects "yes", the system navigates the user out of wayve, into their default map application on their iphone or PDA, in which the system will generate the directions as set to the destination (according to that balloon's location). The user can also select "no" in wayve not to activate this additional map feature functionality.

Figure 14B:
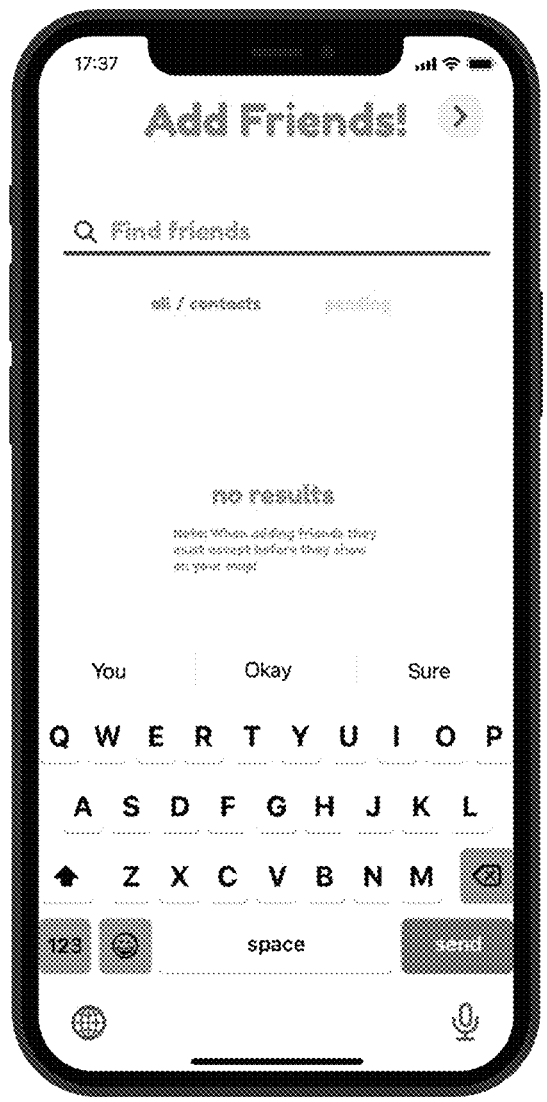
FIG. 14B shows an exemplary screenshot of an add friends page during an active, anonymous, and/or pending wave dynamic protocol communication state, in accordance with an embodiment of the disclosed system and method.

In FIG. 14B, shown is an example add friends page. When User A adds User B, User B will immediately enter into User A's friends list/wayves page. However, User B is only a "half" friend or other wave state friend, until they formally accept the request, with the full wave state reveal of their identity/location, for example as described in FIGS. 21C-D. A half friend is a user that has not yet accepted the friend request, however, has received it. Therefore, the user can wayve at a half friend from their wayves page, but cannot see this user's anonymous balloon on the map until the user formally accepts the friend request (and in accordance with a certain wave-state). This feature permits for a potential first contact to be made between users. This feature facilitates adding friends as a faster and more scalable feature and in certain embodiments in accordance with calibrated wavestates. When selecting "find friends" and the keyboard appears, it will automatically begin with the "no results" and it will also indicate when adding friends they must accept before they appear on your/a user's map, in order to reinforce this feature as shown in FIG. 14B.

FIGS. 15A-15B, show exemplary screenshots of various message thread indicators during an active, anonymous, and/or pending wave dynamic protocol communication state, and examples showing options to accept, ignore. "idle state to add friends" and/or "remove friend", in accordance with an embodiment of the disclosed system and method.

When receiving a wayve from a user that has just added you/a second user (for example, the user has not yet accepted their friend request) the display would appear, as shown in FIG. 15A. (Ex. look at Eva). If Eva just added a user, and the user has not taken action on the add friends page, if the user accepts Eva's wayve the user will also accept their friend request. If the user let the wave request time out or even "Ignore", the friend request will remain in the add friends "requests" area until accepted or declined. When adding a friend who already has a wayve account the system will no longer say "sent" it indicate "added", as shown in example embodiment in FIG. 15B.

In accordance with an embodiment, if user A adds User B and user B hasn't accepted or declined yet, User A will have User B on their friends list/wayves page (but, not their map). User B will appear on the map if User B accepts the friend request. If user B "Declines" the friend request then user A will no longer have user b on their friends list. The user B will be auto removed—similar to a removal of a friend.

In certain aspects or embodiments, there is a wave party feature. A button located on the map under the Settings icon is available for selection by a user Hosting a wayve party Parties may last for 48 hours by default or otherwise, as predetermined by the system or user. The user can configure this in the parties optional setting under time (duration). The user will click-hold (i.e. select-hold) and drag the wave party button and place it on the map at the desired party location. The User will now have a window pop up on the screen where they are prompted to name the party. Once the party is named you/a user can enter an optional info: description, time/duration, date, the party host can choose a header photo for the party. Now the user can "Check off" or select which friends they want to invite to their party. Since the user can sync contacts—the user may also select friends that don't have the application downloaded. If they invite a friend via contacts that does NOT have wayve, the system will send that user a text message indicating they invited you/a user to a party. The user may download the application with the download link below the message. (They must select at least one person to confirm the party). The User selects "Confirm Party". Once the party host has selected a friend, that selected friend can now visibly see the party icon (on the map) in the host's chosen party location. The user can select it and see all the information as well. The selected friends will also receive a notification indicating "A User A has invited you to a party!". This notification will appear in the wayves page under "Wayves" just as a normal incoming wayve. These party invites do not expire until the party has expired. The friend can choose to accept the party in two different ways: Map/Party Icon/Accept Invite or Wayves page/Incoming party invite under "Wayves"/Accept Invite. The user will receive the same party page pop-up window when selecting the party invite in the wayves page vs. selecting the party icon on the map—displaying all of the party info. Once the friend has accepted the party invite, The party will look similar to an active wayve in the active wayves area (Wayves page). The Host will be notified, and the friend will join a group chat with all of the people who have accepted the friends party invite (whether WayveFriends or not, everyone who accepts the party invite gets placed in the party group chat). The friends may select the top of the group message thread to see all of the accepted party paticipants. Users may choose to silence notifications in the party group chat with the click (or selection) of a button. The party expires once the host either manually ends it or the party's duration comes to an end with a default duration of for example, 48 hours or other pre-determined time-segment.

Figure 16:
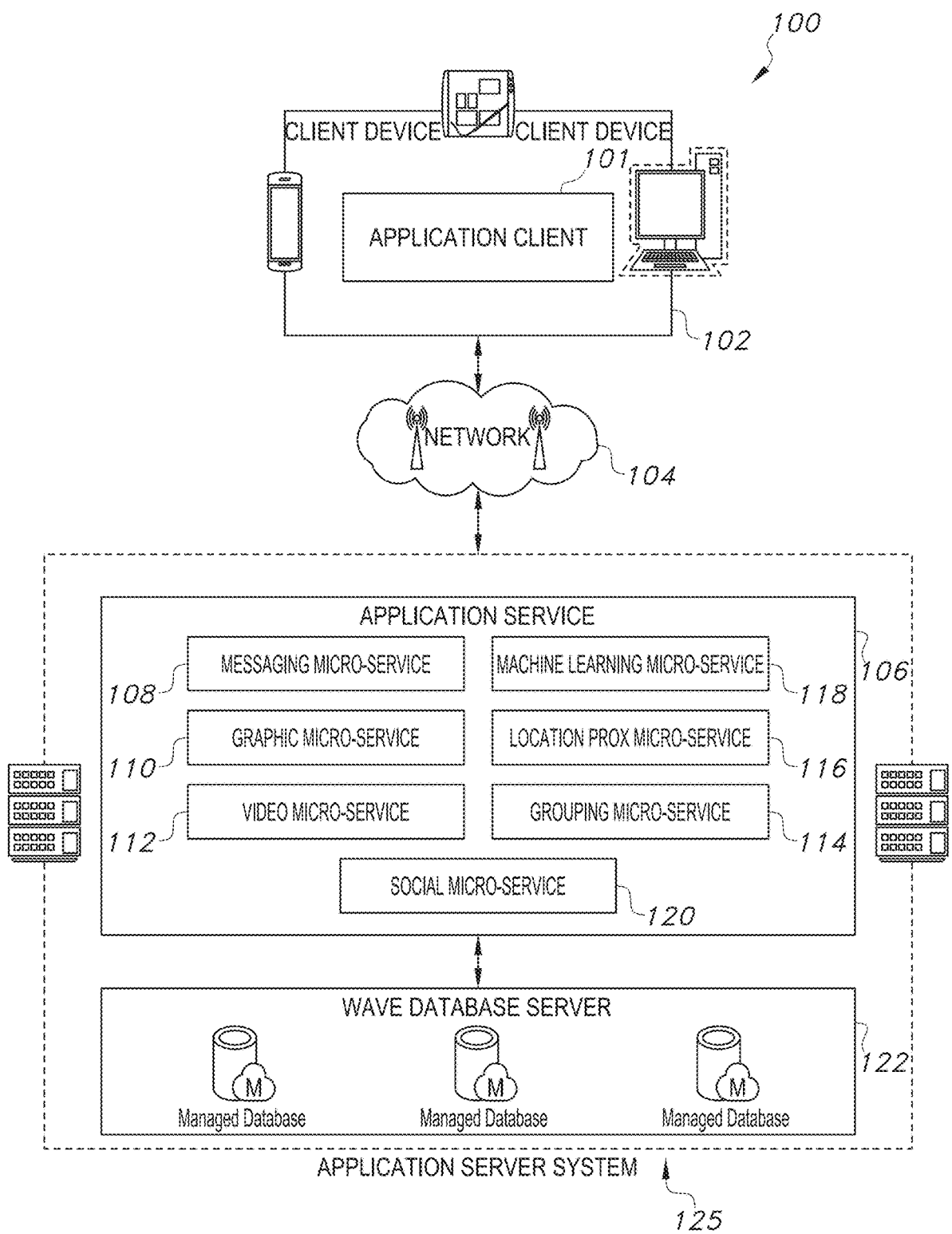
FIG. 16 is a block diagram providing an overview of the components of the wave dynamic communication platform that implements novel wave dynamic communication protocol (WDCP) communications including among other components, associated virtual micro-service application farms, in accordance with an embodiment of the disclosed system and method.

In FIG. 16 shown is a block diagram providing an overview of the components of the wave dynamic communication platform that implements novel wave dynamic communication protocol communications including among other components, associated virtual micro-service application farms, in accordance with an embodiment of the disclosed system and method.

In particular, FIG. 16 diagram shows a wave dynamic communication platform system 100 that serves to summarize a client application interaction through a public, private and/or hybrid network. The client application 102 may run on many different types of Operating Systems, hardware types, mobile phones, tablets, and PCs. Each client application will traverse the network 104 to connect to an application server farm 106. The application server farm consists of several servers that may be either private or public cloud-based 106. The servers share many virtual characteristics, enabling them to work together in a seamless fashion to support an unrestricted number of simultaneously connected client devices.

Within the application server farm, several virtual micro-services manage the connectivity and content in the network 106. The messaging micro-service 108 is responsible for managing all text messages sent and received amongst the client applications. The graphic micro-service 110 works closely with the messaging micro-service and manages all fixed (i.e. non-video) graphics sent and received amongst the client applications. Likewise, the video micro-service 112 works closely with the messaging micro-service and manages all video graphics sent and received amongst the client applications.

Also working closely with the messaging micro-service are the Location Prox 116 and Grouping micro-services 114. The Location Prox micro-service manages all of the location parameters connected to each client application, which includes a map with various views, angles and topographies associated with both friends and groups. The Grouping micro-service 114 is the group stream manager, overseeing and maintaining the parameters and functions associated with grouped communication stream functions, which usually consist of three or more friends.

Figure 18:
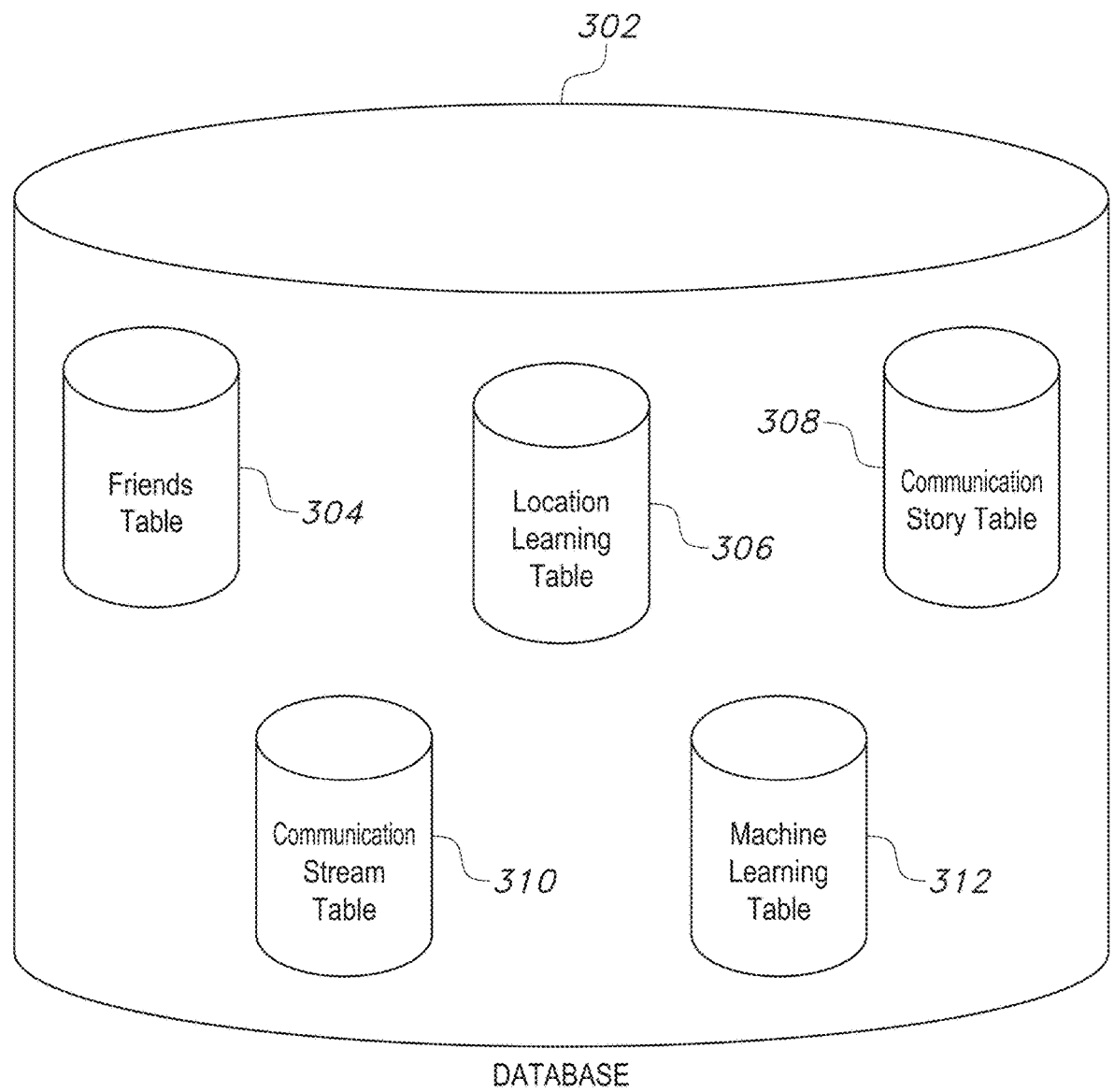
FIG. 18 is a block diagram providing an overview of various databases structures including tables and sub-structures as implemented by the wave dynamic communication protocol (WDCP) in a cloud computing environment, in accordance with an embodiment of the disclosed system and method.
Figure 19:
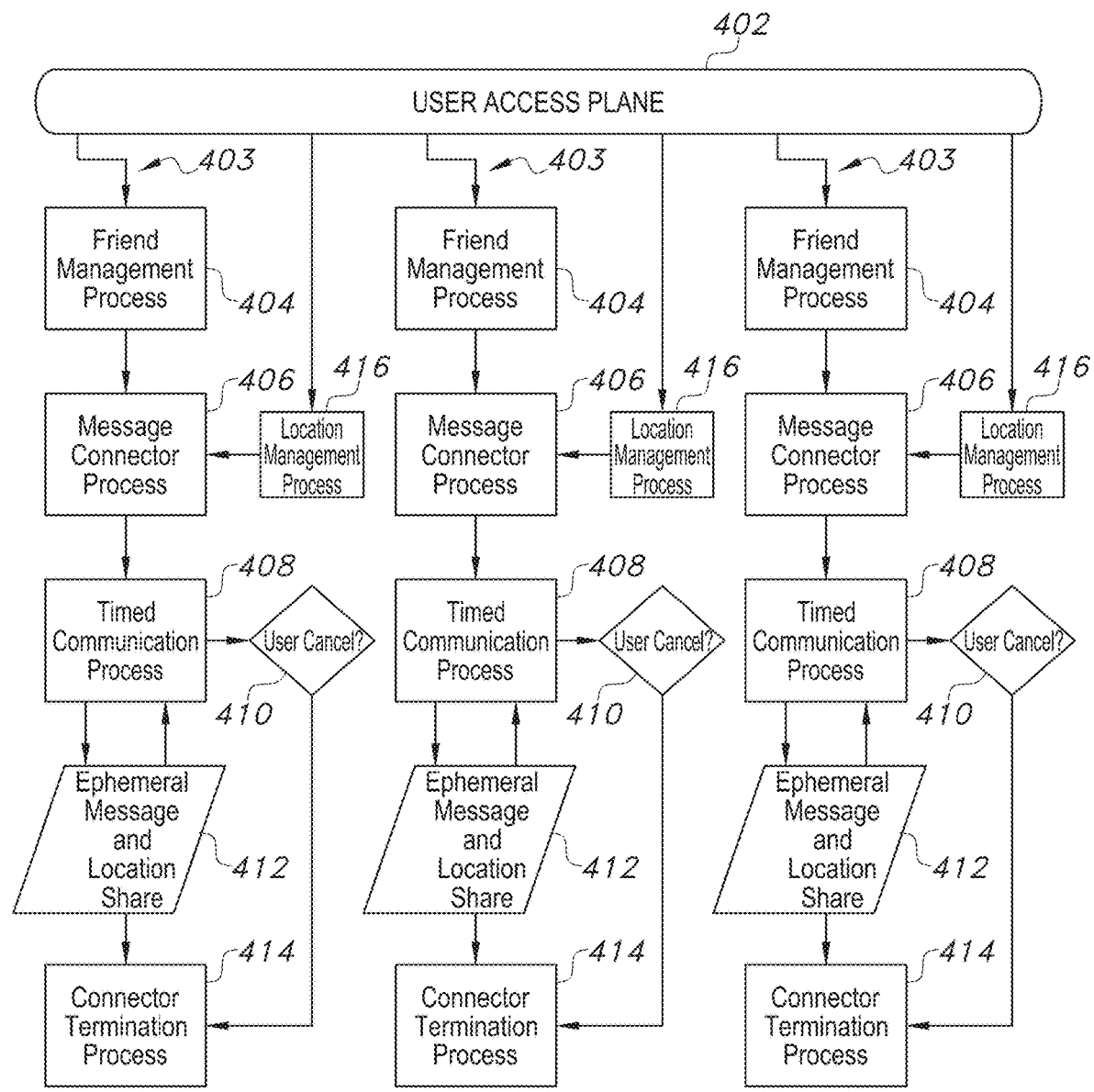
FIG. 19 is a block diagram providing an overview of the wave dynamic communication protocol with related processes, including associated access to ephemeral content subject to discrete epochs of time, in accordance with an embodiment of the disclosed system and method.
Figure 20:
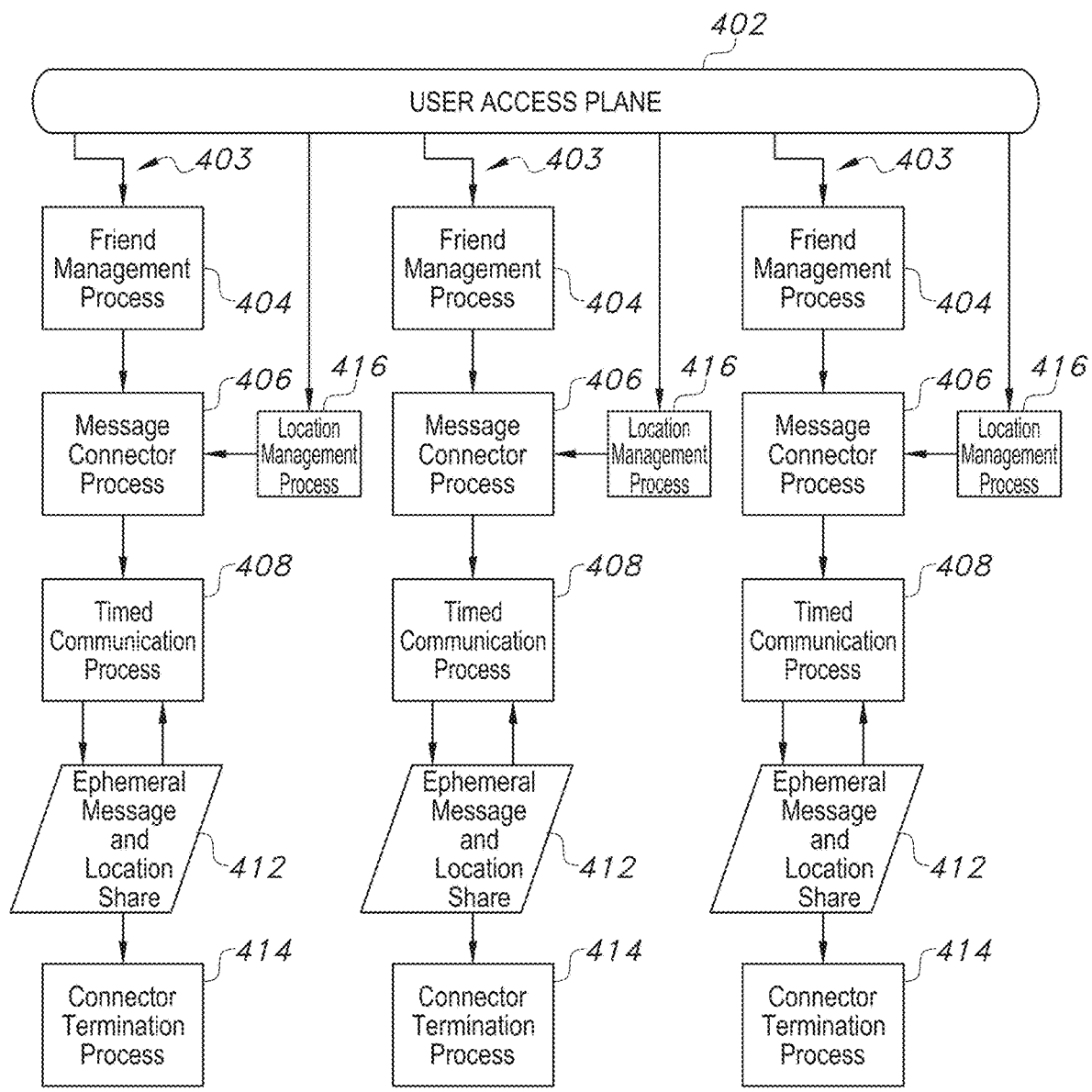
FIG. 20 is a block diagram providing an overview of the wave dynamic communication protocol with related processes, including associated access to ephemeral content subject to discrete epochs of time, in accordance with an embodiment of the disclosed system and method.

The shown embodiment of the Machine Learning micro-service 118 in FIG. 16, is responsible for all aspects of machine learning and artificial intelligence in the application. Through this micro-service, the application will learn about characteristics and trends of the user community and allow the application to adapt to provide a better user experience. An example of such a trend pertains to the length of each communication stream 403 as shown in FIGS. 19-20 Based on communication patterns between users over time stored in the Machine Learning table 312 as shown in FIG. 18, the application can optimize or fine-tune the length of each individual stream appropriately in example implementations.

Figure 17:
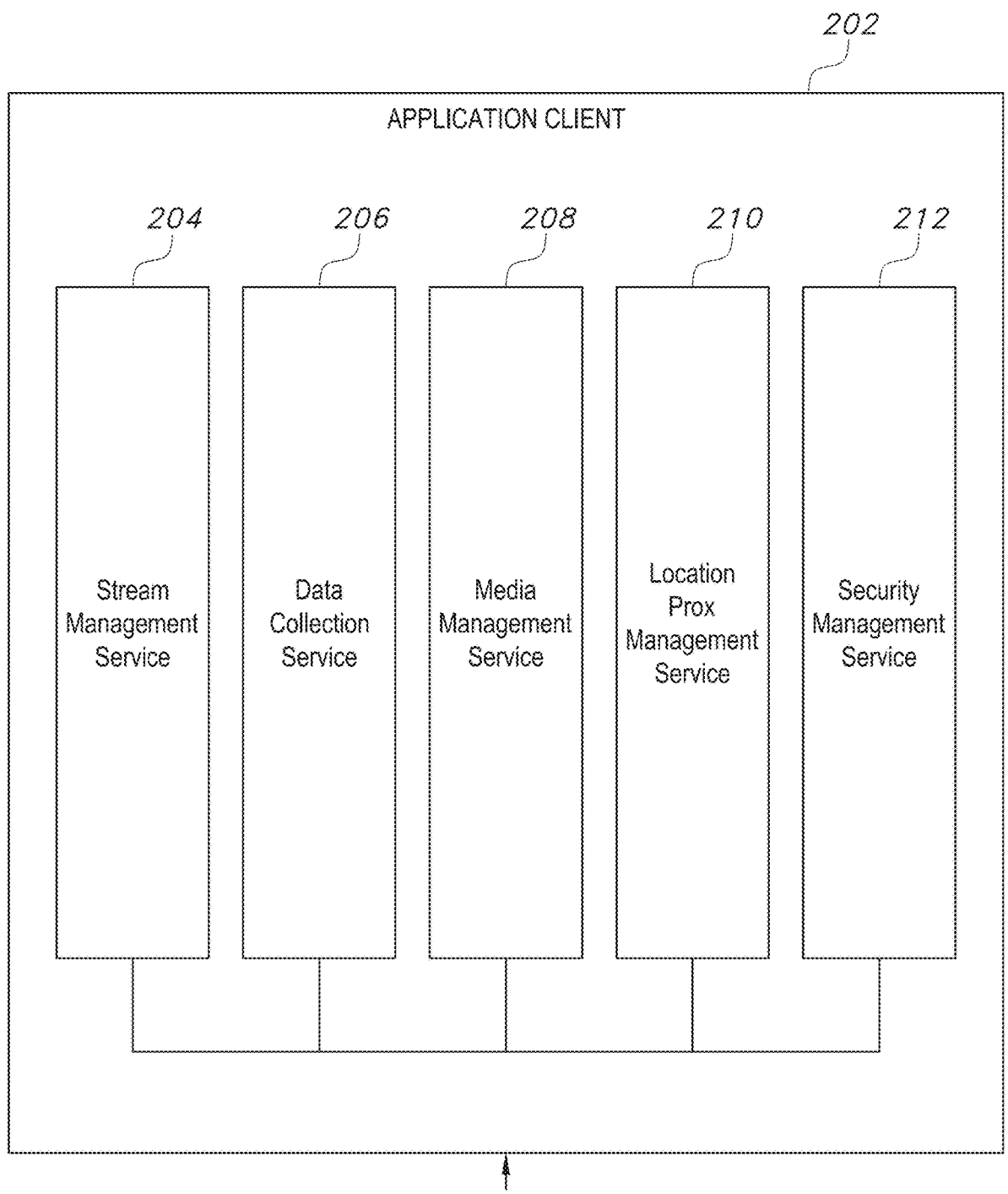
FIG. 17 is a block diagram providing an overview of the wave dynamic communication protocol (WDCP) microservice modules, in accordance with an embodiment of the disclosed system and method.

Managing all micro-services and enabling a close and consistent method of interaction amongst all micro-services is the Social micro-service 120. The Social micro-service 120 also converts all of the individual characteristics of each micro-service into a single uniform and consistent communication methodology between all clients and the application server farm 106. This allows for consistency in both current and future development process, and also improvements in application performance to support economies of scale. In addition, the Social micro-service 120 manages and oversees all functional security across all aspects of the application architecture. The application server farm also consists of a number of managed cloud-based database servers 122. The nature and functions of these example servers are further specified in connection with FIG. 18 hereinbelow FIG. 17 is a block diagram providing an overview of the wave dynamic communication protocol micro-service modules, in accordance with an embodiment of the disclosed system and method. More particularly, FIG. 17 depicts the software service modules that comprise the client application and/or module(s) 202. This application may reside on any mobile device, tablet, or PC.

In the example embodiment, the Stream Management Service module 204 in FIG. 17, manages all client based streams which consist of both individual (1:1) and group (1:many) connections. The Stream Management Service module 204 in certain embodiments, is responsible for establishing the client stream connections, managing the connection while in an active state, and also terminating the stream. This service 204 also maintains state for all stream-based parameters. In certain embodiments, the Data Collection Service 206 module works closely with the stream management module 204 to maintain all data traffic that traverses through the client application. Data traffic types include but are not limited to for example, text messages, standalone graphics, and video clips. The management of this data is ephemeral, and upon the termination of a stream will remove all references to this data on the client, client server and/or computing device of the client.

In an embodiment, the Media Management Service 208 closely ties into the Data Collection Service 206 by managing all of the specific parameters and functions for video input and output during an active stream. The Media Management Service 208 in example implementations, will defer to the Data Collection Service 206 to remove all video specific data upon stream termination.

The Location Prox Management Service 210 as shown in FIG. 17, is responsible for all elements of the location interface on the client application in an exemplary implementation. The location interfaces associated with the Location Prox Management Service 210 include, but are not limited to friend proximity, real time location coordinates, background topographies, notifications, advertisements, and other aspects that comprise the location functionality in the exemplary client application.

In accordance with disclosed embodiments, the Security Management Service 212 shown in FIG. 17, is responsible for many or all security functions within the client application. These functions include but are not limited to login, authentication, filtering, and user profiles. Each of the application client modules 202 works closely on an ongoing basis with their associated server modules. There is a mix and match of client to server function load depending on the specific functions being utilized at any point by the client. For example, some client functions may not require a server handshake or acknowledgement, whereas others will require it.

Referring to FIG. 18, shown is a block diagram providing an overview of various databases structures including tables and sub-structures as implemented by the wave dynamic communication protocol in a cloud computing environment, in accordance with an embodiment of the disclosed system and method. In particular, FIG. 18 depicts an exemplary database structure for the application 302. In the shown example embodiment, the database is comprised of several tables and sub-structures that work together in a cloud-based environment. The Friends Table 304 stores information relevant to the friend community within the application. All friend profile information is also stored in this database. Requests transmitted or sent from the client application 202 (as shown in FIG. 17), for example, requests such as friends data, will be populated or transmitted into the Friends Table 304.

Furthermore, the Location Learning Table 306 in FIG. 18, stores information pertaining to the location specifics for each application client 202 of FIG. 17, in example embodiments. This information includes, but is not limited to, the real-time location of a particular friend or friends during an active communication stream 403, as shown in FIGS. 19-20. The Communication Story Table 308 in FIG. 18, stores information relevant to the historical data of all communication streams. This includes but is not limited to data and text messages that were shared amongst friends during a former active communication stream 403 as shown in FIGS. 19-20. The Communication Stream Table 310 stores information that pertains to data for active communication streams. This includes but is not limited to message, text, graphic and video data that is currently in an example active communication stream 403 shown in FIGS. 19-20. The Machine Learning Table 312 stores information pertinent to what the application has learned or is currently learning about the trends and characteristics of client application usage. This information includes but is not limited to messaging trends, common video types, graphics types and locations.

Shown in each of FIGS. 19-20 is an overview of the wave dynamic communication protocol with related processes, including associated access to ephemeral content subject to discrete epochs of time, in accordance with an embodiment of the disclosed system and method. More particularly, FIGS. 19-20 provides a schematic diagram illustrating a data and message flow process 400 that provides users access to ephemeral content that may be time limited in nature and/or transitory in nature. In certain embodiments, such ephemeral content is subject to certain conditions in gauging the scope or length of time and even the reach of the content in the dynamic wave platform system.

In example embodiments, the User Access Plane 402 pertains to a user's enabled access to the application, through either a login process or an automatic entry process via an existing queued login state. From the User Access Plane 402, a user can access any of the processes and tools that the system application offers using the wave dynamic communication protocol. From the User Access Plane 402, the user will often move into the Friend Management Process 404 to perform specific functions that pertain to that user's friend list, including access to all elements of adding, deleting and other functions that relate to the maintenance of a user's friends. In addition, in certain aspects or embodiments, the Friend Management Process 404 allows the user to create, edit and delete communication streams between or more friends. Through the Friend Management Process 404 there is no limit to the number of friends that a user can have, although there may be restrictions on which users can be added to a user's friend list in certain embodiments.

In certain aspects or disclosed embodiments, if a user has existing friends, the user via the User Access Plane 402 may choose to initially go through the Location Management Process 416 instead of the Friend Management Process 404 in order to reach the Message Connector Process 406 and to establish a communication stream directly between existing friends. The Location Management Process 416 is responsible for processing the actions, elements and configurations that pertain to the locations, often in real time, of the user's friends. The use of this bypass method is primarily designed to allow the user to determine if, based on a friend's location, he or she wishes to establish a communication stream.

The Message Connector Process 406 allows a user to actively attempt to connect to one or more friends. This process involves two or more devices and database input/output. This connection requires that the receiving users acknowledge and accept the request to connect. On a successful message connection 406, the Timed Communication Process 408 controls and oversees the ephemeral communication stream between two or more users. There is no limit to the number of timed connections 408 that can occur between users in the network. In some embodiments, more particularly as shown in FIG. 19, during the timed communication, any user involved in this communication may opt to disconnect 410. In this situation, if only two users are engaged in a communication stream, the entire stream will abort. If there are more than two users, the stream will remain active for the remaining active users for the duration of that communication stream.

Accordingly, throughout the duration of the Timed Communication Process 408 an unlimited amount of data and data types may be exchanged at step 412 between members of the communication stream, in accordance with an embodiment of the dynamic wave communication protocol shown in FIGS. 19-20. The location of each user may also be shared amongst the members of the communication stream 403 transmitted via the user access plane 402. In some embodiments, users of that stream may have the option to hide their respective locations at any time. The Connector Termination Process 414 controls and enforces the termination of a user's message stream. A stream termination may occur when a user decides to terminate a connection during an active stream or when a stream times out. Upon termination of a message stream, all data exchanged during that message stream will be deleted and will no longer be accessible to users in certain aspects or embodiments of the disclosed dynamic wave communication system and method.

Accordingly, FIG. 20 is a block diagram providing an overview of the wave dynamic communication protocol with related processes, including associated access to ephemeral content subject to discrete epochs of time all as described hereinabove with respect to FIG. 19 with the exception that FIG. 19 further provides such ephemeral content may be subject to user cancellation at step 410, in accordance with an embodiment of the disclosed system and method.

Figure 21A:
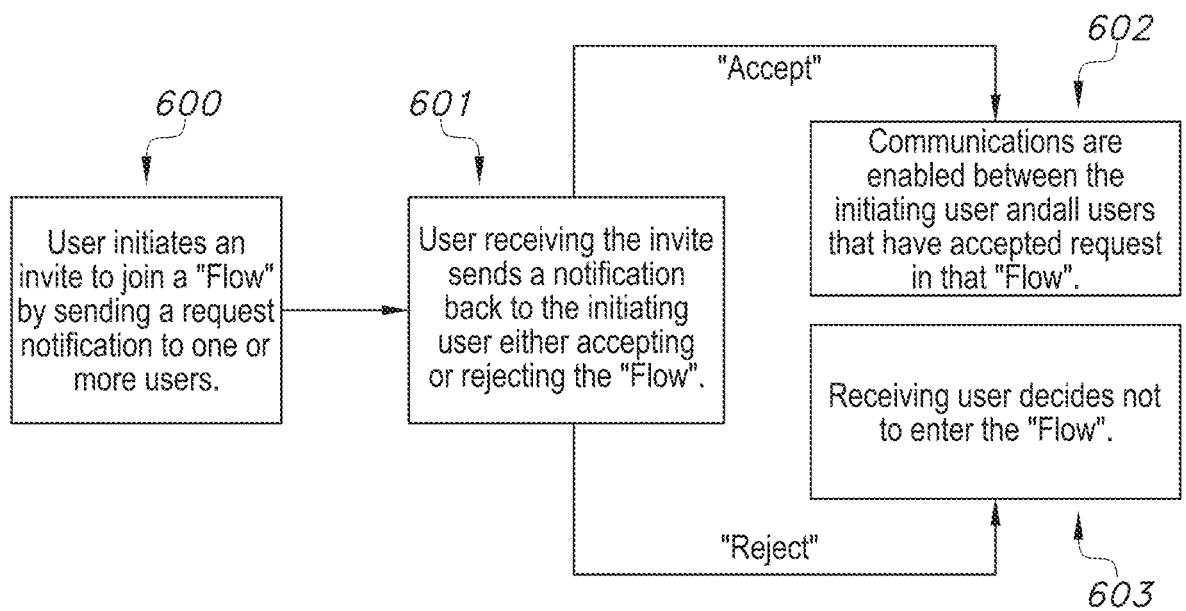
Figure 21C:
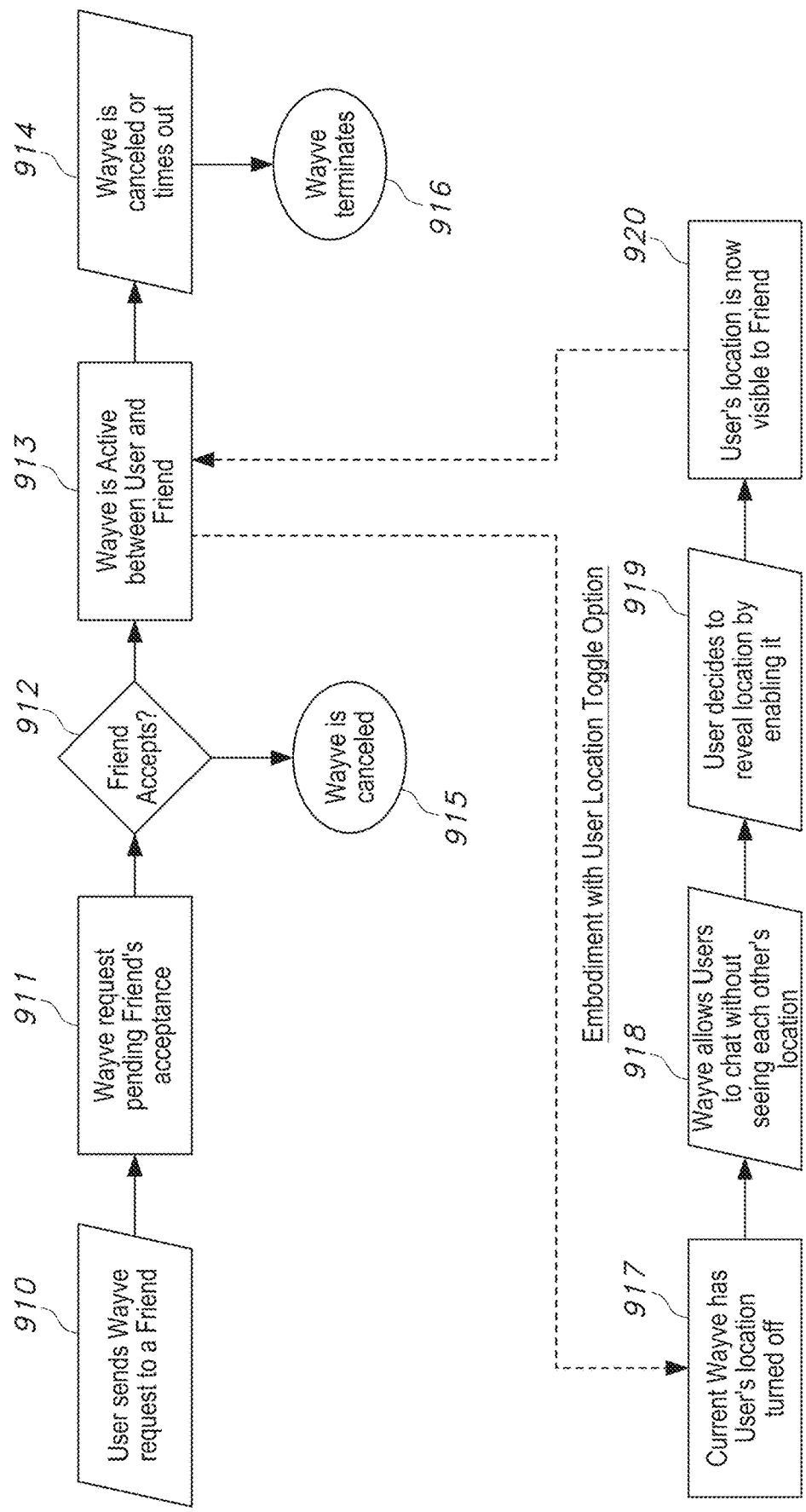

FIGS. 21A-C is a flowchart illustration providing an overview of the wave dynamic communication protocol with related processes, wayve states, including associated access to ephemeral content subject to discrete epochs of time, in accordance with an embodiment of the disclosed system and method.

FIG. 21A provides an overview of wave dynamic communication protocol (WDCP) which is a novel and more refined approach to social communications, in particular social communications transmitted over a computing environment, platform, engine or otherwise, a social media platform. In step 1, the novel communication flow is established. The system establishes novel Wave Dynamic Communication "Flows" between users and groups. "Flows" are established by both sender and receiver accepting and thus initiating the "Flow". Each "Flow" has its own attributes—such as location, security, confidentiality, Messaging and/or communication, Time-to-live, etc. Once a "Flow" terminates, all communications within that "Flow" generally will also terminate.

The "Phone Call" of Messaging in which users can now securely maintain an active stream of communication for a dynamic period of time. A user must send out a request for permission to engage in a communication stream/thread for a dynamic period of time. Once the active time period has expired, the stream of messaging/communication terminates deleting all of its contents. The dynamic period of time can be anywhere from "1 second to 50 hours" or even longer, as desired by the users, there is no specific time we are referring to but the "Flow" is dynamic and/or temporary. An example flow is described as follows: Step 1, A user selects a peer; Step 2: User sends dynamically timed invite/request to friend (May be configurable by the user); Step 3: Friend receives request, and decides to either accept or ignore the invite/request; Step 4: If friend decides to accept invite/request he/she will send an acknowledgement back to User; Step 5: User receives acknowledgement, and the software will now place them in a "Flow" for the dynamically set period of time; Step 6: The User and Friend now maintain a communication with each other for the dynamically set period of time. Once the dynamically set timed communication expires, all of its contents will also be deleted/terminated.

Another exemplary "flow" proceeds as follows: Step 1: User selects an anonymous map marker. The anonymous map marker represents one of the User's Friends, however the User does not know which Friend it is; Step 2: User sends Identity request/"Flow" Invite to anonymous map marker; Step 3: The Friend associated with the anonymous map marker receives the identity request/"Flow" Invite, and decides to either accept or ignore; Step 4: If friend decides to accept he/she will send an acknowledgement to User; Step 5: User receives acknowledgement, and then the application will then reveal the User and Friend identities and their locations to each other for a dynamic period of time; Step 6: The User and Friend have entered a "Flow" and now maintain a communication stream in conjunction with each others' locations for the dynamic period of time.

In yet another exemplary embodiment, a Location-Request)Sub-flow 2 proceeds as follows: Step 1: User selects a specific friend; Step 2: User sends request/"Flow" Invite to friend; Step 3: Friend receives request/"Flow" Invite, and decides to either accept or ignore; Step 4: If friend decides to accept request/"Flow" Invite, the user-friend will send an acknowledgement back to User; Step 5: User receives acknowledgement, and the software will now reveal the User and Friends' identities in conjunction with their locations to each other for a dynamic period of time; Step 6: The User and Friend have entered a "Flow" and now maintain a communication stream in conjunction with each others' locations for the dynamic period of time It is noted that each "Flow" has its own set of parameters with parameters being configurable. Example parameter types include (but are not limited to):

Location
Time-to-Live (i.e. "Flow" duration)
Security and filtering
Number of participants in a "Flow"
Upon termination of a "Flow", all data in that "Flow" is immediately deleted Specifically, as shown in FIG. 21A, the user initiates an invite to join a "flow" by sending a request notification to one or more users in step 600. Next, the user revies the invite and then sends a notification back to the initiating user either accepting or rejecting the "flow" in step 601. If the invite is accepted the communications are enabled in step 602 between the initiating user and all users that have accepted the request in the "flow". Otherwise, if the invite is rejected, the receiving user decides not the enter the "flow" as shown in step 603. Proceeding to Step 2 as shown in FIG. 21B, of the WDCP, all users in a "flow" communicate with each other for the duration of the "flow" in steps 610 and 611.

In FIG. 21B, step 3 of the process of termination of the wayve exchange is described. Any user in an active "flow" can terminate participation in that "flow" in step 613. Two users are in a flow for a certain period of time or other parameters is checked in step 614. If the time limit is met, the flow terminates in step 615. If not, all users other than the terminating user remain active in a flow in step 616.

FIG. 21C provides a schematic showing steps and/or states in the "Management Process", as shown and described in FIGS. 21A-B. The user elects to send a wayve request to a friend 910. Once the user has sent the request, the request now enters a pending state 911. At this point, the friend has received the request on their device and may choose to either accept or ignore the wave request 912. If the friend chooses to ignore the request, the wayve request is canceled at step 915. If the friend accepts the user's wayve request, the wayve then becomes active states between the user and the friend at step 913. The active wayve request remains active until the wayve is either canceled or otherwise times out/terminates at step 914. When the wayve either cancels/or times out, it is then terminated at step 916, and in certain embodiments, deleting the contents. Generally in known systems, the location is being displayed and paired with the user's identity all of the time (also referred to as a communication stream with location included). In such known systems, there is no flow involved as in the disclosed WDCP flow.

In alternative embodiment, the active wayve may not immediately and/or automatically involve displaying the users location to the friend (and vice versa). In this embodiment, after the wayve is active between the user and a friend 913 the current active wayve begins with the users' locations turned off by default 917. This way the process/flow/wayve allows users to chat and communicate without necessarily sharing their location 918. The User and/or friend may choose to send a location request out to the other person involved in the current wayve. At this point the receiving user may choose to accept or ignore the incoming location request. If the request is ignored or "declined", The active wayve continues on until it terminates, hence deleting its contents. If the user decides to reveal location by "enabling" or accepting the location request 919, the user's location will now be visible to the friend (and vice versa) at step 920. In some embodiments, when the location request is accepted or "enabled" the wayve timer may restart giving the users involved more time to communicate and location share. At this point, the active wayve request remains active until the wayve is either canceled or times out at step 914. When the wayve either cancels or times out, it is then terminated 916.

Figure 21D:
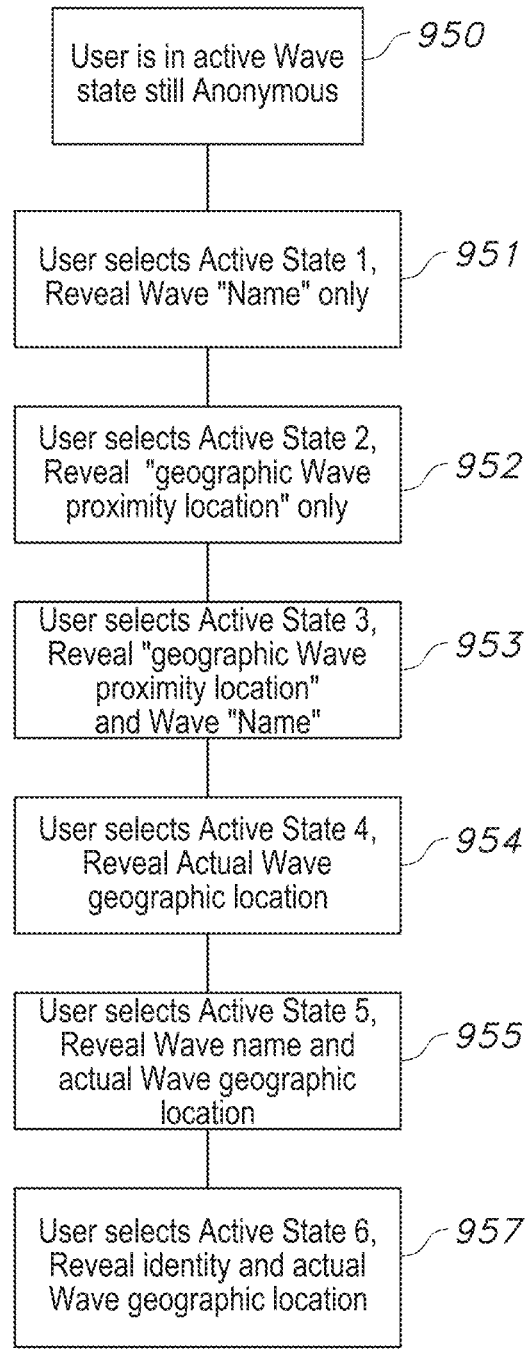
FIGS. 21D is a flowchart illustration providing an overview of the wave dynamic communication protocol with related processes and calibrated wave-states, including associated access to ephemeral content subject to discrete epochs of time, in accordance with an embodiment of the disclosed system and method.

FIG. 21D provides an embodiment in accordance with the WDCP platform in which wave-active states are implemented. The user may remain in an active wave-state while still choosing to remain anonymous to others in the platform as shown in step 950. Such settings may be set for example in FIGS. 9A-9B. Shade mode may be set, for example in certain embodiments. A user may further select Active State 1 and reveal that user's "wave-name" only in step 951. A "wave-name" is another name, "nick name" or alias name the user(s) may prefer to use in the WDCP platform, other than their full identity, until the user(s) has reached their full comfort social level in revealing their identity to another one or more wave-friends or other users. A user may further select Active State 2, in which they reveal their geographic wave proximity location only, with no specific map points being divulged in step 952. Accordingly, a user may set the parameters for their geographic wave proximity location to a certain distance point from their current location so that again, no specific map points would be divulged in such Active Wave State 2. Furthermore, a user may set perhaps, a zip code range, a town range, a city range, a country range as example parameters for their geographic wave proximity location in step 952, in the event they prefer not to divulge specific geographic map points. In step 953, a user may select Active Wave State 3, in which the user does reveal their geographic wave proximity location in addition to their wave-name. In step 954, a user selects Active wave State 4, in which the user will indeed reveal their actual wave geographic location, which can include for example, longitude/latitude points, GPS points, or other precise map location, such as the exact address, including street address, city, and country with zip code included. In step 955, the user may select Active wave-state 5, in which the user reveals both the user's wave name and actual wave geographic location. Finally in step 957, the user selects active wave state 6, in which the user reveals their identity (i.e., first and last name or first name only, last name only, nickname only, or other iterations of their actual name) and also reveals their actual wave geographic location which is described above in step 954. Such actual geographic location can include for example, longitude/latitude points, GPS points, or other precise map location, such as the exact address, including street address, city, and country with zip code included. These contemplated wave-states are in accordance with certain aspects or embodiments and are intended to provide flexibility with such calibrated wave-states in allowing a user of the WDCP platform to experience their satisfying and comfortable social media exchange of communications in which they can truly connect with other wave users in a fashion that mimics real human patterns of growing human friendships, as possible over a computing platform environment or engine, and within their social boundary comfort levels.

Figure 22:
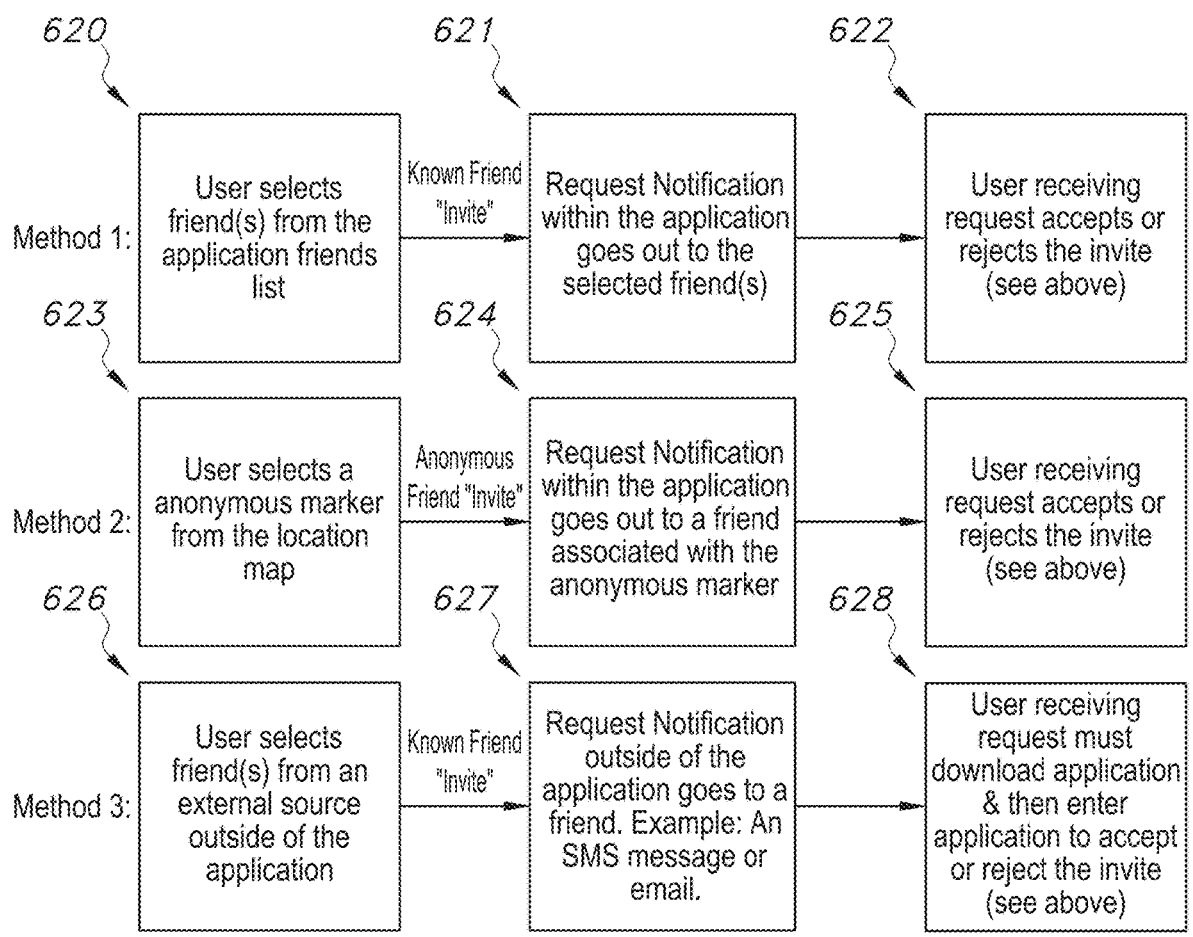
FIG. 22 is a flowchart illustration providing an overview of the wave dynamic communication protocol, in particular various methods of initiating a wave dynamic communication, in accordance with an embodiment of the disclosed system and method.

FIG. 22 is a flowchart illustration providing an overview of the wave dynamic communication protocol, in particular various methods of initiating a wave dynamic communication, in accordance with an embodiment of the disclosed system and method. Using Method 1, the user selects friends from the application friends list in step 620. A known friend invite is sent. In step 621, a request notification within the application is sent to the selected friends. Next in step 622, the user receiving the request accepts or rejects the invite as described in FIGS. 21A-B. Method 2 beings in step 623, the user selects an anonymous marker from the location map. An anonymous friend invite is sent. Next in step 624, a request notification within the application is sent to a friend associated with the anonymous marker. The user receiving the request accepts or rejects the invite as described above in FIGS. 21A-B. Using Method 3, a user selects one or more friend(s) from an external source (i.e. third party source) in step 626. A known friend invite is next sent. In step 627, a request notification outside of the application is sent to a friend. An example request notification is an SMS message or email. Finally, a user receiving the request downloads the application, enters the application in order to accept or reject the invite in step 628.

Figure 23:
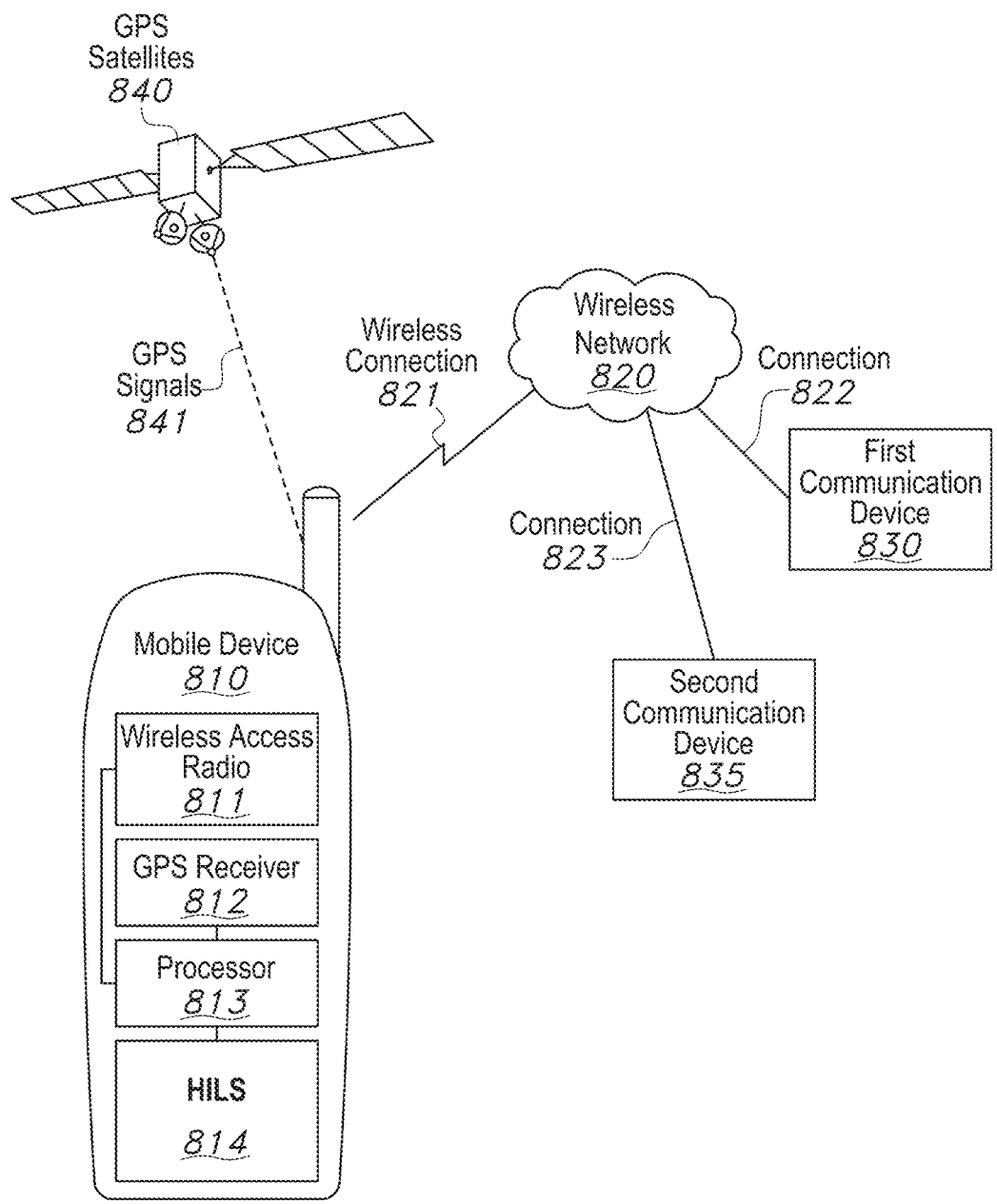
FIG. 23 is a block diagram of an example wave dynamic communication system featuring peer-to-peer wave communications, in accordance with an embodiment of the disclosed system and method.

Turning now to FIG. 23, shown is a block diagram of an example wave dynamic communication system featuring peer-to-peer wave communication(s), in accordance with an embodiment of the disclosed system and method. The communication system includes a wireless network 820, and a plurality of devices 810, 830, 835 including a mobile device 810 and other communication devices 830, 835. There might be other devices, but they are not shown for simplicity. The mobile device 810 has a wireless access radio 811, a GPS receiver 812, a processor 813, a hidden-identity location sharer 814, and might have other components but they are not shown for simplicity. Details of the other communication devices 830, 835 are omitted for simplicity. Such details are well known to those of skill in the art and it should be understood that various alternatives may be used to implement the systems and methods in accordance with the present disclosure. There are a plurality of GPS satellites 840 (only one shown for simplicity) for those devices that are GPS-enabled, for example the mobile device 810.

The operation of the communication system will now be described by way of example. Communication between the devices 810, 830, 835 is through the wireless network 820. The mobile device 810 uses its wireless access radio 811 for communicating wirelessly over a wireless connection 821, while the other communication devices 830, 835 communicate over respective connections 822, 823. The connections 822, 823 can be wireless or wired depending on whether the communication devices 830, 835 are mobile. For this example, it is assumed that the communication between the devices 810, 830, 835 is performed in a peer-to-peer manner. However, alternative implementations are possible.

The mobile device 810 generates location information using GPS technology, which involves receiving GPS signals 841 from the GPS satellites 840 using its GPS receiver 812. Location sharing involves the mobile device 810 sending the location information to another device, for example one of the other communication devices 830, 835. This can allow another device to track the geographic location of the mobile device 810.

In embodiments, the foregoing user interface, including the map layout for example as shown in FIGS. 2 and 3, is constructed from user and wayve data inputted by users, which is stored in the memory of the mobile phone and/or in a cloud database (e.g., Firestore). In these embodiments, the system parses these data and transforms them into User, Request (Wayve), and (BalloonAnnotation) objects for use in the system described above. The (BalloonAnnotation) objects are inputted into the (MapBox) Map API, along with the custom styling code to create the customized map.

Other suitable processes and arrangements will be apparent to those of skill in the art. For example, in some embodiments, a user's identity requires an identity request (wayve), however the user on the receiving end of the request need not accept it. Instead, the request (wayve) gets auto-accepted and the receiving user immediately gets notified that they are in a location share with the requesting user. Thus, in order to see the identity of the friend the user can immediately find out. This allows other users to immediately see one's location and identity. In other alternative methods, when a user has a friend added and is in the same proximity as that friend, the software can automatically initiate a wayve between the users that are close (notifying them of each other's identity and location).

Figure 24:
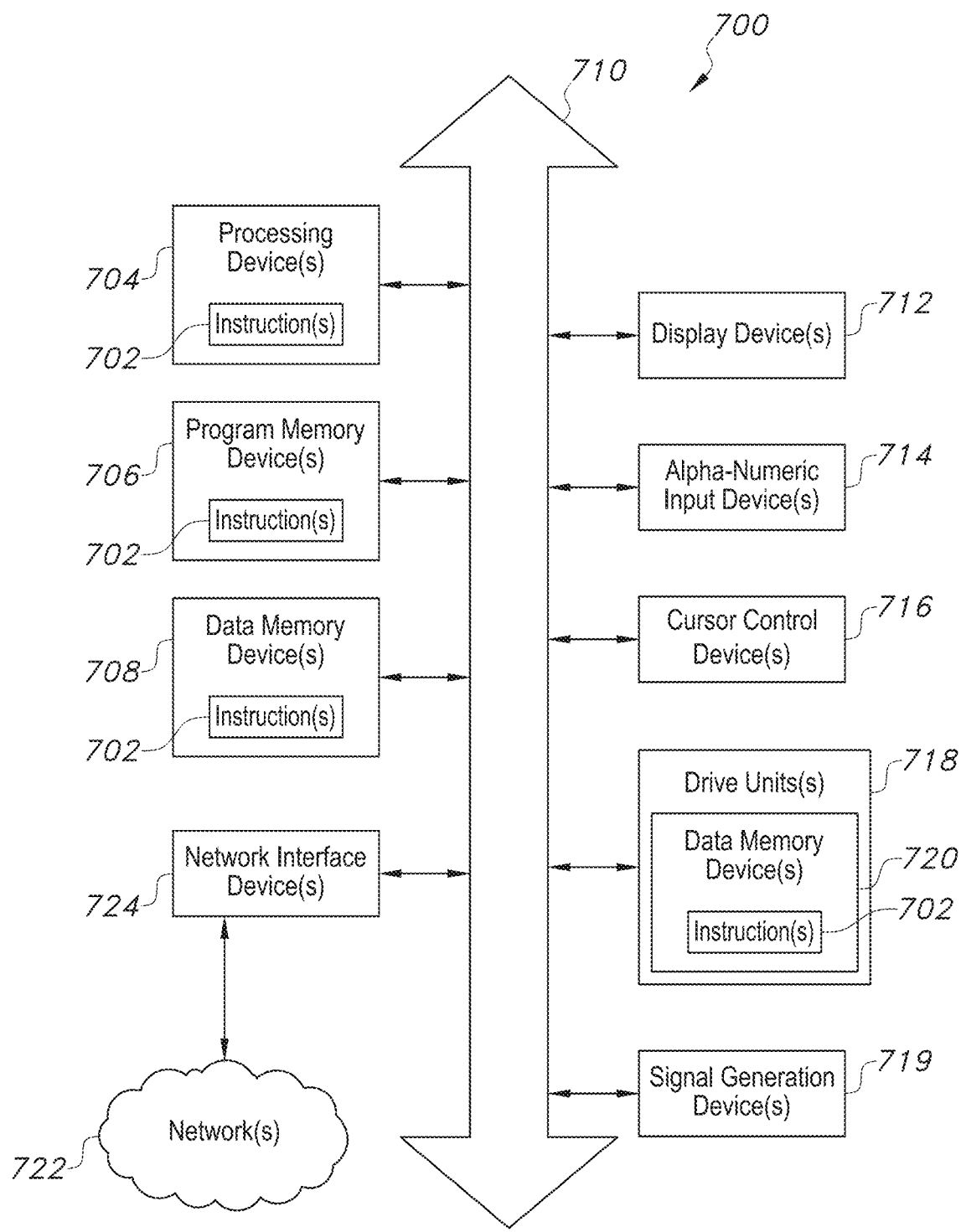
FIG. 24 illustrates a system block diagram including an example computer network infrastructure, in accordance with an embodiment of the disclosed wave dynamic protocol communication system.

FIG. 24 illustrates a system block diagram including an example computer network infrastructure, in accordance with an embodiment of the disclosed veiled-identity wave dynamic communication system. In particular, FIG. 24 is a block diagram of an illustrative embodiment of a general computing system 700. The computing system 700 can include a set of instructions that can be executed to cause the computing system 700 to perform any one or more of the methods or computer based functions disclosed herein. The computing system 700, or any portion thereof, may operate as a standalone device or may be connected, e.g., using a network 722 or other connection, to other computing systems or peripheral devices.

The computing system 700 may also be implemented as or incorporated into various devices, such as a personal computer (PC), a tablet PC, a personal digital assistant (PDA), a mobile device, a palmtop computer, digital smart watch, heads-up display/device and/or other virtual/augmented reality display devices, a laptop computer, a desktop computer, a communications device, a control system, a web appliance, or any other machine capable of executing a set of instructions (sequentially or otherwise) that specify actions to be taken by that machine. Further, while a single computing system 700 is illustrated, the term "system" shall also be taken to include any collection of systems or sub-systems that individually or jointly execute a set, or multiple sets, of instructions to perform one or more computer functions.

As illustrated in FIG. 24, the computing system 700 may include a processor 704, e.g., a central processing unit (CPU), a graphics-processing unit (GPU), or both. Moreover, the computing system 700 may include a main memory and/or program memory 706 and a static memory, neural network storage, and/or data memory 708 that can communicate with each other via a bus 710. As shown, the computing system 700 may further include a video display unit 712, such as a liquid crystal display (LCD), an organic light emitting diode (OLED), a flat panel display, a solid state display, or a cathode ray tube (CRT). Additionally, the computing system 700 may include an input device 714, such as a keyboard, and a cursor control device 716, such as a mouse and/or any other device or method that implements or simulates touch input. The computing system 700 can also include a disk drive unit 718 and/or other storage devices are contemplated, a signal generation device 719, such as a speaker or remote control, and/or a network interface device 724.

In a particular embodiment or aspect, as depicted in FIG. 24, the disk drive unit 718 or neural network storage may include a machine-readable or computer-readable medium 720 in which one or more sets of instructions 702, e.g., software, can be embedded, encoded or stored. Further, the instructions 702 may embody one or more of the methods or logic as described herein. In a particular embodiment or aspect, the instructions 702 may reside completely, or at least partially, within the main memory 706, the static memory 708, and/or within the processor 704 during execution by the computing system 700. The main memory 706 and the processor 704 also may include computer-readable media.

In an alternative embodiment or aspect, dedicated hardware implementations, such as application specific integrated circuits, programmable logic arrays and other hardware devices, can be constructed to implement one or more of the methods described herein. Applications that may include the apparatus and systems of various embodiments or aspects can broadly include a variety of electronic and computing systems. One or more embodiments or aspects described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments or aspects, the methods described herein may be implemented by software programs tangibly embodied in a processor-readable medium and may be executed by a processor. Further, in an exemplary, non-limited embodiment or aspect, implementations can include distributed processing, component/object distributed processing, and parallel processing. Alternatively, virtual computing system processing can be constructed to implement one or more of the methods or functionality as described herein.

It is also contemplated that a computer-readable medium includes instructions 702 or receives and executes instructions 702 responsive to a propagated signal, so that a device connected to a network 722 can communicate audio, voice, video or data over the network 722. Further, the instructions 702 may be transmitted or received over the network 722 via the network interface device 724.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any tangible medium that is capable of storing or encoding a set of instructions for execution by a processor or that cause a computing system to perform any one or more of the methods or operations disclosed herein.

In a particular non-limiting, example embodiment or aspect, the computer-readable medium can include a solid-state memory, such as a flash memory, memory card or other package, which houses one or more non-volatile read-only memories and/or volatile memory. Further, the computer-readable medium can be a random access memory or other volatile re-writable memory. Additionally, the computer-readable medium can include a magneto-optical or optical medium, such as a disk or tapes or other storage device to capture and store carrier wave signals, such as a signal communicated over a transmission medium. In certain embodiments, a digital file attachment to an e-mail or other self-contained information archive or set of archives may be considered a distribution medium that is equivalent to a tangible storage medium. Accordingly, any one or more of a computer-readable medium or a distribution medium and other equivalents and successor media, in which data or instructions may be stored, are included herein.

In accordance with various embodiments or aspects, the methods described herein may be implemented as one or more software programs running on a computer processor. Dedicated hardware implementations including, but not limited to, application specific integrated circuits, programmable logic arrays, and other hardware devices can likewise be constructed to implement the methods described herein. Furthermore, alternative software implementations including, but not limited to, distributed processing or component/object distributed processing, parallel processing, neural network, or virtual machine processing can also be constructed to implement the methods described herein.

It should also be noted that software that implements the disclosed methods may optionally be stored on a tangible storage medium, such as: a magnetic medium, such as a disk or tape; a magneto-optical or optical medium, such as a disk; or a solid state medium, such as a memory card or other package that houses one or more read-only (non-volatile) memories, random access memories, or other re-writable (volatile) memories. The software may also utilize a signal containing computer instructions. A digital file attachment to e-mail or other self-contained information archive or set of archives is considered a distribution medium equivalent to a tangible storage medium. Accordingly, a tangible storage medium or distribution medium as listed herein, and other equivalents and successor media, in which the software implementations herein may be stored, are included herein.

Figure 25:
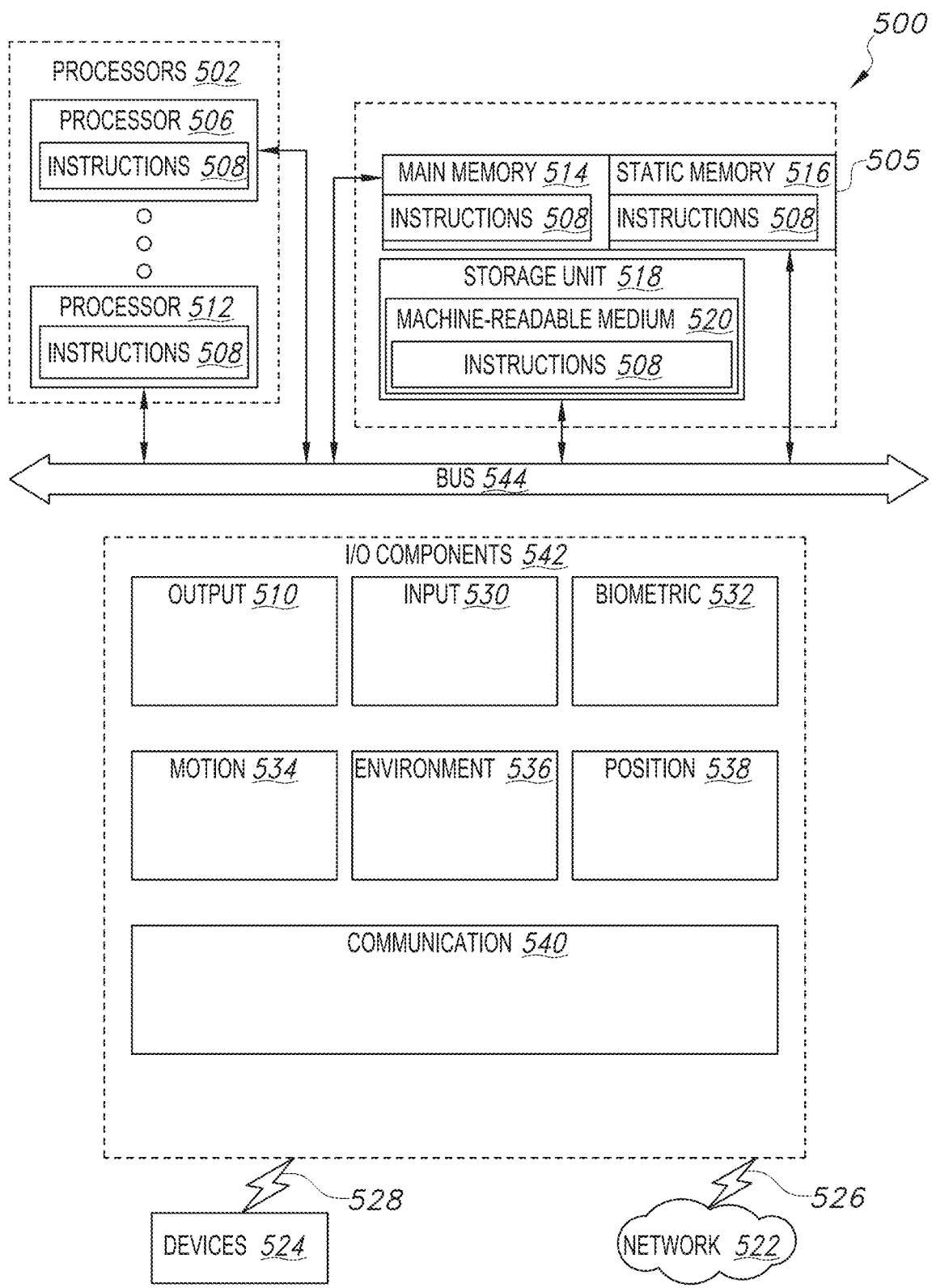
FIG. 25 is a block diagram representation of an exemplary machine in the form of a computer system within which an application or other program, providing a set of instructions are executed and performed using for example, the wave dynamic communication protocol-based (WDCP) platform, according to one or more embodiments of the disclosed wave system and method.

In yet another example, FIG. 25 provides a block diagram representation of an exemplary machine in the form of a computer system within which an application or other program, providing a set of instructions are executed and performed using for example, the wave dynamic communication protocol-based platform, according to one or more embodiments of the disclosed wave system and method. More particularly, FIG. 25 is an overview representation of the machine 500 within which instructions 508 (e.g., software, a program, an application, an applet, an app, or other executable code) for causing the machine 500 to perform any one or more of the methodologies discussed herein may be executed. For example, the instructions 508 may cause the machine 500 to execute any one or more of the methods described herein. The instructions 508 transform the general, non-programmed machine 500 into a particular machine 500 programmed to carry out the described and illustrated functions in the manner described. The machine 500 may operate as a standalone device or may be coupled (e.g., networked) to other machines. In a networked deployment, the machine 500 may operate in the capacity of a server machine or a client machine in a server-client network environment, or as a peer machine in a peer-to-peer (or distributed) network environment. The machine 500 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 908, sequentially or otherwise, that specify actions to be taken by the machine 500. Further, while only a single machine 500 is illustrated, the term "machine" shall also be taken to include a collection of machines that individually or jointly execute the instructions 508 to perform any one or more of the methodologies discussed herein. The machine 500 may include one or more processors 502, memory 505, and I/O component(s) 542, which may be configured to communicate with each other via a bus 544, and may implement the novel wayve/wave dynamic communication protocol with ephemeral-type streams of communications or wavye request(s).

In an example embodiment, the one or more processor(s) 502 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 506 and a second processor 512 that execute the instructions 508. The term "processor" is intended to include multi-core processors that may comprise two or more independent processors (sometimes referred to as "cores") that may execute instructions contemporaneously. Although FIG. 25 shows multiple processors 502, the machine 500 may include a single processor with a single core, a single processor with multiple cores (e.g., a multi-core processor), multiple processors with a single core, multiple processors with multiples cores, or any combination thereof.

The memory 505 includes a main memory 514, a static memory 516, and a storage unit 518, both accessible to the one or more processor(s) 502 via the bus 544, and communicate in certain embodiments in accordance with the disclosed dynamic wave communication protocol. The main memory 504, the static memory 516, and storage unit 518 store the instructions 508 embodying any one or more of the methodologies or functions described herein. The instructions 508 may also reside, completely or partially, within the main memory 514, within the static memory 516, within machine-readable medium 520 within the storage unit 518, within at least one of the processors 502 (e.g., within the processor's cache memory), or any suitable combination thereof, during execution thereof by the machine 500.

The I/O components 542 may include a wide variety of components to receive input, provide output, produce output, transmit information, exchange information, capture measurements, and so on. The specific I/O components 542 that are included in a particular machine will depend on the type of machine. For example, portable machines such as mobile phones may include a touch input device or other such input mechanisms, while a headless server machine will likely not include such a touch input device. It will be appreciated that the I/O components 542 may include many other components that are not shown in FIG. 25. In various example embodiments, the I/O components 542 may include output components 510 and input components 530. The output components 510 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 530 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 542 may include biometric components 532, motion components 534, environmental components 536, or position components 538, among a wide array of other components. For example, the biometric components 532 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 534 include acceleration sensor components (e.g., accelerometer), gravitation sensor components, rotation sensor components (e.g., gyroscope), and so forth. The environmental components 536 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 538 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 542 further include communication components 540 operable to couple the machine 500 to a network 522 or devices 524 via a coupling 526 and a coupling 528, respectively. For example, the communication components 540 may include a network interface component or another suitable device to interface with the network 522. In further examples, the communication components 540 may include wired communication components, wireless communication components, cellular communication components, Near Field Communication (NFC) components, Bluetooth® components (e.g., Bluetooth® Low Energy), WiFi® components, and other communication components to provide communication via other modalities. The devices 524 may be another machine or any of a wide variety of peripheral devices (e.g., a peripheral device coupled via a USB).

Moreover, the communication components 540 may detect identifiers or include components operable to detect identifiers. For example, the communication components 540 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 940, such as location via Internet Protocol (IP) geolocation, location via Wi-Fi® signal triangulation, location via detecting an NFC beacon signal that may indicate a particular location, and so forth.

The various memories (e.g., memory 504, main memory 514, static memory 516, and/or memory of the one or more processors 502) and/or storage unit 518 may store one or more sets of instructions and data structures (e.g., software) embodying or used by any one or more of the methodologies or functions described herein. These instructions (e.g., the instructions 508), when executed by processors 502, cause various operations to implement the disclosed embodiments.

The instructions 508 may be transmitted or received over the network 522, using a transmission medium, via a network interface device (e.g., a network interface component included in the communication components 540) and using any one of a number of well-known transfer protocols (e.g., hypertext transfer protocol (HTTP)). Similarly, the instructions 508 may be transmitted or received using a transmission medium via the coupling 528 (e.g., a peer-to-peer coupling) to the devices 524.

Figure 26:
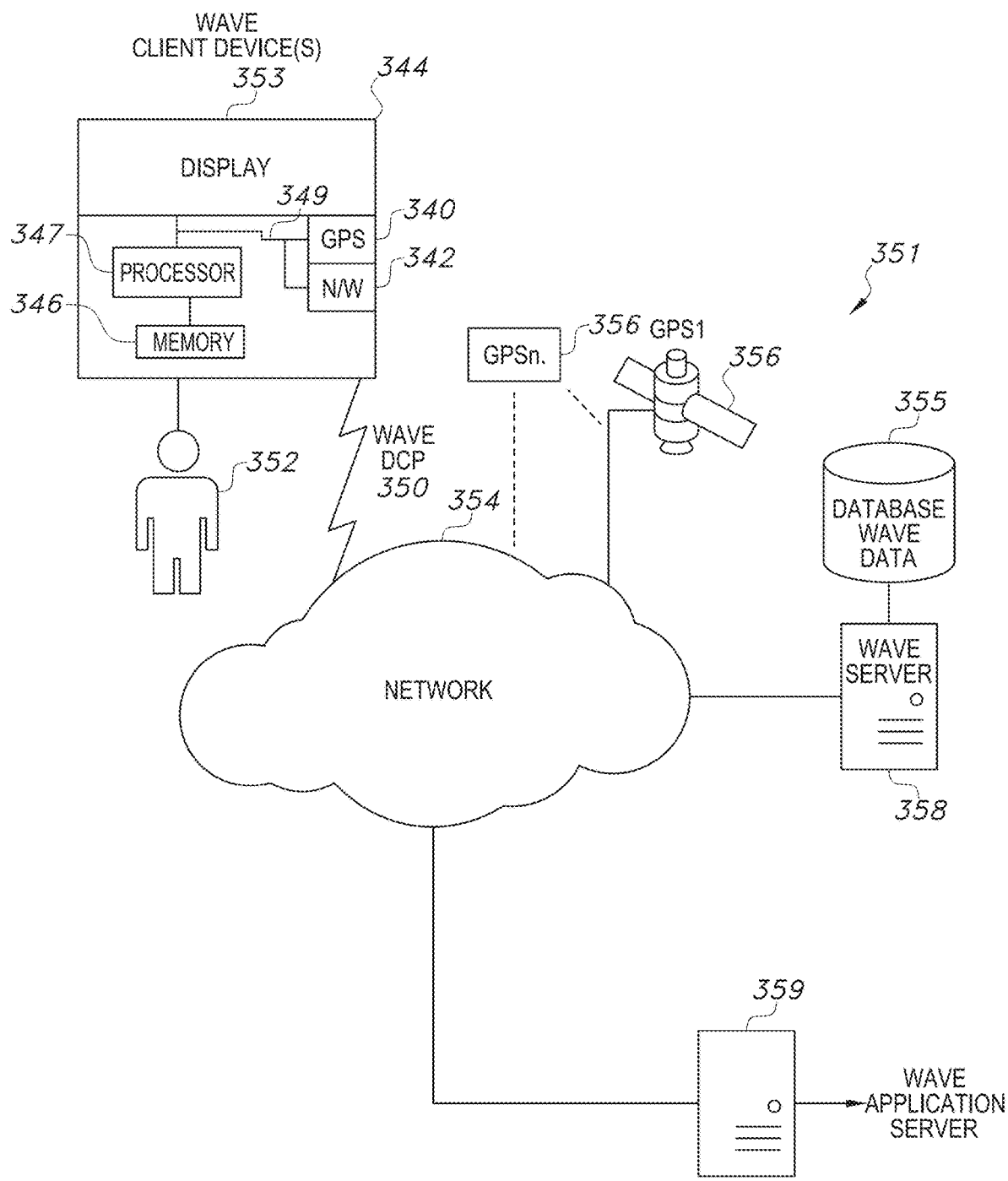
FIG. 26 is an overview of an embodiment of the dynamic wave communication protocol system including one or more users identified by mobile devices on a map, shown as for example, one or balloons as described in connection with FIGS. 2A-2B, in accordance with an embodiment of the disclosed system and method.

FIG. 26 is an overview of an embodiment of the dynamic wave communication protocol system including one or more users identified by mobile devices on a map, as shown for example, as one or balloons as described in connection with FIGS. 2A-2B, and in accordance with an embodiment of the disclosed system and method. More particularly, FIG. 26 provides an embodiment of the dynamic wave protocol system 351 for locating users within a proximity of another user in a location or anywhere geographically in any geographic region on the map, including city, state, country or otherwise, worldwide. Shown in user 352 communication with the system using a portable electronic computing device 344 such as a smart phone, tablet, laptop, or notebook computer. The computing device 344 may include one or more processors 347 that may be configured to communicate with and are operatively coupled to some peripheral subsystems via bus subsystem 349. These peripheral subsystems may include a storage subsystem/memory 346, one or more user input devices, in this embodiment a touch screen as part of the display 349, which also provides a user output interface, a network interface, also referred to as an adapter 342, and one or more Global Positioning System transmitter(s)/receiver(s) 340.

The bus subsystem 349 may provide a mechanism for enabling the various components and subsystems of computing device 344 to communicate with each other. Although FIG. 26 shows bus subsystem 349 as a single bus, alternative embodiments of the bus subsystem may utilize additional or multiple busses. The network interface 342 may provide an interface to other device systems and networks. The network interface 342 may serve as an interface for receiving data from and transmitting data to other systems from the computing device 344. The network interface 342 may include a wireless interface that allows the device 344 to communicate across wireless networks through a wireless access point, and may also include a cellular connection to allow the device to communicate through a cellular network. The network interface will allow the computing device 344 to communicate with one or more servers such as 358 and 359, and system data storage 355.

The device data store/memory 346 may include one or more separate memory devices. It may provide a computer-readable storage medium for storing the basic programming and data constructs that may provide the functionality of at least one embodiment of the disclosure here. The data store 346 may store the applications, which include programs, code modules, and instructions, that, when executed by one or more processors, may provide the functionality of one or more embodiments of the present disclosure. The data store 346 may comprise a memory and a file/disk storage subsystem. In addition, the computing device 344 may store data on another computer such as server 358 accessible through the network 354 via the network interface 342, and in accordance with certain disclosed embodiments, using the dynamic wave communication protocol 350.

The device may also include separate control buttons, or may have integrated control buttons into the display if the display consists of a touch screen. The device in this embodiment has a touch screen and possibly one or more buttons, not shown, on the periphery of the touch screen/display 353. Alternative user input devices may include buttons, a keyboard, pointing devices such as a mouse, trackball, touch pad, etc. In general, the use of the term 'input device' is intended to encompass all possible types of devices and mechanisms for inputting information into the device 344.

User output devices, in this embodiment the display/touch screen 353, may include all display subsystems, audio output devices, etc. The output device may present additional user interfaces to facilitate user interaction with applications performing processes described here and variations thereof. The description herein refers to 'servers' or 'server computing devices.' In general, the server referred to herein in FIG. 26, is a server computing device with a processor and a memory that operates on the user information and provides information back to the users relating to other users in the community of users that subscribe to the same service. Typically, there will be an application server computing device and a global positioning service server that will communicate with the user device or the server. Many of the functions described here may be performed by the application server, the user device, the GPS server. No limitation of any function being performed by one of the devices is intended nor should it be implied. In the environment of the system 351 the computing device 344 may be a client device. The network may consist of any appropriate network, including an intranet, the Internet, a cellular network, a local area network, a satellite network, or any other such network and/or combination of these. Components used for such a system can depend at least in part upon the type of network and/or environment selected. Protocols and components for communicating via such a network are well known and will not be discussed here in detail. Wired or wireless connections, or combinations of these, may enable communication over the network. In the embodiments here, the network includes the Internet and/or cellular communications.

The application server 358 receives the requests and serves information in response to those requests via the network 354, and in certain embodiments in accordance with the dyamic wave communication protocol 350. The application server 358 in combination with data store 355, or by itself, may consist of multiple servicers, layers or other elements, processors, or components, which may be chained, clustered, or otherwise configured, performs the tasks such as interacting with the client computing device and the data store 355. In some embodiments, some or all of the data store 24 may be housed in or integrated with the wave application server 359. Servers, as used here, may be implemented in various ways, such as hardware devices or virtual computer systems. Server may refer to a programming module executed on a computing system in certain disclosed embodiments. The term 'data store' refers to any device or combination of devices capable of storing, accessing, and retrieving data. This may include any combination and number of data servers, databases, data storages devices and media, in any standard, distributed, or clustered environment.

The wave application server 358 may include any appropriate hardware, software, and firmware for integrating with the data store as needed to execute aspects of one or more applications for the client device, handling some or all the data access and logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS"), or another appropriate client-side structured language. Content transferred to a client device such as 344 in the form of for example, waves, wavyes, other wavye related requests and/or communications, may be processed by the client device to provide the content in one or more forms including, but not limited to, forms that are perceptible to the user audibly, visually and/or through other senses including touch, taste, and/or smell. The handling of all requests and responses, as well as the delivery of content between the client device 344 and the application server 358, can be handled by the web server using PHP: Hypertext Preprocessor ("PHP"), Python, Ruby, Perl, Java, HTML, XML, or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The wave database data store 355 can include several separate data tables, databases, data documents, dynamic data storage schemes and/or other data storage mechanisms and media for storing data relating to an aspect of the present disclosure, including the database 302 structures and tables 304, 306, 308, 310, 312, as described in connection with FIG. 18 hereinabove. For example, the data store 355 illustrated in FIG. 26 may include mechanisms for storing temporary data and general data storage. The data store also is shown to include a mechanism for storing alert data, which can be used to generate one or more alerts as described above. It should be understood that there can be many other aspects that may need to be stored in the data store, such as page image information and access rights information, which can be stored in any of the above listed mechanisms as appropriate or in additional mechanisms in the wave database data store 355. The wave database data store 355 is operable, through logic associated therewith, to receive instructions from the wave application server 358 and obtain, update, or otherwise process data in response thereto. The wave application server 358 may provide static, dynamic or a combination of static and dynamic data in response to the received instructions. Dynamic data, such as data used in web logs (blogs), data streams, and other such applications may be generated by server-side structured languages as described herein or may be provided by a content management system ("CMS") operating on, or under the control of, the application server.

Each wave server typically will include an operating system that provides executable program instructions for the general administration and operation of that server and typically will include a computer-readable storage medium, such as a hard disk, random access memory, read only memory, etc., storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure here. The environment can include a variety of data stores and other memory and storage media as discussed above. These can reside in a variety of locations, such as on a storage medium local to (and/or resident in) one or more of the computers or remote from any or all the computers across the network. In a set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer, or speaker). Such a system may also include one or more storage devices, such as disk drives, optical storage devices and solid-state storage devices such as random-access memory ("RAM") or read-only memory ("ROM"), as well as removable media devices, memory cards, flash cards, etc.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 1. Thus, the depiction of the system 344 in FIG. 26 should be taken as being illustrative in nature and not limiting to the scope of the disclosure.

When the user activates, or launches, program code associated with the dynamic wave protocol-based application described in these embodiments, the program code coordinates the device's location devices such as the GPS, Wi-Fi, Bluetooth, and a third-party Indoor Location API to determine the current location of the device and the user, which is transmitted to one or more application servers 358. During the location coordination process, the program code interacts with the device's GPS component to acquire the GPS location from one or more (n) number of GPS satellite(s) 356 and use it to determine the best relative location of the device before sending it to the application server. An application server is the server that executes the code-based instructions and stores the data associated with the location application under discussion here. The application server 358, upon receiving notification that a user has signed in or become active in the system, uses the location coordinates, such as latitude and longitude, of the user to locate other users who are within the proximity set by the app user.

The wave system locates a first user in a community of users, such as subscribed users to a service. When a user activates the application or program code on a user device as described for example, in connection with FIGS. 1A-1M, the wave system sends a signal to a server computing device. The wave server computing device contains user data that identifies the first user and the user-defined proximity radius in certain example embodiments. The system retrieves the position of the first user from the user device directly or from a global positioning system server. The server also includes locale information. Local information is information about the area around the user, such as a building or map. This will more than likely involve accessing a location server computing device to retrieve geographic information relating to the locale including a map either at that point or having been previously accessed. The system then determines other users in the community of users that have positions within the user-defined proximity or in alternative embodiments, in any geographic location. This information is then displayed on a user interface on the user device of the first user, the other users superimposed on a map of the locale or geographic region. In certain embodiments, there are other wave parameters that dictate which anonymous users will appear on the user device and it's not related to proximity to the user or alternatively, the request is set forth by the user to find other anonymous wayve users that are in a certain geographical region, city, country or geographical radius of mileage from the user.

Locating other users here means that the system performs a search in the system using a unique wayve-based algorithm to find other active users, map users, in a region and calculate the distance between these users and the app user using their location coordinates. The system then checks against the privacy settings of all the users in the proximity to make sure they want to be exposed in that proximity before sending them to the app user. The system also checks the app user's filters to ensure that only users that match the app users' filters criteria will be sent to the app user. When the app user receives location coordinates of the map users and their information from the server, the program code then overlays those coordinates and their associated information on layout.

A layout is more than just a map. For example, if one uses an application that locates users, such as Waze® or Google Maps®, the application shows the location of a user in a city grid. Even if the user were in a building, the location is shown with streets and geographical features such as rivers, mountains, etc. The application here identifies the user's location, and then associates that location with a building, a venue, or the streets mentioned above, all of which will be referred to as a venue, with the layout of the venue drawn as background to the user. For example, the user may be in an exhibition hall that has fixed elements, such as restaurants or coffee shops around the perimeter. The layout would include those fixed elements, allowing people to see the user's location relative to those elements. When users are trying to meet up in a large, crowded venue, the layout becomes invaluable. The information for the layout may come from many sources. The application here could contain a library of venues and their associated layouts, keyed to GPS coordinates of the elements of the layout. The application may access another application server, for example such as wave application server 359 for the layouts that has an application programming interface that provides the building or other kinds of geographical layouts that are in digitized format, and notifies the application when a user enters a venue, geographic region, building, structure or otherwise, that has a provided layout in digitized format, or other contemplated electronic or magnetic format.

One should note that except for the GPS signals used by the application server, most if not all information transmitted and received is generally communicated through the network 354 and the application server(s) 358, 359, and in certain embodiments subject to the dynamic wave communication protocol 350. Hence, exposure of any phone numbers or email addresses or other personal identifying information, is barred when users communicate through the wave application and related system 351. None of this information used to identify users includes any private elements or personal identifying information, other than what the user chooses to reveal via for example, toggling or modifying features such as anonymous mode, shade mode and other related wave parameters including wave-states that can tailor the user's visibility and privacy when using the application (for example, as described hereinabove in connection with FIGS. 21A-21D.

Figure 27:
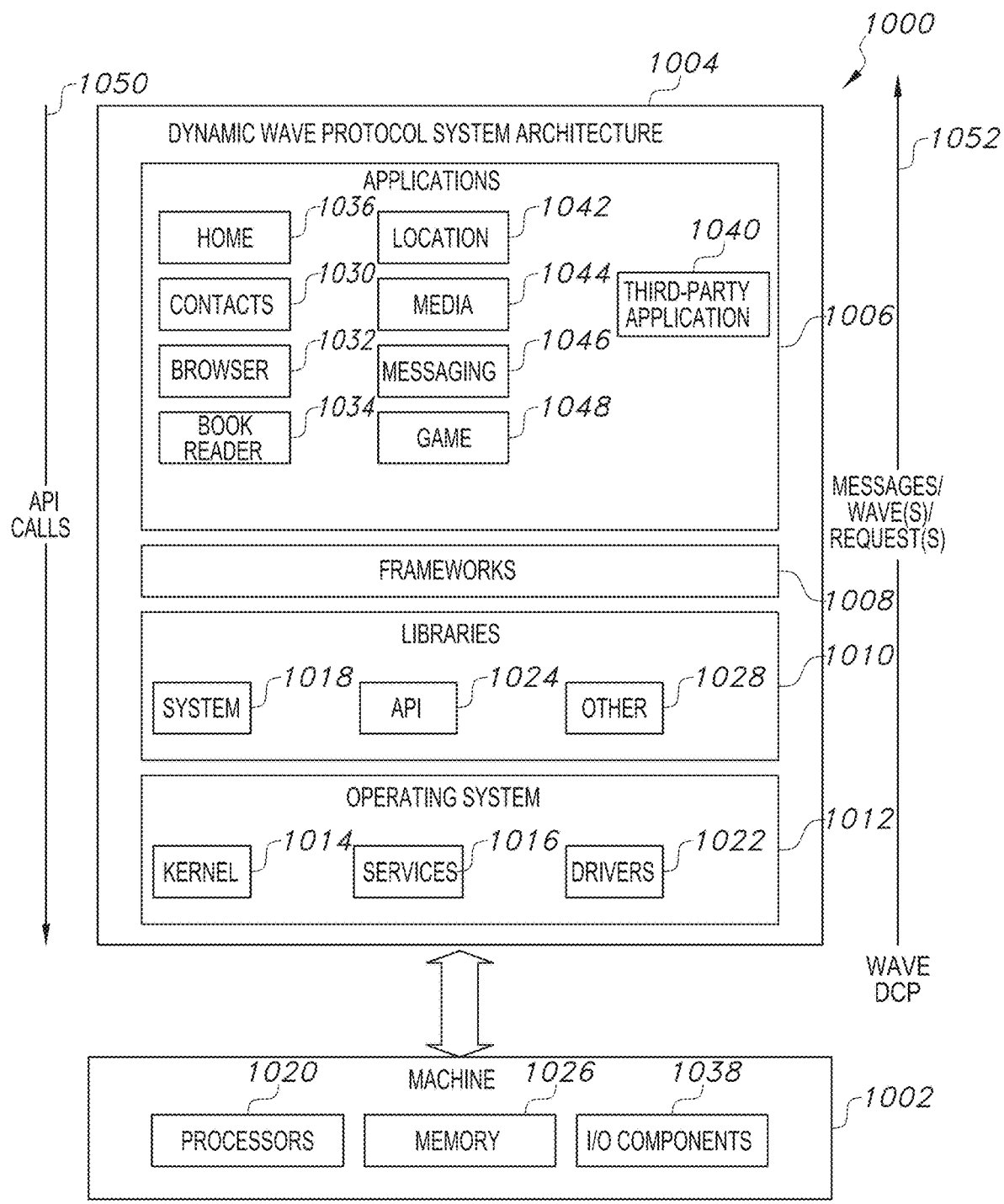
FIG. 27 provides a representation of the dynamic wave protocol system architecture within which the present disclosure may be implemented, in accordance with an embodiment of the disclosed system and method.

FIG. 27 provides an exemplary representation of the dynamic wave protocol system architecture within which the present disclosure may be implemented, in accordance with an embodiment of the disclosed system and method. More particularly, FIG. 10 includes block diagram 1000 illustrating an exemplary dynamic wave protocol system architecture 1004, including related code, instructions and/or applications, which can be installed on any one or more of the devices described herein. The dynamic wave protocol system architecture 1004 is supported by hardware such as a machine 1002 that includes processors 1020, memory 1026, and I/O components 1038. In this example, the software architecture 1004 can be conceptualized as a stack of layers, where each layer provides a particular functionality. The dynamic wave protocol system architecture 1004 includes layers such as an operating system 1012, libraries 1010, frameworks 1008, and applications 1006. Operationally, the applications 1006 invoke API calls 1050 through the software stack and receive messages, wave(s), other requests or wave DCP-based communications 1052, in response to the API calls 1050. The operating system 1012 manages hardware resources and provides common services. The operating system 1012 includes, for example, a kernel 1014, services 1016, and drivers 1022. The kernel 1014 acts as an abstraction layer between the hardware and the other software layers. For example, the kernel 1014 provides memory management, processor management (e.g., scheduling), component management, networking, and security settings, among other functionality. The services 1016 can provide other common services for the other software layers. The drivers 1022 are responsible for controlling or interfacing with the underlying hardware. For instance, the drivers 1022 can include display drivers, camera drivers, BLUETOOTH® or BLUETOOTH ® Low Energy drivers, flash memory drivers, serial communication drivers (e.g., Universal Serial Bus (USB) drivers), WI-FI® drivers, audio drivers, power management drivers, and so forth.

In certain aspects or embodiments, the libraries 1010 provide a low-level common infrastructure used by the applications 1006. The libraries 1010 can include system libraries 1018 (e.g., C standard library) that provide functions such as memory allocation functions, string manipulation functions, mathematic functions, and the like. In addition, the libraries 1010 can include API libraries 1024 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), High Efficiency Video Coding (HEVC), Theora, RealVideo RV40, VP8, VP9, AOMedia Video 1 (AV1), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1010 can also include a wide variety of other libraries 1028 to provide many other APIs to the applications 1006.

The frameworks 1008 provide a high-level common infrastructure that is used by the applications 1006. For example, the frameworks 1008 provide various graphical user interface (GUI) functions, high-level resource management, and high-level location services. The frameworks 1008 can provide a broad spectrum of other APIs that can be used by the applications 1006, some of which may be specific to a particular operating system or platform, for example the disclosed dynamic wave communication protocol-based platform.

In an example embodiment, the applications 1006 may include a home application 1036, a contacts application 1030, a browser application 1032, a book reader application 1034, a location application 1042, a media application 1044, a messaging application 1046, a game application 1048, and a broad assortment of other applications such as a third-party application 1040. The e applications 1006 are programs that execute functions defined in the programs. Various programming languages can be employed to create one or more of the applications 1006, structured in a variety of manners, such as object-oriented programming languages (e.g., Objective-C, Java, or C++) or procedural programming languages (e.g., C or assembly language). In a specific example, the third-party application 1040 (e.g., an application developed using the ANDROID® or IOS®. software development kit (SDK) by an entity other than the vendor of the particular platform) may be mobile software running on a mobile operating system such as IOS®, ANDROID®, WINDOWS®, iPhone®, or another mobile operating system. In this example, the third-party application 1040 can invoke the API calls 1050 provided by the operating system 1012 to facilitate functionality described herein.

The foregoing description of exemplary embodiments is not intended and should not be construed to limit the scope of the of the present disclosure, and various modifications and improvements may be made by those skilled in the art without departing from the scope. Thus, the disclosed subject matter includes all modifications and improvements that are withing the scope of the following claims and their equivalents.

Such embodiments or aspects of the inventive subject matter may be referred to herein, individually and/or collectively, by the term "invention" or "embodiment" merely for convenience and without intending to voluntarily limit the scope of this application to any single invention or inventive concept if more than one is in fact disclosed. Thus, although specific embodiments or aspects have been illustrated and described herein, it should be appreciated that any arrangement calculated to achieve the same purpose may be substituted for the specific embodiments or aspects shown. This disclosure is intended to cover any and all adaptations or variations of various embodiments or aspects. Combinations of the above embodiments or aspects, and other embodiments or aspects not specifically described herein, will be apparent to those of skill in the art upon reviewing the above description.

In the foregoing description of the embodiments or aspects, various features are grouped together in a single embodiment for the purpose of streamlining the disclosure. This method of disclosure is not to be interpreted as reflecting that the claimed embodiments or aspects have more features than are expressly recited in each claim. Rather, as the following claims reflect, inventive subject matter lies in less than all features of a single disclosed embodiment or aspect. Thus the following claims are hereby incorporated into the Detailed Description, with each claim standing on its own as a separate example embodiment or aspect. It is contemplated that various embodiments or aspects described herein can be combined or grouped in different combinations that are not expressly noted in the Detailed Description. Moreover, it is further contemplated that claims covering such different combinations can similarly stand on their own as separate example embodiments or aspects, which can be incorporated into the Detailed Description.

Although the present specification describes components and functions implemented in the embodiments with reference to particular standards and protocols, the disclosed embodiment are not limited to such standards and protocols.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived there from, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "embodiment" merely for convenience and without intending to voluntarily limit the scope of this application to any single embodiment or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract is provided to comply with 37 C.F.R. § 1.72(b), which requires an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

Those skilled in the relevant art will appreciate that aspects of the invention can be practiced with other computer system configurations, including Internet appliances, cellular or mobile phones, smartphones, tablets, mobile communication devices, digital/smart watches, a heads up, holographic, virtual and/or augmented reality display/device, handheld devices and/or wearable devices, multi-processor systems, microprocessor-based or programmable consumer electronics, network PCs, or client-server environments including thin clients, mini-computers, mainframe computers and the like. Aspects of the invention can be embodied in a special purpose computer or data processor that is specifically programmed, configured or constructed to perform one or more of the computer-executable instructions or modules explained in detail below. Indeed, the term "computer" or "computing device" as used herein refers to any data processing platform or device.

Aspects of the invention can also be practiced in distributed computing environments, where tasks or modules are performed by remote processing devices, which are linked through a communications network. In a distributed computing environment, program modules or sub-routines may be located in both local and remote memory storage devices, such as with respect to a wearable, handheld and/or mobile computing device and/or a fixed-location computing device. Aspects of the invention described below may be stored and distributed on computer-readable media, including magnetic and optically readable and removable computer disks, as well as distributed electronically over the Internet or over other networks (including wireless networks). Those skilled in the relevant art will recognize that portions of the invention may reside on a server computer or server platform, while corresponding portions reside on a client computer. For example, such a client server architecture may be employed within a single mobile computing device, among several computers of several users, and between a mobile computer and a fixed-location computer. Data structures and transmission of data particular to aspects of the invention are also encompassed within the scope of the invention.

Although specific example embodiments have been described, it will be evident that various modifications and changes may be made to these embodiments without departing from the broader scope of the inventive subject matter described herein. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "embodiment" merely for convenience and without intending to voluntarily limit the scope of this application to any single embodiment or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate example embodiment.

Although preferred embodiments have been described herein with reference to the accompanying drawings, it is to be understood that the disclosure is not limited to those precise embodiments and that various other changes and modifications may be affected herein by one skilled in the art without departing from the scope or spirit of the embodiments, and that it is intended to claim all such changes and modifications that fall within the scope of this disclosure.

What is claimed is:

1. An ephemeral content distribution system associated with exchanging calibrated communications using a wave dynamic communication protocol based at least on a current wave-state of a user, the system comprising:
   a wave dynamic communication device including a processing device that performs the following operations:
      transmitting a wave-based request for wave dynamic communications associated with a first user;
      processing wave-geographic information associated with a bounded geographical region based on a current wave-state of a second user that received the wave-based request;
      processing wave-identity information associated with the current wave-state of the second user;
      enabling the second user to modify or maintain the current wave-state associated with the second user in generating a dynamic and conditionally-based privacy wave-state associated with an initiated dynamically timed information sharing session with the first user, wherein the conditionally-based privacy wave state is associated with voluntary calibrated revelation of identity, other personal information, and/or calibrated wave-geographic information associated with the second user;
      receiving a response of the second user to the wave-based request in accordance with the dynamic and conditionally-based privacy wave-state of the second user, wherein a conditionally-based information sharing session is enabled with the first user based on the privacy wave state of the second user; and
      facilitating an exchange of the calibrated communications between the first and the second user based on the wave-identity and the dynamic conditionally-based privacy wave-state of the second user, using the wave dynamic communication protocol associated with discrete epochs of the calibrated communications in the ephemeral content distribution system, wherein the calibrated communications expire at the end of a variable pre-determined time period, the ephemeral content distribution system resulting in improved integrity and privacy of communications, with the dynamic and conditionally-based privacy wave-state of the second user terminating at the end of the variable pre-determined time period.

2. The system as recited in claim 1, which further comprises exchanging calibrated communications associated with a modified wave-identity of the second user.

3. The system as recited in claim 1, which further comprises exchanging calibrated communications associated with modified wave-geographic information of the second user.

4. The system as recited in claim 2, which further comprises exchanging calibrated communications associated with modified wave-geographic information of the second user.

5. The system as recited in claim 1, which further comprises exchanging calibrated communications among a plurality of users associated with a plurality of wave-states in the ephemeral content distribution system.

6. The system as recited in claim 5, which further comprises exchanging calibrated communications among a plurality of users associated with a modified wave-identity state for one or more of the plurality of users in the ephemeral content distribution system.

7. The system as recited in claim 6, which further comprises exchanging calibrated communications among a plurality of users associated with a plurality of wave-geographic information for each of the plurality of users in the ephemeral content distribution system.

8. The system as recited in claim 1, which further comprises exchanging calibrated communications including actual geographic location information associated with the second user based on the wave-state of the second user in the ephemeral content distribution system.

9. The system as recited in claim 1, which further comprises exchanging calibrated communications including actual identity information associated with the second user based on the wave-state of the second user in the ephemeral content distribution system.

10. The system as recited in claim 1, which further comprises exchanging calibrated communications between the first and second user based on discrete epochs of content in the ephemeral content distribution system.

11. A method of exchanging calibrated communications in an ephemeral content distribution platform using a wave dynamic communication protocol based at least on a current wave-state of a user, the method comprising:
   a wave dynamic communication device including a processing device that performs the following operations:
      transmitting a wave-based request for wave dynamic communications associated with a first user;
      processing wave-geographic information associated with a bounded geographical region based on a current wave-state of a second user that received the wave-based request;
      processing wave-identity information associated with the current wave-state of the second user;
      enabling the second user to modify or maintain the current wave-state associated with the second user in generating a dynamic and conditionally-based privacy wave-state associated with an initiated dynamically time information sharing session with the first user, wherein the conditionally-based privacy wave state is associated with voluntary calibrated revelation of identity, other personal information and/or calibrated wave-geographic information associated with the second user;
      receiving a response of the second user to the wave-based request in accordance with the dynamic and conditionally-based privacy wave-state of the second user, wherein a conditionally-based information sharing session is enabled with the first user based on the privacy wave state of the second user; and
      facilitating an exchange of the calibrated communications between the first and the second user based on the wave-identity and the dynamic conditionally-based privacy wave-state of the second user using the wave dynamic communication protocol associated with discrete epochs of the calibrated communications in the ephemeral content distribution system, wherein the calibrated communications expire at the end of a variable pre-determined time period, the ephemeral content distribution system resulting in improved integrity and privacy of communications, with the dynamic and conditionally-based privacy wave-state of the second user terminating at the end of the variable pre-determined time period.

12. The method as recited in claim 11, which further comprises exchanging calibrated communications associated with a modified wave-identity of the second user.

13. The method as recited in claim 11, which further comprises exchanging calibrated communications associated with modified wave-geographic information of the second user.

14. The method as recited in claim 12, which further comprises exchanging calibrated communications associated with modified wave-geographic information of the second user.

15. The method as recited in claim 11, which further comprises exchanging calibrated communications among a plurality of users associated with a plurality of wave-states in the ephemeral content distribution system.

16. The method as recited in claim 15, which further comprises exchanging calibrated communications among a plurality of users associated with a modified wave-identity state for one or more of the plurality of users in the ephemeral content distribution system.

17. The method as recited in claim 16, which further comprises exchanging calibrated communications among a plurality of users associated with a plurality of wave-geographic information for each of the plurality of users in the ephemeral content distribution system.

18. The method as recited in claim 11, which further comprises exchanging calibrated communications including actual geographic location information associated with the second user based on the wave-state of the second user in the ephemeral content distribution system.

19. The method as recited in claim 11, which further comprises exchanging calibrated communications including actual identity information associated with the second user based on the wave-state of the second user in the ephemeral content distribution system.

20. The method as recited in claim 11, which further comprises exchanging calibrated communications between the first and second user based on discrete epochs of content in the ephemeral content distribution system.

21. A computer-readable device storing instructions that, when executed by a processing device performs operations comprising:
- transmitting a wave-based request for wave dynamic communications associated with a first user;
- processing wave-geographic information associated with a bounded geographical region based on a current wave-state of a second user that received the wave-based request;
- processing wave-identity information associated with the current wave-state of the second user;
- enabling the second user to modify or maintain the current wave-state associated with the second user in generating a dynamic and conditionally-based privacy wave-state associated with an initiated dynamically time information sharing session with the first user, wherein the conditionally-based privacy wave state is associated with voluntary calibrated revelation of identity, other personal information and/or calibrated wave-geographic information associated with the second user;
- receiving a response of the second user to the wave-based request in accordance with the dynamic and conditionally-based privacy wave-state of the second user, wherein a conditionally-based information sharing session is enabled with the first user based on the privacy wave state of the second user; and
- facilitating an exchange of the calibrated communications between the first and the second user based on the wave-identity and the dynamic conditionally-based privacy wave-state of the second user using the wave dynamic communication protocol associated with discrete epochs of the calibrated communications in the ephemeral content distribution system, wherein the calibrated communications expire at the end of a variable pre-determined time period, the ephemeral content distribution system resulting in improved integrity and privacy of communications, with the dynamic and conditionally-based privacy wave-state of the second user terminating at the end of the variable pre-determined time period.

\* \* \* \* \*